US009826545B2

(12) United States Patent
Madan et al.

(10) Patent No.: US 9,826,545 B2
(45) Date of Patent: *Nov. 21, 2017

(54) SYSTEM AND METHOD FOR FREQUENCY AND TIME DOMAIN DOWNLINK INTER-CELL INTERFERENCE COORDINATION

(71) Applicant: CISCO TECHNOLOGY, INC., San Jose, CA (US)

(72) Inventors: Ritesh K. Madan, Berkeley, CA (US); Vikram Chandrasekhar, Mountain View, CA (US); Rohit Umesh Nabar, Sunnyvale, CA (US); Kedar Durgadas Shirali, Sunnyvale, CA (US); Qing Zhao, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/951,987

(22) Filed: Nov. 25, 2015

(65) Prior Publication Data

US 2017/0111919 A1    Apr. 20, 2017

Related U.S. Application Data

(63) Continuation of application No. 14/918,420, filed on Oct. 20, 2015.

(51) Int. Cl.
*H04J 3/00* (2006.01)
*H04W 72/12* (2009.01)
(Continued)

(52) U.S. Cl.
CPC ....... *H04W 72/1273* (2013.01); *H04L 5/0035* (2013.01); *H04L 5/0073* (2013.01);
(Continued)

(58) Field of Classification Search
CPC .................. H04W 72/1231; H04L 5/0035
(Continued)

(56) References Cited

U.S. PATENT DOCUMENTS 6,456,848 B1    9/2002 Freeman
6,463,296 B1    10/2002 Esmailzadeh
(Continued)

FOREIGN PATENT DOCUMENTS

CN         1334999 A      2/2002
CN       101444125 A      5/2009
(Continued)

OTHER PUBLICATIONS

PCT Mar. 27, 2014 International Search Report and Written Opinion from International Application PCT/IL2013/000080, 10 pages.
(Continued)

*Primary Examiner* — Peter Cheng
(74) *Attorney, Agent, or Firm* — Patterson & Sheridan LLP

(57) ABSTRACT

An example method is provided in one example embodiment and includes receiving performance metric information from a plurality of small cell radios, wherein the performance metric information includes, at least in part, a number of user equipment that are to be scheduled on a first type and a second type of subframes for each small cell radio; determining resource allocation parameters for the plurality of small cell radios; exchanging interference information between two or more small cell radios of the plurality of small cell radios that includes an indication of whether a particular small cell radio is interfering with or is interfered by another small cell radio of the two or more small cell radios; and scheduling downlink resource transmissions on the first type and the second type of subframes for user equipment served by the two or more small cell radios.

20 Claims, 21 Drawing Sheets

(51) Int. Cl.
- *H04W 72/04* (2009.01)
- *H04W 72/08* (2009.01)
- *H04W 16/32* (2009.01)
- *H04L 5/00* (2006.01)

(52) U.S. Cl.
CPC ......... *H04W 16/32* (2013.01); *H04W 72/042* (2013.01); *H04W 72/0413* (2013.01); *H04W 72/082* (2013.01); *H04W 72/1231* (2013.01); *H04W 72/1289* (2013.01); *H04W 72/1226* (2013.01)

(58) Field of Classification Search
USPC .......................................................... 370/336
See application file for complete search history.

(56) References Cited

U.S. PATENT DOCUMENTS

| | | |
|---|---|---|
| 6,600,924 B1 | 7/2003 | Sinivaara |
| 7,158,474 B1 | 1/2007 | Gerakoulis |
| 8,078,185 B2 | 12/2011 | Sun |
| 8,126,495 B2 | 2/2012 | Wu |
| 8,145,223 B2 | 3/2012 | Guey |
| 8,145,252 B2 | 3/2012 | Sung et al. |
| 8,208,937 B2 | 6/2012 | Zhang |
| 8,270,976 B2 | 9/2012 | Simonsson et al. |
| 8,483,743 B2 | 7/2013 | Dimou |
| 8,731,567 B2 | 5/2014 | Zhang |
| 8,805,373 B2 | 8/2014 | Chayat |
| 8,805,385 B2 | 8/2014 | Hunukumbure |
| 8,879,441 B2 | 11/2014 | Hunukumbure |
| 9,094,831 B2 | 7/2015 | Borran |
| 9,197,358 B2 | 11/2015 | Hejazi |
| 9,313,004 B2 | 4/2016 | Yanover et al. |
| 9,332,458 B2 | 5/2016 | Nuss et al. |
| 9,344,970 B2 | 5/2016 | Uplenchwar et al. |
| 9,414,310 B2 | 8/2016 | Grayson |
| 9,490,953 B2 | 11/2016 | Yanover et al. |
| 9,497,708 B2 | 11/2016 | Uplenchwar et al. |
| 9,544,857 B2 | 1/2017 | Carter et al. |
| 9,559,798 B2 | 1/2017 | Nuss et al. |
| 9,648,569 B2 | 5/2017 | Madan et al. |
| 9,655,102 B2 | 5/2017 | Uplenchwar et al. |
| 2002/0019245 A1 | 2/2002 | Longoni |
| 2002/0061742 A1 | 5/2002 | Lapaille |
| 2004/0132486 A1 | 7/2004 | Halonen |
| 2004/0213170 A1 | 10/2004 | Bremer |
| 2005/0063389 A1* | 3/2005 | Elliott ................. H04L 12/1881 370/395.4 |
| 2006/0292989 A1 | 12/2006 | Gerlach |
| 2007/0082620 A1 | 4/2007 | Zhang et al. |
| 2007/0086406 A1 | 4/2007 | Papasakellariou |
| 2007/0115874 A1 | 5/2007 | Usuda |
| 2007/0177501 A1 | 8/2007 | Papasakellariou |
| 2008/0004028 A1 | 1/2008 | Vincent |
| 2008/0043623 A1 | 2/2008 | Franceschini |
| 2008/0045227 A1 | 2/2008 | Nagai |
| 2008/0084844 A1 | 4/2008 | Reznik |
| 2008/0188234 A1 | 8/2008 | Gorokhov |
| 2008/0268833 A1 | 10/2008 | Huang |
| 2009/0005030 A1 | 1/2009 | Han |
| 2009/0067370 A1 | 3/2009 | Kim |
| 2009/0081955 A1 | 3/2009 | Necker |
| 2009/0092080 A1 | 4/2009 | Balasubramanian |
| 2009/0092088 A1 | 4/2009 | Kokku |
| 2009/0270109 A1 | 10/2009 | Wang |
| 2010/0105406 A1 | 4/2010 | Luo et al. |
| 2010/0110989 A1 | 5/2010 | Wu |
| 2010/0124930 A1 | 5/2010 | Andrews |
| 2010/0233962 A1 | 9/2010 | Johansson |
| 2010/0248737 A1 | 9/2010 | Smith |
| 2010/0267338 A1 | 10/2010 | Chiu |
| 2010/0285795 A1 | 11/2010 | Whinnett |
| 2010/0309864 A1 | 12/2010 | Tamaki |
| 2010/0322109 A1 | 12/2010 | Ahn |
| 2011/0034174 A1 | 2/2011 | Xu |
| 2011/0070911 A1 | 3/2011 | Zhang |
| 2011/0077016 A1 | 3/2011 | Stolyar et al. |
| 2011/0081865 A1* | 4/2011 | Xiao ................... H04W 52/243 455/63.1 |
| 2011/0092209 A1 | 4/2011 | Gaal |
| 2011/0098072 A1 | 4/2011 | Kim |
| 2011/0306347 A1 | 12/2011 | Choi |
| 2011/0310879 A1 | 12/2011 | Wu |
| 2011/0317742 A1 | 12/2011 | Kawahatsu |
| 2012/0046028 A1 | 2/2012 | Damnjanovic |
| 2012/0087266 A1 | 4/2012 | Vajapeyam |
| 2012/0115534 A1 | 5/2012 | Luo |
| 2012/0157155 A1 | 6/2012 | Cho |
| 2012/0243431 A1 | 9/2012 | Chen et al. |
| 2012/0270536 A1 | 10/2012 | Ratasuk |
| 2013/0029669 A1 | 1/2013 | Boudreau et al. |
| 2013/0044704 A1* | 2/2013 | Pang ................. H04W 72/0426 370/329 |
| 2013/0109380 A1 | 5/2013 | Centonza |
| 2013/0157680 A1 | 6/2013 | Morita |
| 2013/0210431 A1 | 8/2013 | Abe |
| 2013/0279403 A1 | 10/2013 | Takaoka |
| 2013/0310019 A1 | 11/2013 | Visotsky |
| 2014/0087747 A1 | 3/2014 | Kronestedt |
| 2014/0098757 A1 | 4/2014 | Khandekar |
| 2014/0126537 A1 | 5/2014 | Chen et al. |
| 2014/0148149 A1 | 5/2014 | Kwan |
| 2014/0170965 A1 | 6/2014 | Li |
| 2014/0171143 A1 | 6/2014 | Liu |
| 2014/0200001 A1 | 7/2014 | Song |
| 2014/0219197 A1 | 8/2014 | Chaudhuri |
| 2014/0233468 A1 | 8/2014 | Hejazi |
| 2014/0233530 A1 | 8/2014 | Damnjanovic |
| 2014/0302851 A1 | 10/2014 | Yiu |
| 2014/0302859 A1 | 10/2014 | Nama |
| 2014/0307685 A1 | 10/2014 | Takano |
| 2014/0321304 A1 | 10/2014 | Yu |
| 2014/0328327 A1 | 11/2014 | Xiao et al. |
| 2014/0378145 A1 | 12/2014 | Legg |
| 2015/0004975 A1 | 1/2015 | Yamamoto |
| 2015/0009816 A1* | 1/2015 | Hsu ................... H04W 28/0221 370/230.1 |
| 2015/0011229 A1 | 1/2015 | Morita et al. |
| 2015/0063225 A1 | 3/2015 | Kanamarlapudi |
| 2015/0105025 A1 | 4/2015 | Zhang |
| 2015/0237588 A1 | 8/2015 | Zhao et al. |
| 2015/0237637 A1 | 8/2015 | Venkatraman |
| 2015/0282033 A1 | 10/2015 | Lunden |
| 2015/0282104 A1 | 10/2015 | Damnjanovic |
| 2015/0365855 A1 | 12/2015 | Nuss et al. |
| 2015/0365865 A1 | 12/2015 | Bakker |
| 2016/0073426 A1 | 3/2016 | Bull et al. |
| 2016/0094319 A1 | 3/2016 | Chaudhuri |
| 2016/0127069 A1 | 5/2016 | Nuss et al. |
| 2016/0150442 A1 | 5/2016 | Kwan |
| 2016/0157126 A1 | 6/2016 | Nuss et al. |
| 2016/0165485 A1 | 6/2016 | Kwan |
| 2016/0198412 A1 | 7/2016 | Uplenchwar et al. |
| 2016/0211955 A1 | 7/2016 | Wu |
| 2016/0219596 A1 | 7/2016 | Yanover et al. |
| 2016/0242122 A1 | 8/2016 | Yue |
| 2016/0309356 A1 | 10/2016 | Madan et al. |
| 2016/0309476 A1 | 10/2016 | Madan et al. |
| 2016/0315728 A1 | 10/2016 | Palenius |
| 2016/0373202 A1 | 12/2016 | Nuss et al. |
| 2017/0034795 A1 | 2/2017 | Madan |
| 2017/0041938 A1 | 2/2017 | Nabar |
| 2017/0055225 A1 | 2/2017 | Uplenchwar et al. |
| 2017/0064707 A1 | 3/2017 | Xiao |
| 2017/0094611 A1 | 3/2017 | Carter et al. |
| 2017/0150384 A1 | 5/2017 | Rune |

FOREIGN PATENT DOCUMENTS

| | | |
|---|---|---|
| EP | 2166714 | 3/2010 |
| EP | 2566261 | 3/2013 |
| EP | 2018781 | 4/2013 |

(56) References Cited

FOREIGN PATENT DOCUMENTS

| WO | WO00/38351    | 6/2000 |
| WO | WO2010/018929 | 2/2010 |
| WO | WO2014/064674 | 5/2014 |

OTHER PUBLICATIONS

PCT Apr. 28, 2015 International Preliminary Report on Patentability and Written Opinion from International Application PCT/IL2013/000080.

ILPO May 13, 2015 Search Report from Israel Application Serial No. IL222709 [Only partially translated].

Nokia Siemens Networks et al: "Enhanced ICIC considerations for HetNet scenarios", 3GPP Draft; R1-103822_EICIC_OVERVIEW, 3rd Generation Partnership Project (3GPP), Mobile Competence Centre; 650, Route Des Lucioles; F-06921 Sophia-Antipolis Cedex; France, vol. RAN WG1, No. Dresden, Germany; 20100628-20100702, Jun. 22, 2010 (Jun. 22, 2010), XP050598481, [retrieved on Jun. 22, 2010] Section 3, 4 pages.

Qualcomm Incorporated: "Introduction of enhanced ICIC", 3GPP Draft; R2-106246, 3rd Generation Partnership Project (3GPP), Mobile Competence Center; 650, Route Des Lucioles; F-06921 Sophia-Antipolis Cedex; France, vol. RAN WG2, No. Jacksonville, USA; 20101115, Nov. 9, 2010 (Nov. 9, 2010), XP050492195, [retrieved on Nov. 9, 2010] Section 16.X.2, 5 pages.

"3GPP TS 36.300 V9.7.0 (Mar. 2011) Technical Specification: $3^{rd}$ Generation Partnership Project; Technical Specification Group Radio Access Network; Evolved Universal Terrestrial Radio access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.

EPO Nov. 21, 2016 Extended Search Report and Written Opinion from European Application Serial No. 16180195.6; 9 pages.

Liu, Jianquo, et al., "Uplink Power Control and Interference Coordination for Heterogeneous Network," 2012 IEEE 23rd International Symposium on Personal, Indoor and mobile Radio Communications, Sydney, Australia, Sep. 9-12, 2012; 5 pages.

IPO Mar. 27, 2017 Intellectual Property Office Combined Search and Examination Report under Sections 17 and 18(3) from Application No. GB1703805.0; 5 pages.

PRC Apr. 7, 2017 SIPO First Office Action from Chinese Application No. 201280058324.X; 14 pages (English translation only).

* cited by examiner

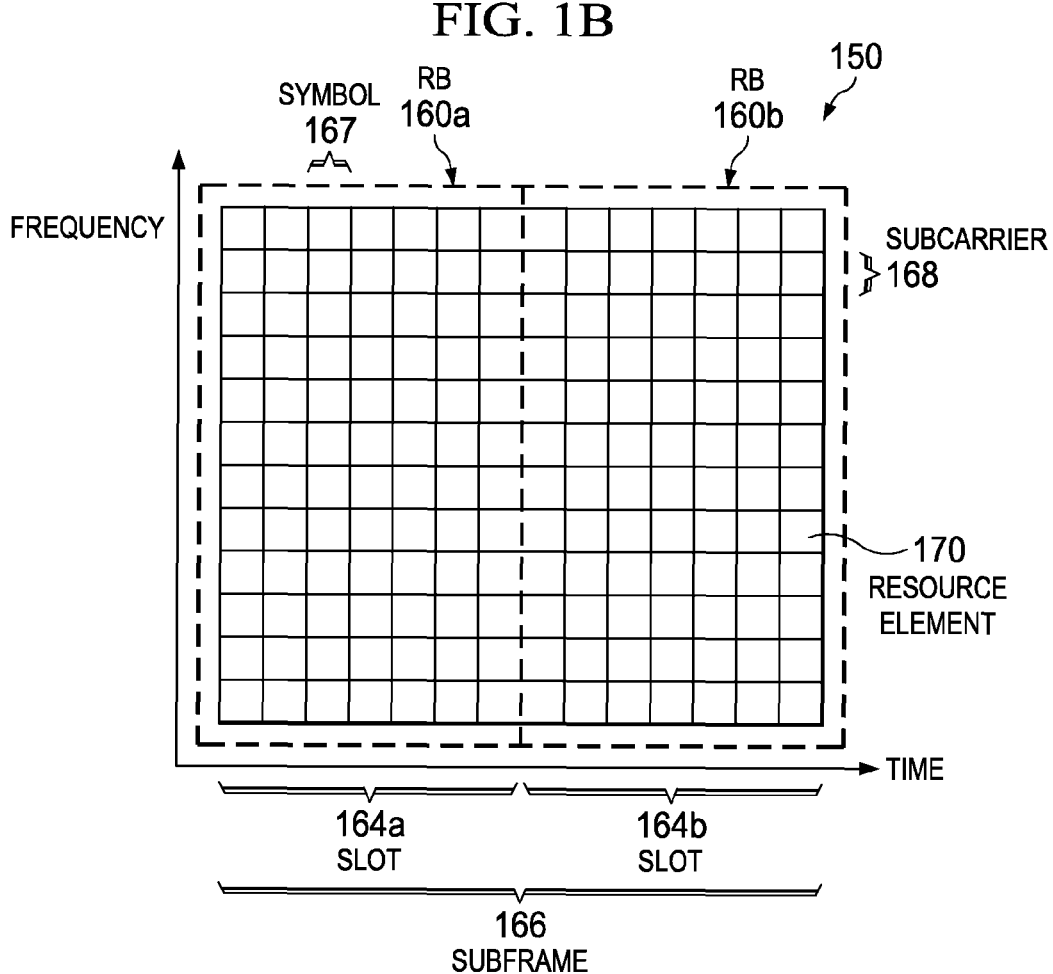
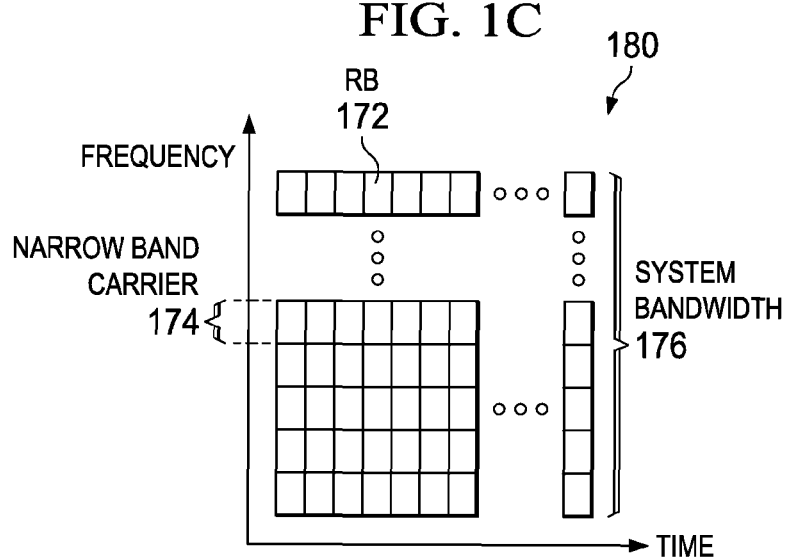

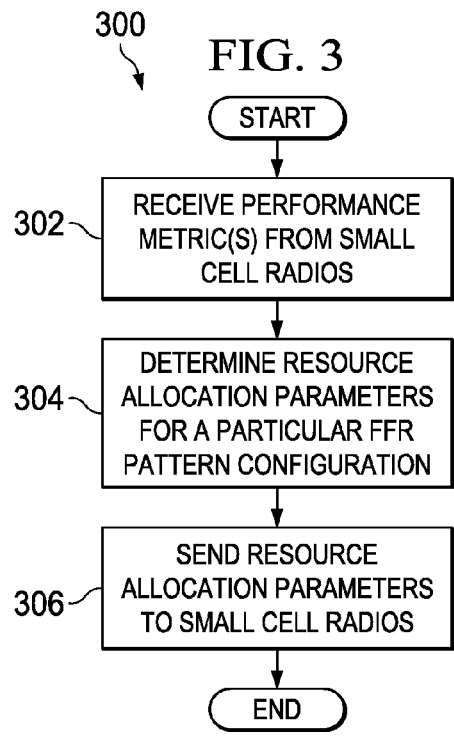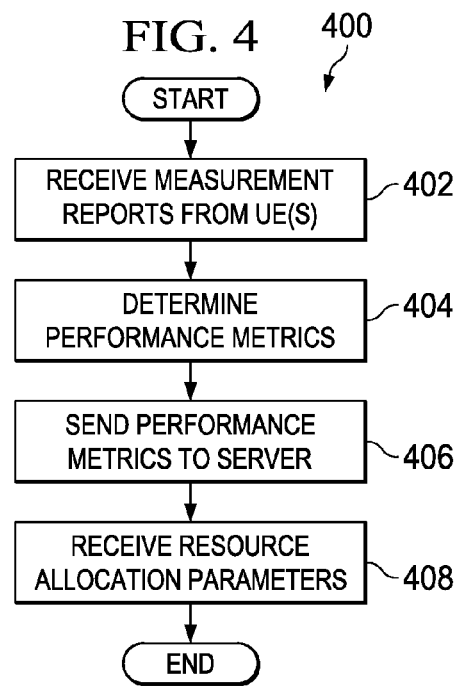

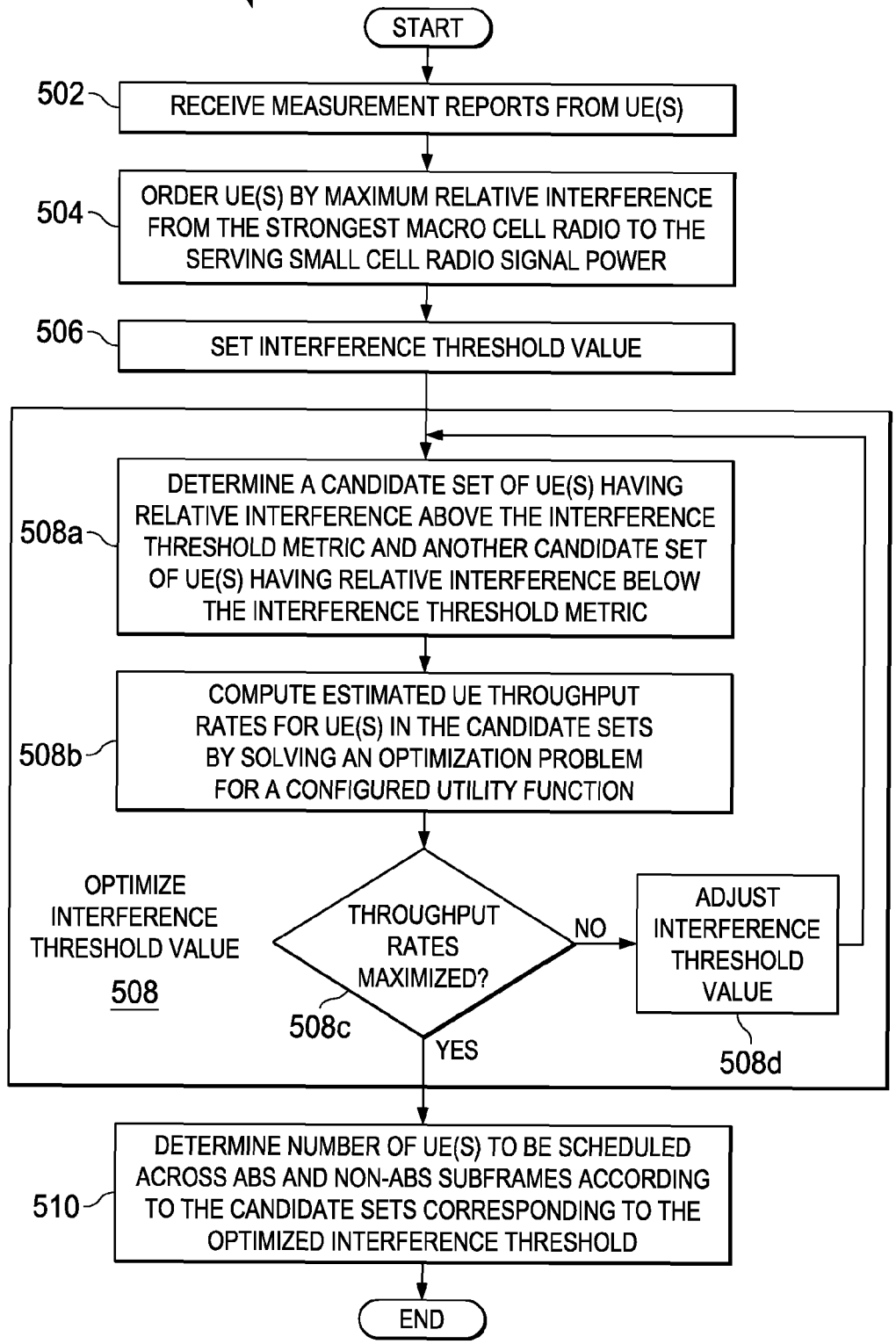

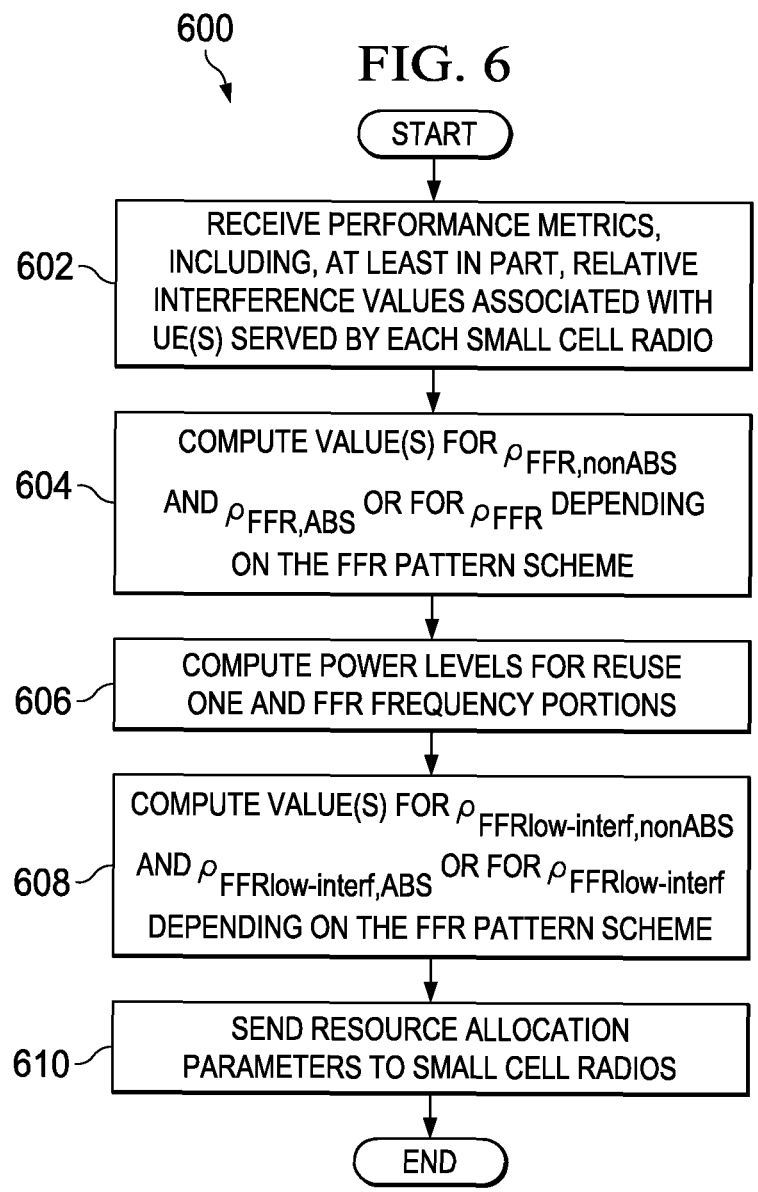

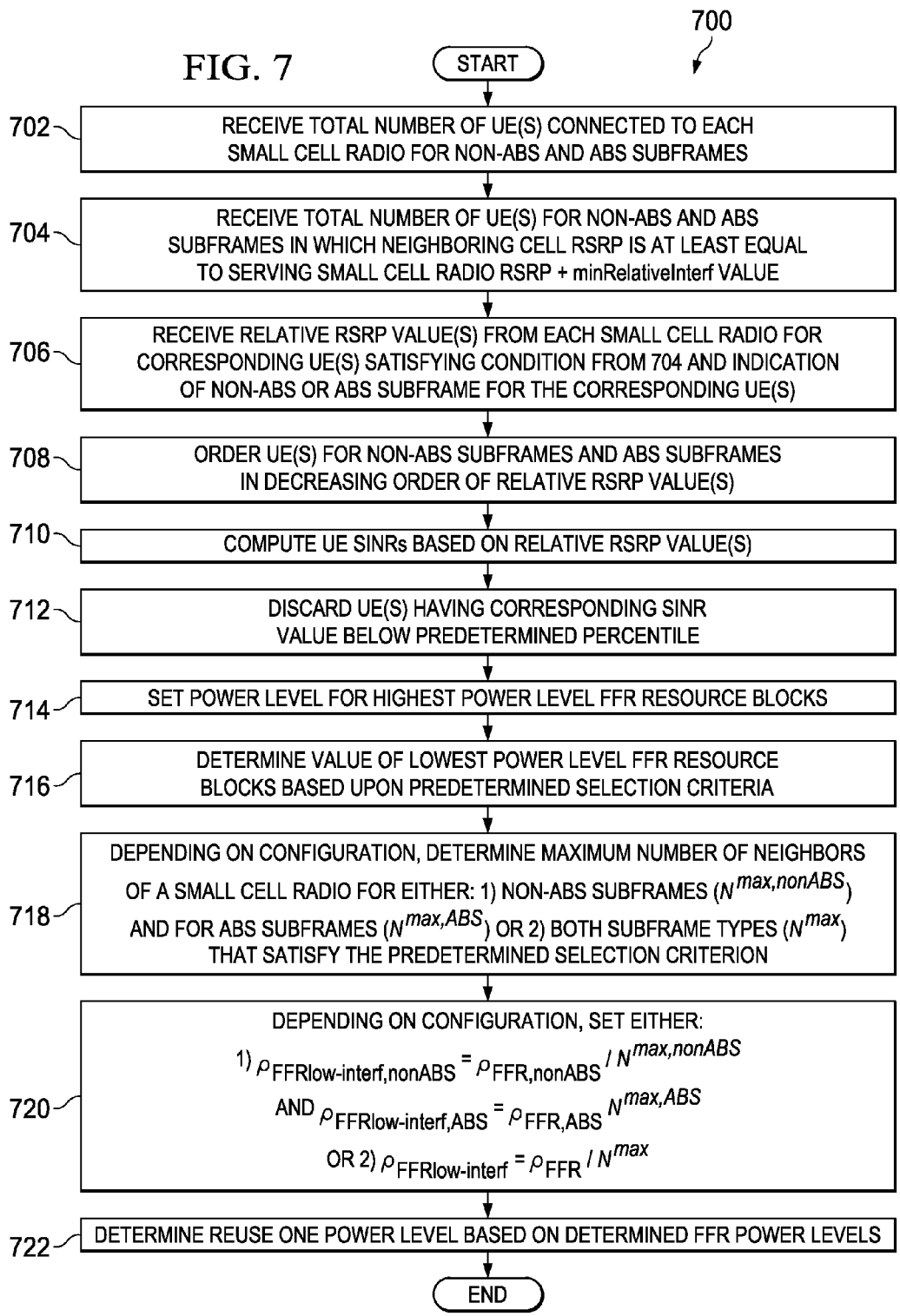

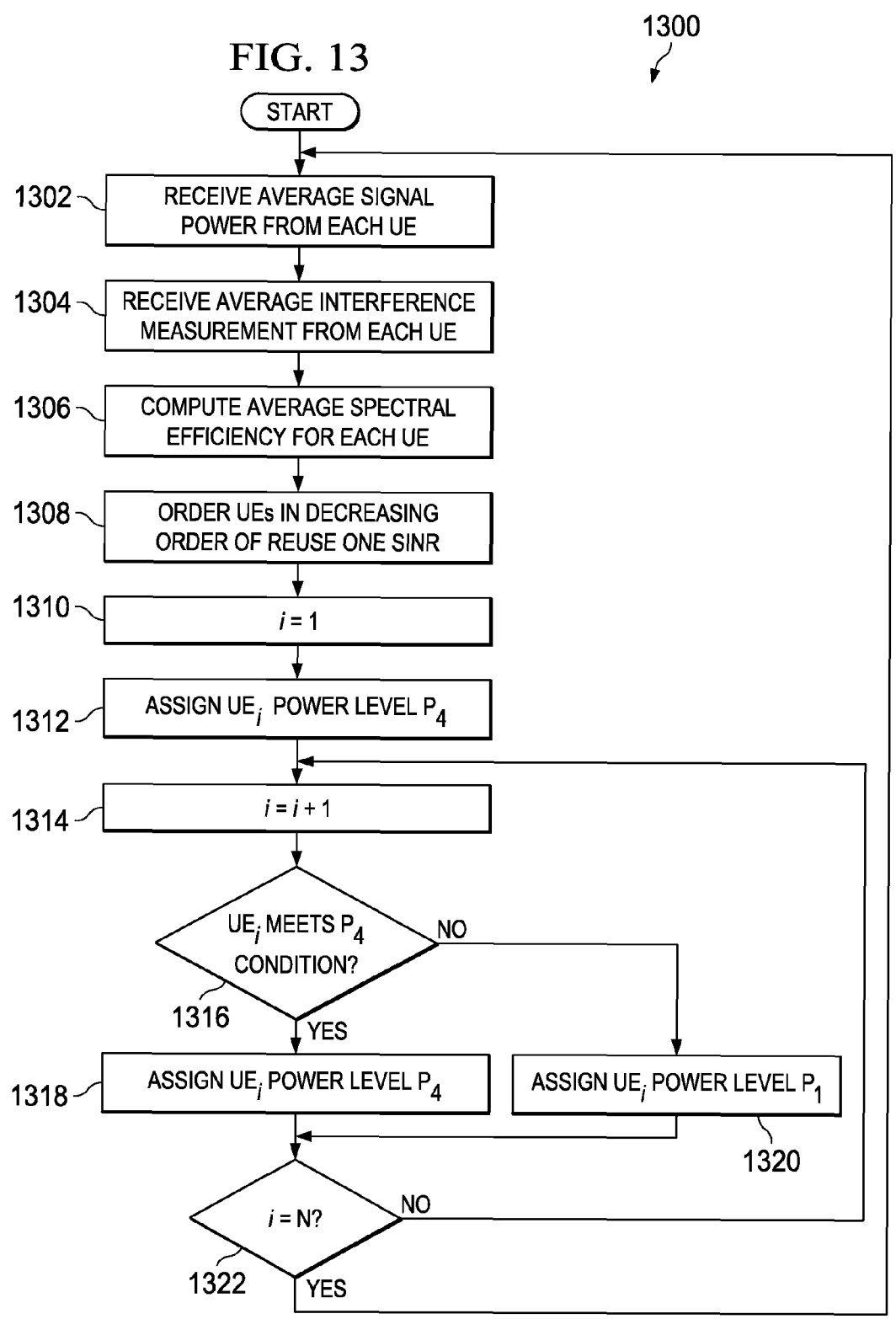

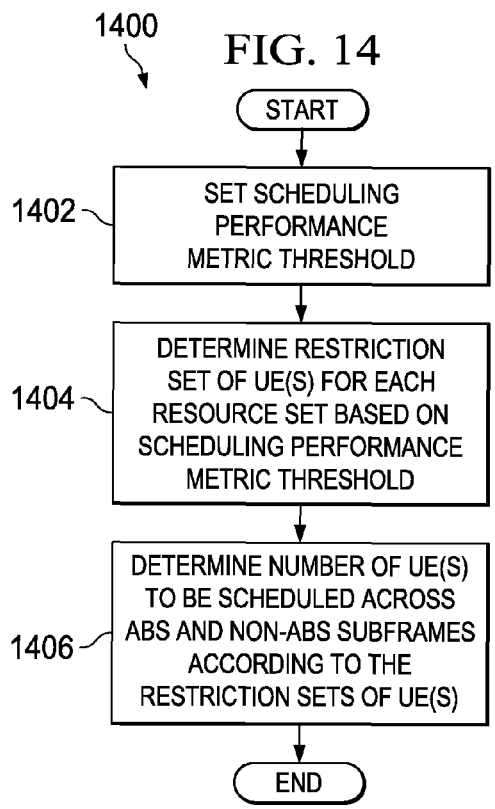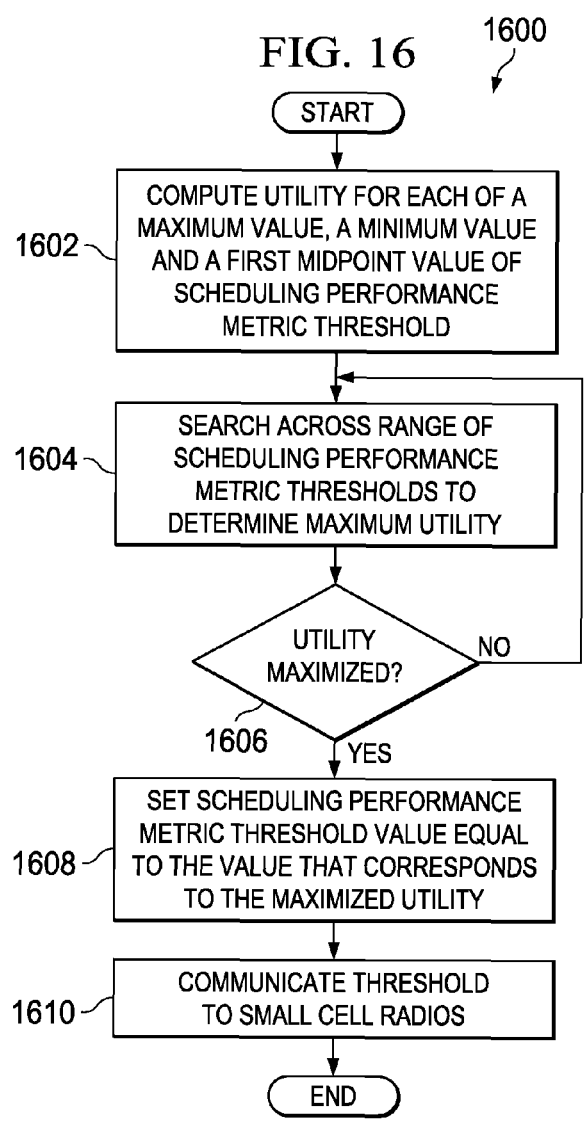

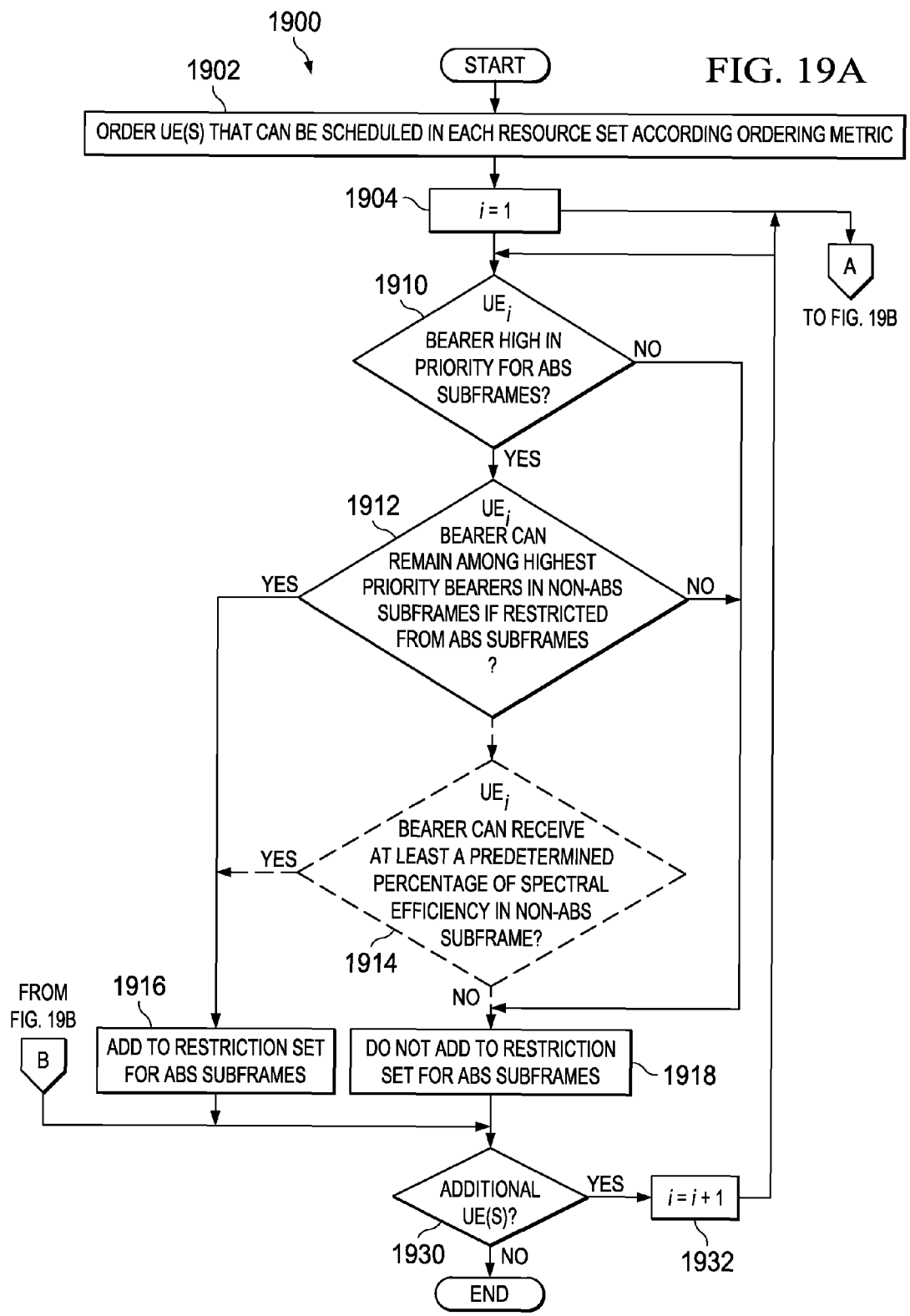

US 9,826,545 B2

SYSTEM AND METHOD FOR FREQUENCY AND TIME DOMAIN DOWNLINK INTER-CELL INTERFERENCE COORDINATION

RELATED APPLICATION

This Application is a continuation (and claims the benefit of priority under 35 U.S.C. §120) of U.S. application Ser. No. 14/918,420, filed Oct. 20, 2015, entitled "SYSTEM AND METHOD FOR FREQUENCY AND TIME DOMAIN DOWNLINK INTER-CELL INTERFERENCE COORDINATION," inventors Ritesh K. Madan, et al. The disclosure of the prior application is considered part of (and is incorporated in its entirety by reference in) the disclosure of this application.

TECHNICAL FIELD

This disclosure relates in general to the field of communications and, more particularly, to a system and method for frequency and time domain downlink inter-cell interference coordination (ICIC).

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. In some instances, resources are allocated for downlink transmissions to user equipment served by a particular cell radio. As the number of user equipment (e.g., the number of subscribers) increases, the possibility of inter cell interference also increases, which can lead to inefficient performance of the user equipment and for the network. Accordingly, there are significant challenges in providing downlink ICIC for mobile communication networks, particularly with respect to small cell networks in the presence of macro cell networks that operate within a time and/or frequency domain ICIC architecture.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1B is a simplified schematic diagram illustrating example details associated with an example time-frequency grid that can be associated an example subframe;

FIG. 1C is a simplified schematic diagram illustrating example details associated with another example time-frequency grid that can be associated with downlink transmissions;

FIG. 3 is a simplified flow diagram illustrating example operations that can be associated with a server in accordance with one potential embodiment of the communication system;

FIG. 4 is a simplified flow diagram illustrating example operations that can be associated with a small cell radio in accordance with one potential embodiment of the communication system;

FIG. 5 is a simplified flow diagram illustrating other example operations that can be associated with a small cell radio in accordance with one potential embodiment of the communication system;

FIG. 6 is a simplified flow diagram illustrating example operations that can be associated with determining resource allocation parameters in accordance with one potential embodiment of the communication system;

FIG. 7 is a simplified flow diagram illustrating example operations that can be associated with determining resource allocation parameters using performance metrics that include user equipment (UE) specific feedback in accordance with one potential embodiment of the communication system;

FIG. 13 is a simplified flow diagram illustrating other example operations that can be associated with determining downlink transmission power levels in accordance with one potential embodiment of the communication system;

FIG. 14 is a simplified flow diagram illustrating example operations that can be associated with determining a subframe type for UE scheduling in accordance with one potential embodiment of the communication system;

FIG. 16 is a simplified flow diagram illustrating yet other example operations that can be associated with determining a scheduling performance metric threshold for UE scheduling in accordance with one potential embodiment of the communication system;

FIGS. 19A-19B are simplified flow diagrams illustrating yet other example operations that can be associated with determining a subframe type for UE scheduling in accordance with one potential embodiment of the communication system.

DETAILED DESCRIPTION OF EXAMPLE EMBODIMENTS

Overview

Figure 1A:
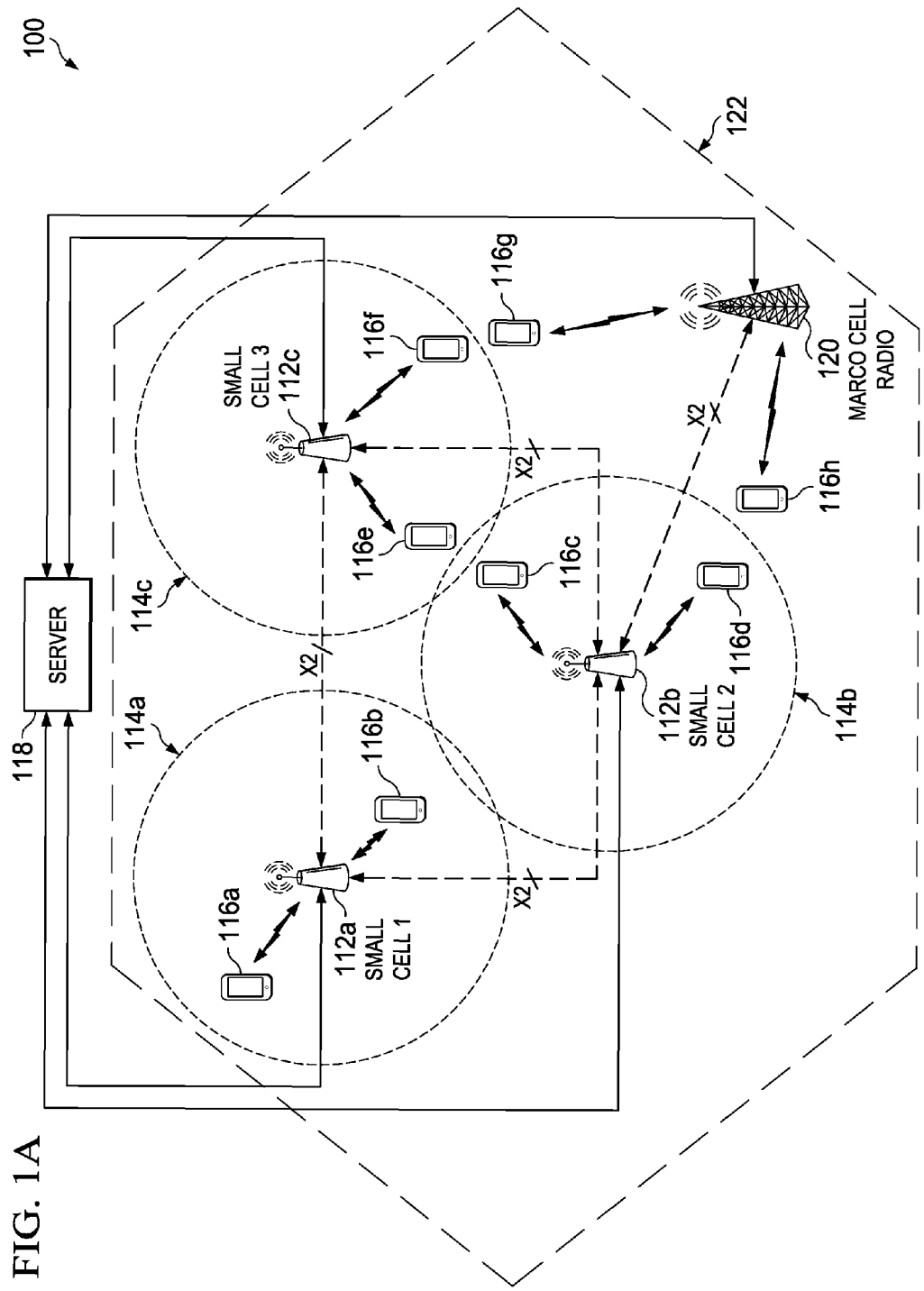
FIG. 1A is a simplified block diagram of a communication system to facilitate frequency and time domain ICIC in a cellular network in accordance with one embodiment of the present disclosure.

A method is provided in one example embodiment and may include receiving performance metric information from a plurality of small cell radios, wherein the performance metric information for each of a small cell radio of the plurality of small cell radios includes, at least in part, a first number of user equipment that are to be scheduled on a first type of subframes and a second number of UE that are to be scheduled on a second type of subframes; determining resource allocation parameters for the plurality of small cell radios based, at least in part on the performance metric information; exchanging interference information between two or more small cell radios of the plurality of small cell radios, wherein the interference information includes, at least in part, an indication of whether a particular small cell radio is interfering with another small cell radio of the two or more small cell radios and an indication of the particular small cell radio is interfered by another small cell radio of the two or more small cell radios; and scheduling downlink resource transmissions on the first type of subframes and the second type of subframes for user equipment served by the two or more small cell radios based, at least in part, on the resource allocation parameters and the interference information exchanged between the two or more small cell radios. The first type of subframes and the second type of subframes can be one of: an almost blank subframe (ABS) type of subframes; and a non-almost blank subframe (non-ABS) type of subframes.

In some cases, the method can include computing particular performance metric information for a particular small cell radio by determining maximized a total sum of utilities of throughput rates for a plurality of user equipment connected to the particular small cell radio based, at least in part, on resources that are to be scheduled for each user equipment on either the first type of subframes or the second type of subframes. In some instances, the maximized total sum of utilities of throughput rates for the plurality of user equipment connected to the particular small cell radio can constrained by a number of resources to be assigned to the plurality of user equipment for a plurality of first frequency regions for the first type of subframes and a plurality of second frequency regions for the second type of subframes. In some instances, the first frequency regions for the first type of subframe can be the same as the second frequency regions for the second type of subframes. In other instances, the first frequency regions for the first type of subframes can be different from the second frequency regions for the second type of subframes.

In some instances, the resource allocation parameters can include at least one of: a value for a fraction of resources that can be scheduled in the first type of subframes for a fractional frequency reuse (FFR) portion of one or more subframes associated with the first type of subframes; a value for a fraction of resources that can be scheduled in the second type of subframes for a fractional frequency reuse (FFR) portion of one or more subframes associated with the second type of subframes; and a value for a fraction of resources that can be scheduled in both the first type of subframes and the second type of subframes for a fractional frequency reuse (FFR) portion of one or more subframes associated with both the first type of subframes and the second type of subframes.

In still some instances, the resource allocation parameters can include one or more of: a value for a fraction of resources that can be scheduled in the first type of subframes for a fractional frequency reuse (FFR) portion of one or more subframes associated with the first type of subframes in which a particular small cell radio can expect lower interference from one or more neighboring small cell radios; a value for a fraction of resources that can be scheduled in the second type of subframes for a fractional frequency reuse (FFR) portion of one or more subframes associated with the second type of subframes in which a particular small cell radio can expect lower interference from one or more neighboring small cell radios; and a value for a fraction of resources that can be scheduled in both the first type of subframes and the second type of subframes for a fractional frequency reuse (FFR) portion of one or more subframes associated with both the first subframe type and the second subframe type in which a particular small cell radio can expect lower interference from one or more neighboring small cell radios.

In still some instances, the resource allocation parameters can include: a first power level that can be assigned to resources to be transmitted in a reuse one frequency portion for one or more subframes associated with either the first type of subframes or the second type of subframes; a second power level that can be assigned to resources to be transmitted in a first fractional frequency reuse (FFR) portion of one or more subframes associated with either the first type of subframes or the second type of subframes; and a third power level that can be assigned to resources to be transmitted in a second FFR portion of one or more subframes associated with either the first type of subframes or the second type of subframes, wherein for the second FFR portion a particular small cell radio can expect lower interference from one or more neighboring small cell radios.

A system is provided in one example embodiment and can include a server including at least one first memory element for storing first data and at least one first processor that executes instructions associated with the first data; and a plurality of small cell radios. The server can be adapted when executed by the at least one first processor to: receive performance metric information from the plurality of small cell radios, wherein the performance metric information for each of a small cell radio of the plurality of small cell radios includes, at least in part, a first number of user equipment that are to be scheduled on a first type of subframes and a second number of UE that are to be scheduled on a second type of subframes; and determine resource allocation parameters for the plurality of small cell radios based, at least in part on the performance metric information.

The plurality of small cell radios can each further include at least one second memory element for storing second data and at least one second processor that executes instructions associated with the second data. Two or more small cell radios can each be adapted when executed by their corresponding at least one second processor to: exchange interference information between the two or more small cell radios, wherein the interference information can include, at least in part, an indication of whether a particular small cell radio is interfering with another small cell radio of the two or more small cell radios and an indication of the particular small cell radio is interfered by another small cell radio of the two or more small cell radios; and schedule downlink resource transmissions on the first type of subframes and the second type of subframes for user equipment served by the two or more small cell radios based, at least in part, on the resource allocation parameters and the interference information exchanged between the two or more small cell radios.

Another method is provided in another example embodiment and can include setting a performance metric threshold associated with performance of user equipment (UE) served by a plurality of small cell radios; determining, by each of the plurality of small cell radios, one or more restriction sets, wherein each restriction set identifies one or more UE that are not to be scheduled on a particular set of resources associated for a particular restriction set; and calculating a number of UE that are to be scheduled across a first type of subframes and a second type of subframes based on a number of UEs belonging to each of the one or more restriction sets. The first type of subframes and the second type of subframes are one of: an almost blank subframe (ABS) type of subframes; and a non-almost blank subframe (non-ABS) type of subframes.

In some instances, the performance metric threshold can be associated with one of: a signal-to-interference-plus-noise (SINR) threshold; and an average spectral efficiency threshold. In other instances, the performance metric threshold can be associated with one of: a quality of service (QoS) threshold; a throughput rate threshold; and a packet delay threshold.

In some cases, for example for a particular small cell radio, the determining can further include comparing a predicted performance for a particular UE served by the small cell radio for each of one or more resource sets; and adding the particular to a restriction set for a particular resource set if the predicted performance for the particular UE is less than the performance metric threshold.

In some cases, the method can further include calculating an expected utility of UE performance for each of a plurality of candidate performance metric thresholds; searching the calculated expected utilities to determine a maximum expected utility and particular candidate performance metric threshold associated with the maximum expected utility; and setting the performance metric threshold equal to the particular candidate performance metric threshold.

In some cases, for example for a particular small cell radio, the method can further include measuring quality of service (QoS) for a plurality of first UEs served by the particular small cell radio that belong to a particular restriction set; measuring quality of service (QoS) for a plurality of second UEs served by the particular small cell radio that do not belong to the particular restriction set; comparing quality of service (QoS) performance for the plurality of first UEs to the performance metric threshold to determine if the QoS performance for the plurality of first UEs is adequate, wherein the performance metric threshold is associated with a QoS performance metric threshold; and if the QoS performance for the plurality of first UEs is not adequate, reducing the performance metric threshold.

In some instances, if the QoS performance for the plurality of first UEs is adequate, comparing the QoS performance for the plurality of second UEs to the performance metric threshold to determine if the QoS performance for the plurality of second UEs is adequate; and if the QoS performance for the plurality of second UEs is not adequate, increasing the performance metric threshold.

Example Embodiments

Referring now to FIG. 1A, FIG. 1A is a simplified block diagram of a communication system 100 for downlink resource allocation in a frequency and time domain ICIC cellular network in accordance with one embodiment of the present disclosure. In various embodiments, the particular architecture illustrated in FIG. 1A may be tied to the 3rd Generation Partnership Project (3GPP) Evolved Universal Mobile Telecommunications System (UMTS) Terrestrial radio access network (E-UTRAN) architecture, which can interface with a Long Term Evolution (LTE) Evolved Packet System (EPS) core. Alternatively, the depicted architecture may be applicable to other environments equally.

The example architecture of communication system 100 can include a first small cell radio (Small Cell 1) 112a having a first small cell coverage area 114a, a second small cell radio (Small Cell 2) 112b having a second small cell coverage area 114b, a third small cell radio (Small Cell 3) 112c having a third small cell coverage area 114c and a macro cell radio 120 having a macro cell coverage area 122. Communication system 100 can also include a server 118 in communication with each small cell radio 112a-112c and macro cell radio 120.

First small cell radio 112a may include users operating user equipment (UE) 116a-116b located within first small cell coverage area 114a served by first small cell radio 112a. Second small cell radio 112b can include users operating UE 116c-116d located within second small cell coverage area 114b served by second small cell radio 112b. Third small cell radio 112c can include users operating UE 116e-116f located within third small cell coverage area 114c served by third small cell radio 112c. Macro cell radio 120 can include users operating UE 116g-116h located within macro cell coverage area 122 served by macro cell radio 120. UE 116g-116h may be outside the first, second and third small cell coverage areas 114a-114c.

First small cell coverage area 114a, second small cell coverage area 114b, and third small cell coverage area 114c are representative of a geographic area for which first small cell radio 112a, second small cell radio 112b, and third small cell radio 112c, respectively, can effectively provide service for a small cell network to user equipment located therein. Similarly, macro cell coverage area 122 is representative of a geographic area for which macro cell radio 120 can effectively provide service of a macro cell network to user equipment located therein, which may not be within a coverage area of a given small cell network (e.g., any of coverage areas 114a-114c for small cell radios 112a-112c).

The coverage areas shown in FIG. 1A are provided for illustrative purposes only, and are not meant to limit the broad scope of the teachings of the present disclosure. Any other coverage areas can be provided for cell radios (macro or small cell) within the scope of the present disclosure. In various embodiments, small cell radios 112a-112c can be deployed as LTE Home evolved Node Bs (HeNBs) and macro cell radio 120 can be deployed as an LTE evolved NodeB (eNodeB). In other embodiments, small cell radios 112a-112c can be deployed as any suitable small cell radio (e.g., Home Node B (HNB) for 3G deployments) and macro cell radio 120 can be deployed as any suitable macro cell radio (e.g., Node B (NodeB) for 3G deployments). In general, small cell network cell radios differ from macro cell network cell radios in terms of coverage area. Typically, small cell network cell radios operate at lower power levels as compared to macro cell network cell radios in order to provide coverage in a business or residential environment (e.g., within a building, home, etc.) where coverage from macro cell radios may be limited due to interference from walls, roofs, etc. In various embodiments, each of small cell radios 112a-112c and macro cell radio 120 can include one or transmitters and/or receivers (e.g., transceivers) and one or more antenna(s) to facilitate wireless, over-the-air (OTA) communications with one or more UE 116a-116h.

As referred to herein in this Specification, the terms 'cell radio' and 'cell', whether referring to macro or small cell networks can be used interchangeably. In various embodiments, the architecture of communication system 100 may represent a Heterogeneous Network (HetNet) in which a small cell network (e.g., including small cell radios 112a-112c) is overlaid by a macro cell network (e.g., including macro cell radio 120) such that cell coverage areas, UE resources, handovers, etc. can be coordinated between the parallel network layers to optimize network throughput and/or spectral efficiency for communication system 100.

Communication system 100 may represent a series of points or nodes of interconnected communication paths for receiving and transmitting packets of information that propagate through communication system 100. In various embodiments, server 118 can be an element or node internal or external to an evolved packet core (EPC) network which may include one or more of a serving General Packet Radio Service (GPRS) support node (SGSN)/mobile management entity (MME), a home subscriber server (HSS), a serving gateway (SGW), a packet data network (PDN) gateway (PGW), a policy and charging rules function (PCRF), and one or more packet networks as defined according to 3GPP standards, in order to provide services (e.g., voice, data, multimedia, etc.) and interconnectivity to UE 116a-116h to one or more PDNs (e.g., the Internet).

In various embodiments, server 118 can be configured as any central management entity that may coordinate resource allocation for small cell radios 112a-112c for UE served by the small cell radios. For example, in various embodiments server 118 can be configured an Operations, Administration and Maintenance (OAM) entity, a Radio Management System (RMS), a Radio Resource Manager (RRM), a Self-Organizing Network (SON) management system, combinations thereof or the like. In certain embodiments, an RMS can be used in conjunction with small cell deployments, for example, to configure small cell radios 112a-112c according to a particular communications protocol (e.g., technical report (TR) 069) and data model (e.g., TR-196 version 2). In certain embodiments, a SON management system can have visibility of one or more parallel networks such as, for example, a macro cell network, a small cell network, a wireless local area network (WLAN) and can be used to coordinate resources for different UE among co-deployed parallel networks (e.g., having overlapping or neighboring coverage areas for different technologies).

In essence, a SON management system (e.g., server 118 configured as a SON management system) may provide a system-wide view of communication system 100 and can therefore intelligently provision resources among different communication networks in the communication system. Accordingly, server 118 can be configured to interface with any element or node of communication system 100 via one or more logical interfaces. In various embodiments, server 118 can be deployed within an EPC, within cloud-based service (e.g., in a centralized SON (cSON) architecture) and/or can be deployed in a service network for a particular deployment, such as, for example, in an enterprise small cell deployment.

Communication system 100 may offer communicative interfaces between UE 116a-116h and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Network traffic can be sent and received according to any suitable communication messaging protocols. Suitable communication messaging protocols can include a multi-layered scheme such as the Open Systems Interconnection (OSI) Model, or any derivations or variants thereof. Communication system 100 may implement a user datagram protocol (UDP)/Internet protocol (UDP/IP) connection and use a transmission control protocol (TCP/IP) communication language protocol in particular embodiments of the present disclosure. However, communication system 100 may alternatively implement any other suitable communication protocol for transmitting and receiving data packets within communication system 100. A packet is a formatted unit of data, and can contain both control information (e.g., source and destination addresses, etc.) and data, which is also known as payload. The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Small cell radios 112a-112c can be logically connected to each other (e.g., to adjacent small cell radios) via an X2 interface, as defined in 3GPP standards. In various embodiments, interfaces (e.g., the X2 interfaces) and/or a series of interfaces can be provided in communication system 100, which can offer mobility, policy control, interference mitigation, etc. for various elements of communication system 100. For example, interfaces can be used to exchange point of attachment, location, and/or access data for one or more end users, for example, users operating UE 116a-116h. In various embodiments, resource information, accounting information, location information, access network information, network address translation (NAT) control, etc. can be exchanged using a remote authentication dial in user service (RADIUS) protocol or any other suitable protocol where appropriate. Other protocols that can be used in communication system 100 can include DIAMETER protocol, service gateway interface (SGi), terminal access controller access-control system (TACACS), TACACS+, etc. to facilitate communications. In some embodiments, one or more of small cell radios 112a-112c can be logically connected to macro cell radio 120 via respective X2 interfaces. An X2 interface is illustrated in FIG. 1A between small cell radio 112b and macro cell radio 120 according to one embodiment of the present disclosure; however, it should be understood that any of one or more of small cell radio(s) 112a-112c can have an X2 interface with macro cell radio 120.

In various embodiments, UE 116a-116h can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 100. UE 116a-116h may also be inclusive of a suitable interface to a human user such as a microphone, a display, a keyboard, or other terminal equipment.

UE 116a-116h may also be any device that seeks to initiate a communication on behalf of another entity or element such as a program, a database, or any other component, device, element, or object capable of initiating an exchange within communication system 100. Data, as used herein in this Specification, can refer to any type of numeric, voice, video, media, or script data, or any type of source or object code, or any other suitable information in any appropriate format that may be communicated from one point to another. In certain embodiments, UE 116a-116h may have a bundled subscription for network access and application services (e.g., voice), etc. Once the access session is established, the user can register for application services as well, without additional authentication requirements. UE IP addresses can be assigned using dynamic host configuration protocol (DHCP), Stateless Address Auto-configuration, default bearer activation, etc., or any suitable variation thereof. In various embodiments, each UE 116a-116h can include one or transmitters and/or receivers (e.g., transceivers) and one or more antenna(s) to facilitate wireless, over-the-air (OTA) communications with and/or handover between one or more of small cell radios 112a-112c and/or macro cell radio 120.

In various embodiments, during operation, server 118 is configured to receive feedback from each of first small cell radio 112a, second small cell radio 112b, and third small cell radio 112c, to determine how resources should be allocated between first small cell radio 112a, second small cell 112b, and third small cell radio 112c for UE served by the respective small cell radios based upon the feedback received from small cell radios 112a-112c. In some embodiments, server 118 is also configured to interface with macro cell radio 120 in order to gather Almost Blank Subframe (ABS) patterns and/or frequency domain ICIC information determined by macro cell radio 120 for one or more UE (e.g., UE 116g-116h) served by the macro cell radio.

In one or more embodiments, server 118 is further configured to provide resource allocation parameters to first small cell radio 112a, second small cell radio 112b, and third small cell radio 112c. In some embodiments, server 118 can also provide small cell radios 112a-112c the ABS patterns and/or frequency domain ICIC information that server 118 may gather from macro cell radio 120. In other embodiments, one or more small cell radios 112a-112c may interface with macro cell radio 120 via a respective X2 interface to gather the ABS patterns and/or frequency domain ICIC information from macro cell radio 120 and the information may be exchanged among small cell radios 112a-112c via X2 interfaces interconnecting the small cell radios. In some embodiments, a given small cell radio (e.g., small cell radio 112b) may act as a UE in order to decode an ABS pattern of macro cell radio. In some cases, only one small cell radio within a group of small cell radios may need to decode the ABS pattern for a neighboring macro cell radio. For example, in some embodiments, a given small cell radio that may sense a strongest transmission signal from a given macro cell radio may be chosen among a group of small cell radios to decode the ABS pattern of the macro cell radio using network listen techniques to sense OTA transmissions from the macro cell radio. Alternatively, in some embodiments, macro cell ABS patterns can be determined using X2 messages such as using relative narrow-band transmit power (RNTP) messages with a given macro cell radio or using RNTP messages exchanged with server 118.

In at least one embodiment, it is assumed that small cell radios 112a-112c are synchronized to macro cell radio 120 within a tolerance of a fraction of a subframe (e.g., 1 millisecond (msec) subframes for LTE architectures). In one or more embodiments, first small cell radio 112a, second small cell radio 112b, and third small cell radio 112c can allocate resources for UE within their respective coverage areas 114a-114c using reuse one and fractional frequency reuse (FFR) portions of available system bandwidth based on the resource allocation parameters received from server 118 and the ABS patterns and/or frequency domain ICIC associated with macro cell radio 120. Thus, in one or more embodiments, communication system 100 may facilitate resource allocation using frequency and time domain ICIC among small cell radios 112a-112c and macro cell radio 120 as will be further described herein.

Before detailing some of the operational aspects of FIG. 1A, it is important to understand different scenarios involving ICIC in a cellular network. The following foundation is offered earnestly for teaching purposes only and, therefore should not be construed in any way to limit the broad teachings of the present disclosure.

To overcome the effect of multipath fading problem present in a Universal Mobile Telecommunications System (UMTS), LTE architectures implement Orthogonal Frequency Division Multiplexing (OFDM) for downlink communications from a given cell radio to the UE served thereby to transmit downlink resources or data over many narrow band carriers of 180 KHz instead of spreading one signal over the entire available system bandwidth. OFDM is a frequency-division multiplexing (FDM) scheme used as a digital multi-carrier modulation method that meets LTE requirements for spectrum flexibility and enables cost-efficient solutions for very wide carriers with high peak rates. OFDM can use a large number of narrow sub-carriers for multi-carrier transmission to carry data for UEs. Thus, the basic LTE physical downlink resource can be represented as a time-frequency grid in which the OFDM symbols are grouped into resource blocks (RBs).

In LTE architectures, a given serving cell radio can schedule downlink transmissions for UE served thereby by scheduling physical resource blocks, generally referred to as resource blocks (RBs), that are to be transmitted to the UE using a Physical Downlink Shared Channel (PDSCH). Each UE served by the cell radio can receive and decode their own particular the RBs received via the PDSCH according to various control information that can be communicated to the UEs via the Physical Downlink Control Channel (PDCCH) transmitted by the serving cell radio.

An RB, as defined in 3GPP technical specification (TS) 36.211, is typically represented by a number of resource elements, each of which can be allocated within a symbol, for each of a particular sub-carrier (e.g., frequency). The time span for transmitting an RB can generally be referred to as a 'slot' spanning 0.5 milliseconds (msec) of a 1 msec subframe. Thus, each 1 msec subframe consists of two RBs. The smallest unit of an RB is a resource element, which represents one sub-carrier by one symbol. Thus, a RB can be schematically represented as spanning a frequency portion of system bandwidth (e.g., depending on the number of sub-carriers in the RB) across a span of time (e.g., 0.5 msec) for each symbol included in the RB. For LTE, the number of sub-carriers for an RB is 12, each spanning a 15 kilohertz (15 KHz subcarrier bandwidth), thus each RB represents a 180 KHz portion of system bandwidth. Typically, each 180 KHz portion of system bandwidth is referred to as a narrow band carrier.

Referring to FIG. 1B, FIG. 1B is a simplified schematic diagram illustrating an example time-frequency grid 150 for a first example downlink RB 160*a* and a second example downlink RB 160*b* that can be used for downlink transmissions by one or more cell radios. Downlink RB 160*a* represents a first 0.5 msec slot 164*a* and downlink RB 160*b* represents a second consecutive 0.5 msec slot 164*b* of a 1 msec subframe 166. Each downlink RB 160*a*, 160*b* includes a number of symbols 167 spread across a number of sub-carriers 168. As noted, the number of subcarriers 168 is typically twelve (12) for LTE. In various embodiments, the number of symbols 167 can depend on the cyclic prefix type for uplink transmissions (e.g., twelve (12) symbols for normal cyclic prefix or 14 for symbols for extended cyclic prefix). As noted, the smallest unit of a RB is a resource element, shown in FIG. 1B as resource element 170, which represents one subcarrier 168 by one symbol 167. In the case of normal cyclic prefix, there are 84 resource elements per downlink RB (e.g., 12 symbols×7 subcarriers=84 resource elements).

Referring to FIG. 1C, FIG. 1C is a simplified schematic diagram illustrating an example time-frequency grid 180 for a number of resource blocks 182 that can be used for downlink transmissions by one or more cell radios. Resource blocks 172 can span across narrow band carriers 174 of the available frequency spectrum for a given system bandwidth 176 in which resource blocks 172 may be transmitted via downlink transmissions by cell radios to UE served thereby for across a number of transmission time intervals (e.g., 1 msec subframes).

As system bandwidth can vary for LTE architectures, such as, for example, between 1.25 megahertz (MHz) and 20 MHz, the number of available RBs that can be scheduled or allocated across UEs served by a cell radio for a given time span can vary, respectively, between 6 and 100 RBs. Typically, a 10 MHz bandwidth corresponds to 50 available RBs that can be allocated to UEs served by a particular cell radio. Each UE served by a given cell radio is allocated a number of the RBs in the time-frequency grid. Generally, the more RBs a UE is allocated and the higher the modulation order used in transmitting the RBs results in a higher achievable bit-rate or throughput rate for the UE. Which RBs and how many each UE is allocated at a given point in time depends upon frequency and time scheduling mechanisms for the cellular network. As referred to herein in this Specification, RBs can be generally referred to as 'resources'.

In efforts to increase system capacity and spectral efficiency, 3GPP standards have introduced several techniques to implement ICIC in cellular networks. 3GPP Release 8 and Release 9 introduced frequency domain ICIC techniques such as FFR to enable ICIC in a cellular network in order to mitigate interference between neighboring cell radios. Typically, FFR is implemented in a homogenous network (e.g., consisting only of small cell radios or only of macro cell radios). A basic tenet of FFR is to partition a cell radio's bandwidth for resource (e.g., RB) allocation so that cell edge UE served by neighboring cell radios do not interfere with each other and that the interference received by (and created by) cell interior UEs is reduced.

The use of FFR to mitigate interference for cellular network represents a tradeoff between providing improvements in throughput rate and coverage area for cell edge UE while balancing the sum total network throughput rate and spectral efficiency for all UEs served in the cellular network. In general, the sum total network throughput rate for a cellular network can be referred to as the overall 'utility' for the network. Different types of network utilities can be optimized for a cellular network depending on the desires of a network operator or service provider, as will be discussed in further detail herein.

Generally, FFR is a compromise between hard and soft frequency reuse. Hard frequency reuse splits the system bandwidth into a number of distinct subbands according to a chosen reuse factor and allows neighbor cell radios to transmit UE resources on different subbands. FFR typically splits the available system bandwidth into inner and outer portions and allocates an inner portion to the UEs located near cell radios in a network (in terms of path loss between the UEs and their corresponding serving cell radios) having reduced power and applying frequency reuse factor of one, e.g., the inner portion is completely reused by all cell radios in the network.

Typically, UEs located in close proximity (in terms of path loss) to a cell radio are referred to as 'cell interior' UEs. In one embodiment, UE 116*b* may be a cell interior UE served by small cell radio 112*a*. For the UEs close to the edges of cell radio coverage areas, generally referred to as 'cell edge' UEs, a fraction of the outer portion of the bandwidth is dedicated with a frequency reuse factor greater than one. The FFR portion of system bandwidth is typically used to serve UEs at cell coverage area edges. With soft frequency reuse the overall bandwidth is shared by all cell radios (i.e., a reuse factor of one is applied) but for the transmission on each sub-carrier, the cell radios are restricted to a particular power bound.

There are two common FFR models: strict FFR and Soft Frequency Reuse (SFR). Strict FFR is a modification of the traditional frequency reuse in which exterior frequency subbands are not shared with inner frequency bands. Soft Frequency Reuse (SFR) employs the same cell-edge bandwidth partitioning strategy as Strict FFR, but the interior UEs are allowed to share subbands with edge UEs in other cells. Accordingly, shared subbands by interior UEs are transmitted at lower power levels than for the cell edge UEs. SFR is more bandwidth efficient than strict FFR, but results in more interference to both cell-interior and edge UEs. Thus, FFR provides various frequency domain ICIC techniques, which can be implemented in order to mitigate inter-cell interference between neighboring cell radios in a cellular network.

Figure 1D:
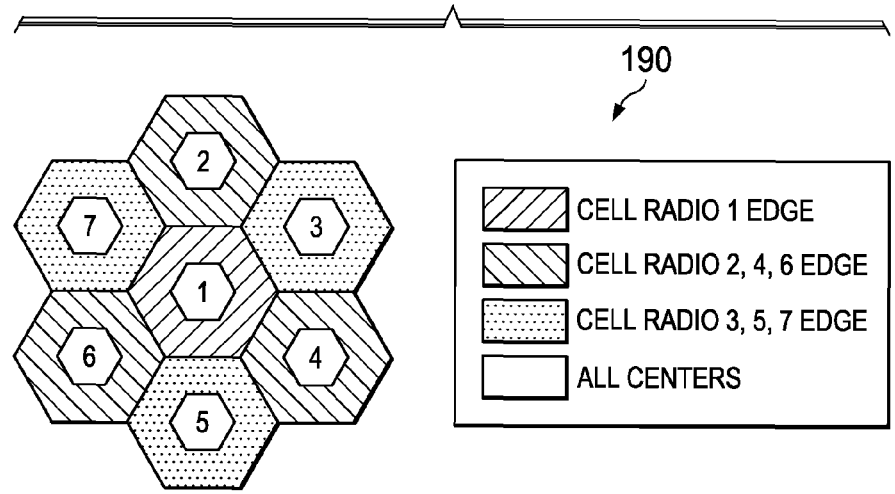
FIGS. 1D-1E are simplified schematic diagrams illustrating example details of an example bandwidth allocation using frequency domain ICIC for a number of example cell radios.
Figure 1E:
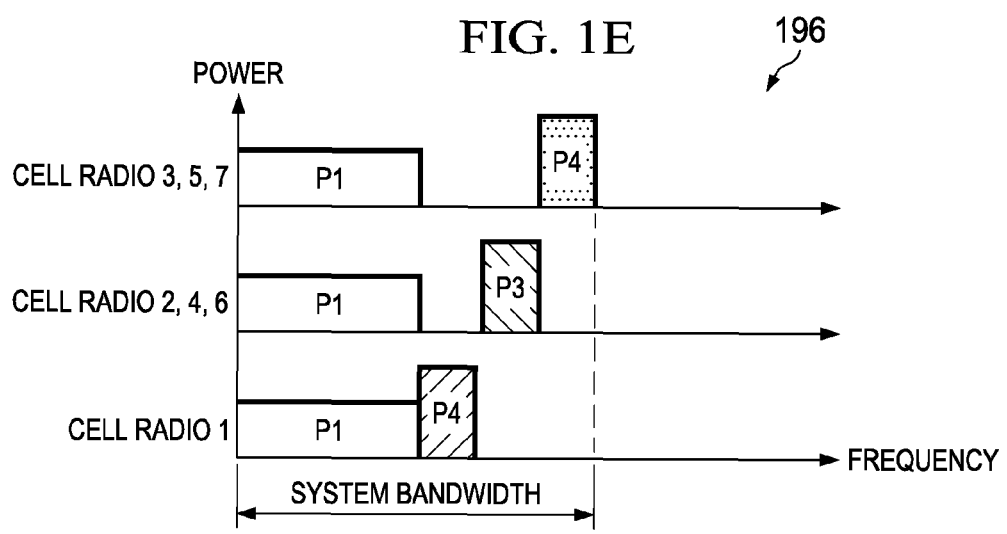

Referring to FIGS. 1D-1E, FIGS. 1D-1E illustrate an example of system bandwidth allocation using fractional frequency reuse (FFR) for a number of example cell radios. In the example of FIGS. 1D-1E, seven (7) example cell radios are arranged in a hexagonal configuration 190 with Cell Radio 1 in the center and surrounded by Cell Radios 2-7 numbered in a clockwise pattern in which strict FFR having a reuse of three (3) is employed for cell edge UEs. In the example illustrated in FIGS. 1D-1E, a power allocation scheme 196 is shown in which the inner portion of each Cell Radio 1-8 is allocated a first frequency portion of the total system bandwidth at a particular power level P1. In the example illustrated in FIGS. 1D-1E, the edges of Cell Radio 1 are allocated a second frequency portion of the total system bandwidth at a power level P2, the edges of Cell Radios 2, 4, and 6 are allocated a third frequency portion of the total bandwidth at a power level $P_3$, and the edges of Cell Radios 3, 5, and 7 are allocated a fourth frequency portion of the total system bandwidth at a power level $P_4$.

3GPP Release 10 introduced time domain ICIC techniques to provide enhanced ICIC (eICIC) in cellular networks in order to mitigate interference for Heterogeneous Networks (HetNets) in which parallel networks (e.g., small cell networks and macro cell networks) are often co-deployed in close proximity. Time domain ICIC techniques incorporate the use of Almost Blank subframes (ABS) and non-ABS subframes for UE resource scheduling, which can be coordinated among cell radios in a given cellular network. For time domain ICIC, small cell radios and macro cell radios can coordinate downlink transmissions to UE served thereby through the use of an ABS pattern, typically determined by a given macro cell radio, in which the macro cell radio may not transmit data traffic to UE served thereby on ABS subframes and any control traffic may be of such a low power as to not interfere with UE served by neighboring small cell radios. Neighboring small cell radios can schedule downlink transmissions to UE served thereby during the ABS subframes of neighboring macro cell radios. The ABS patterns of macro cell radios can be shared or gathers using a variety of techniques, as described herein.

Current ICIC solutions to determine the FFR scheme used at small cells do not distinguish between interference caused to UEs associated to small cells by neighboring small cells or macro cells. Specifically, they do not take into account the number of ABS subframes implemented at a macro cell in the vicinity and the amount of interference caused by macro cells to small cell associated UE on non-ABS subframes. Without taking this into account, the resulting FFR scheme at the small cells can be very suboptimal leading to loss in capacity.

Further, current solutions that seek to mitigate interference for a small cell network via frequency domain ICIC techniques also often apply the same frequency domain power profile to both ABS and non-ABS subframes. This leads to suboptimal performance since the interference caused by neighboring small cells to UEs scheduled at a small cell on ABS and non-ABS subframes can be significantly different. Note that typically the UE scheduled ABS subframes are ones for which interference caused by macro cells is high while UEs scheduled in non-ABS subframes are the ones for which macro cell interference is not high.

Referring again to FIG. 1A, in accordance with one embodiment, communication system 100 can overcome and provide improvements over the aforementioned problems (and others) by facilitating frequency and time domain ICIC for a small cell network in the presence of one or more macro cell radios serving ABS and non-ABS subframes to one or more macro cell UE through coordination of resource allocation and power level allocation for both ABS and non-ABS subframes. One or more embodiments described herein are directed to determining a number of resource blocks (RBs) to be allocated and scheduled in a reuse one portion and a number of resource blocks (RBs) to be allocated and scheduled in a FFR portion of available system bandwidth for ABS subframes and non-ABS subframes for a given set of power levels based upon information collected from cell radios 112a-112c in a centralized manner.

During operation, in at least one embodiment, each of small cell radios 112a-112c may collect information obtained from one or more UEs served thereby, such as path loss or interference information for a given serving small cell radio, one or more interfering neighbor small cell radio(s) and/or an interfering neighboring macro cell radio (if measurable), and may provide performance metric feedback to server 118 based on the collected information.

In at least one embodiment, based on the performance metric feedback received from small cell radios 112a-112c, server 118 computes resource allocation parameters and sends the resource allocation parameters to small cell radios 112a-112c. In various embodiments, the resource allocation parameters can include one or more of: a fraction of resources (e.g., RBs) that are to be allocated by small cell radios 112a-112c in the FFR portion of the system bandwidth for ABS subframes and non-ABS subframes; a fraction of resources in which a small cell radio can expect higher signal-to-interference-plus-noise ratio (SINR) in the FFR portion of the system bandwidth; a number of neighbors to coordinate with for ABS and/or non-ABS subframes (e.g., sometimes these can be different, as discussed in further detail herein); and relative power levels for FFR and reuse one portions of the system bandwidth and may send the resource allocation parameters to each of small cell radios 112a-112c. In some embodiments, one or more scheduling performance metric threshold(s) can be included in the resource allocation parameters. As discussed in further detail herein, the scheduling performance metric threshold(s) can be used by small cell radios 112a-112c, in some embodiments, to determine a number of UEs that are to be scheduled in ABS and non-ABS subframes.

In various embodiments, computations involving resource allocation parameters and/or performance metrics can be associated with signal strength information, such as, for example, UE SINR, which can include, for example, an actual SINR achieved by a certain UE or an expected SINR that a particular UE can be expected to attain for downlink transmissions from a given serving cell radio. In various embodiments, SINR, or more generically, signal strength information, for a given UE (e.g., any of UE 116a-116f served by small cell radios 112a-112c) for an LTE deployment can be determined based on one or more of: a Reference Signal Received Quality (RSRQ) as measured by the UE for the Evolved-Universal Terrestrial Radio Access (E-UTRA), a channel quality indicator (CQI) reported by the UE, relative Reference Signal Received Power (RSRP), received signal strength for an uplink transmission of a given UE divided by the total interference in a cell (e.g., in the coverage area covered by a given cell radio) and/or assigned resource block power. Typically, E-UTRA is described in reference to the air-interface for LTE radio access. As defined in 3GPP TS 36.214, RSRP is the linear average over the power contributions of resource elements (e.g., within RBs) that carry cell-specific reference signals (CRS) within a considered measurement frequency bandwidth. RSRQ is defined as the ratio of the number (X) of RBs of the E-UTRA carrier received signal strength indicator (RSSI) measurement bandwidth (e.g., system bandwidth) multiplied by the RSRP divided by the RSSI, generally expressed as 'X*RSRP/RSSI'.

In general, UE can measure signal strength information such as, for example, RSRP and/or RSRQ for a serving cell radio and/or non-serving cells (e.g., neighboring cells), if enabled. In certain embodiments, RSRP and/or RSRQ measurements for neighboring cells can be enabled for UE served by small cell radios 112a-112c. As used herein the terms 'relative RSRP' and 'relative interference' of a given cell radio can be used interchangeably and can refer to a serving small cell radio RSRP as measured by a given UE served by the small cell radio subtracted from a neighboring cell radio RSRP (e.g., small and/or macro cell radio) as measured by the UE.

It should be noted that any UE signal strength information can be used within the scope of the present disclosure for computations associated with performance metrics and/or resource allocation parameters. In at least one embodiment, for example, for a 3G deployment, signal strength information can include Common Pilot Channel (CPICH) energy per chip to total PSD at the UE antenna (Ec/Io) and/or CPICH Received Signal Code Power (RSCP) as defined in 3GPP standards. In another embodiment, for example, for a WiFi deployment, signal strength information can include Received Signal Strength Indicator (RSSI), Received Channel Power Indicator (RCM), combinations thereof, or other similar signal strength information. Accordingly, although many of the example embodiments discussed herein are described with reference to RSRP and/or RSRQ signal strength information, it should be understood that signal strength information as discussed for the various embodiments described herein can cover a multitude of access network types including both 3GPP and non-3GPP access networks.

In certain embodiments, a channel quality indicator (CQI) reported by a UE can be used to determine downlink SINR by using the CQI reported for a given UE as a proxy for determining the downlink SINR. Generally, the CQI reported by a UE can be related to the Modulation and Coding Scheme (MCS) at which the cell radio to which the UE is connected needs to transmit packets to the UE such that the UE will receive packets at a 10% Block Error Rate (BLER). If an Average White Gaussian Noise (AWGN) channel is assumed for the UE, an SINR can be determined that will lead to a 10% BLER based on the MCS chosen by the cell radio for downlink transmissions to the UE via the Physical Downlink Shared Channel (PDSCH), which carries data transport blocks (e.g., RBs) to the UE.

Generally, each MCS from which a given cell radio can choose for downlink transmissions can be mapped to one or more SINR values or a range of SINR values, thereby enabling SINR determinations based on the MCS chosen for downlink transmissions. Although UE manufacturers often implement different receivers, etc. for their equipment, which can lead to non-one-to-one MCS to SINR mappings, CQI can be used to determine an approximate SINR for a given UE based on the assumption that, as SINR increases for a UE, CQI can also increase because the UE can decode higher order modulation schemes while staying within the 10% BLER threshold. It should be understood that, under an assumption of uplink and downlink symmetry for a given UE, uplink or downlink SINR can be used for various embodiments described herein.

Upon receiving, via the resource allocation parameters, the fraction of resources that can be allocated within the reuse one and FFR portions of system bandwidth for ABS and non-ABS subframes, each of the small cell radios 112a-112c can determine the set of resources to allocate to each of the FFR portion and the reuse one portion for UEs served by that cell. A set is a set of resources in (time, frequency) with similar SINR, and hence similar MCS assignment for a given UE. Thus, each small cell radio 112a-112c can determine UE scheduling across six (6) sets of resources: (1) a set of reuse one RBs in ABS subframes; (2) a set of FFR RBs with low SINR in ABS subframes; (3) a set of FFR RBs with high SINR in ABS subframes; (4) a set of reuse one RBs in non-ABS subframes; (5) a set of FFR RBs with low SINR in ABS subframes; and (6) a set of FFR RBs with high SINR in non-ABS subframes.

Based upon other received resource allocation parameters, neighboring small cell radios 112a-112c can also exchange information with one another to determine the power allocation for specific resources (e.g., RBs) in which a cell radio will set a higher or lower power allocation for each RB. In particular embodiments, the power allocation for each RB can be measured as the power spectral density (PSD) for each RB. Accordingly, for a given set of power levels among neighboring small cell radios and a serving small cell radio, the spectral density that can be supported for each UE on each set of RBs can be determined.

As noted, the FFR portion of system bandwidth is typically used to serve cell edge UEs served by small cell radios. However, the cost of allocating resources in the FFR portion is that the number of resources available to serve cell interior UEs, typically allocated resources in the reuse one portion of the system bandwidth, is reduced. Still, UEs at the boundaries of neighboring cells will still gain an increase in performance because the signal-to-noise ratio (SNR) increases even though resources are reduced. Accordingly, the net change in capacity is positive for UEs near the edge of a cell.

In a particular embodiment, the determination of whether a given RB should have an increased or decreased power can be determined through an X2 exchange of RNTP messages exchanged between small cell radios 112a-112c. For example, if a given small cell radio indicates that it desires to increase its power for a certain frequency of RBs to be scheduled in the FFR portion of the system bandwidth (for either non-ABS or ABS subframes), then a neighboring small cell radio will reduce its power in the same frequency spectrum (e.g., for a corresponding non-ABS subframe or ABS subframe) but will have a higher power of transmission in another frequency spectrum of the FFR portion. Accordingly, in the FFR portion of system bandwidth, one small cell radio may increase its power on one part of the FFR spectrum and neighboring cells may reduce their power on the same part of the FFR spectrum.

In various embodiments, determinations by small cell radios 112a-112c regarding the number of RBs for reuse one and FFR portions of the system bandwidth as well as the power per RB for the reuse one and FFR portions can be performed for both ABS and non-ABS subframes to provide for both frequency and time domain ICIC for resource allocation among small cell radios 112a-112c in the presence of ABS and non-ABS subframes served by neighboring macro cell radio 120. In some embodiments, server 118 can compute different relative power levels for reuse one and FFR portions of system bandwidth between ABS subframes and non-ABS subframes.

As discussed for various embodiments described herein, different schemes for resource block power allocations can be provided by communication system 100 in order to maximize an effective rate of UEs served by small cell radios 112a-112c according to a given utility function, which can be used to help in determining an optimum allocation of resources across non-ABS subframes and ABS subframes for UE served by the small cell radios 112a-112c. In one embodiment for a first resource block power allocation scheme, referred to herein as a Scheme 1 configuration, a different FFR pattern (e.g., fraction of resource blocks to be allocated in the FFR portion of system bandwidth) can be applied across non-ABS subframes and ABS subframes. In another embodiment for a second resource block power allocation scheme, referred to herein as a Scheme 2 configuration, a same FFR pattern can be applied across non-ABS subframes and ABS subframes. While the first scheme may have higher complexity, it optimizes for the following use case: the statistics interference caused by neighboring small cells to UEs scheduled in ABS and non-ABS subframes can be quite different. For example, in non-ABS subframes, 20% of UEs may suffer from high interference from neighboring small cells while in ABS subframes, only 5% of UEs may suffer from high interference from neighboring small cells. In some embodiments, server 118 can include a Scheme trigger in the resource allocation parameters sent to each small cell radio 112a-112c. The Scheme trigger can cause a configuration of each small cell radio 112a-112c to provide either for resource block allocations that are different between ABS and non-ABS subframes (e.g., a Scheme 1 configuration) or to for resource block allocations that are the same across ABS and non-ABS subframes (e.g., a Scheme 2 configuration).

In one example allocation, if more UEs are located near the edges of cell radio coverage areas, it may be desirable to allocate more resources in the FFR portion of the system bandwidth. In another example allocation, if more of the UEs are located close to the small cell radios that serve them, it may be desirable to allocate more resources in the reuse one portion of the system bandwidth. Accordingly, embodiments of communication system 100 provide a system and method for maximizing network utility in terms of total sum throughput rate for UE served by small cell radios 112a-112c when in the presence of a macro cell radio (e.g., macro cell radio 120) serving both ABS subframes and non-ABS subframes.

Figure 2A:
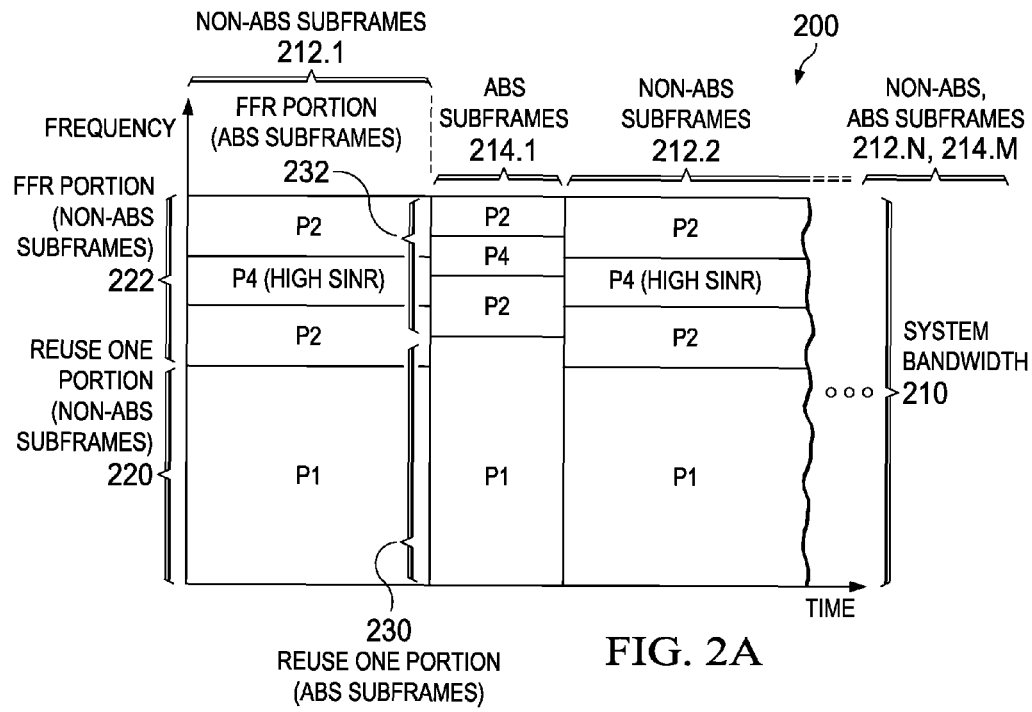
FIG. 2A is a simplified schematic diagram illustrating example details for an example time-frequency grid that can be associated with an example resource block power allocation in accordance with one potential embodiment of the communication system.

Turning to FIG. 2A, FIG. 2A is a simplified schematic diagram illustrating example details for an example time-frequency grid 200 that can be associated with an example resource block power allocation for ABS subframes and non-ABS subframes in accordance with one potential embodiment of communication system 100. In particular, the embodiment of FIG. 2A can be associated with a Scheme 1 configuration corresponding to an allocation of resource block power in which a different FFR pattern can be provided across non-ABS subframes and ABS subframes. In the embodiment of FIG. 2A, three power levels ($P_1$, $P_2$ and $P_4$) are illustrated such that $P_4 \geq P_1 > P_2$. Power levels $P_1$, $P_2$ and $P_4$ represent the power per RB (e.g., PSD) that can be set among RBs allocated across the reuse one portion (e.g., $P_1$) and FFR portions ($P_2$ and $P_4$, collectively) of and available system bandwidth 210. In some embodiments, another power level $P_3$ could be provided for RBs to be scheduled in the reuse one portion, in which cases $P_4$ could be set equal to $P_1$ such that $P_3 > P_1 > P_2$. However, for the remainder of this Specification, resource power levels $P_1$, $P_2$ and $P_4$ will be discussed in order to simplify various notations.

For the Scheme 1 FFR patterns shown in the embodiment of FIG. 2A, a first number of non-ABS subframes 212.1, a first number of ABS subframes 214.1 and a second number of non-ABS subframes 212.2 are illustrated. Note the actual number of subframes present among 212.1, 214.1 and 212.2 is not represented in FIG. 2A for purposes of illustrating other features of communication system 100. It should be understood that resources (e.g., RBs) for non-ABS subframes can be allocated across time from 212.1-212.N for a number of UE served by corresponding cell radios (e.g., small cell and macro cell radios) and ABS subframes can be allocated across time from 214.1-214.M for a number of UE served by corresponding small cell radios 112a-112c (note, N and M can be the same or different integers for a number of non-ABS and ABS subframes, respectively, to be scheduled). For non-ABS subframes 212.1-212.N and ABS subframes 214.1-214.M, power level $P_4$ may represent the power level for the fraction of resources (e.g., RBs) that can be assigned in the FFR portions (222 and 232) of system bandwidth 210 in which a small cell radio can expect a higher SINR (e.g., a lower interference) as compared to other FFR portions of the system bandwidth. Hence, the ratio of resources with high SINR with respect to the total FFR resources will be different in ABS subframes and non-ABS subframes.

As shown in the embodiment of FIG. 2A for Scheme 1 resource block power allocations, non-ABS subframes 212.1, 212.2 can include a reuse one portion 220 and an FFR portion 222 in which a number of RBs can be assigned to UEs served by small cell radios 112a-112c. The reuse one portion 220 for non-ABS subframes 212.1-212.N is shared by all small cell radios 112a-112c and macro cell radio 120 for scheduling downlink resources (e.g., RBs) for UEs served by corresponding cell radios. UEs served by small cell radios 112a-112c on non-ABS subframes 212.1-212.N may either see little overall interference or high small cell interference; macro cell interference is low. On non-ABS subframes 212.1-212.N, small cell UEs that see high small cell interference are served on FFR RBs within FFR portion 222, while small cell UEs with less overall interference are served on reuse one RBs within reuse one portion 220.

ABS subframes 214.1-214.M can include a reuse one portion 230 and an FFR portion 232. For ABS subframes 214.1-214.M, downlink data transmissions for macro cell radio 120 will be silent on both FFR portion 232 and reuse one portion 230. Reuse one portion 230 for ABS subframes is shared by all small cell radios 112a-112c for scheduling resources for UEs served by each small cell radio. Small cell radios 112a-112c can use FFR RBs within FFR portion 232 on ABS subframes 214.1-214.M to serve any associated small cell UEs (e.g., any of UEs 116a-116f) that see high small cell interference in addition to high macro cell interference. Small cell radios 112a-112c can use reuse one RBs within reuse one portion 230 on ABS subframes 214.1-214.M to serve any associated small cell UEs that see only high macro cell interference.

For the Scheme 1 resource block power allocation embodiment shown in FIG. 2A, different RB power allocations can be provided between non-ABS subframes 212.1-212.N and ABS subframes 214.1-214.M such that the reuse one ($P_1$) portions and the FFR portions can have different RB allocations (e.g., a different fraction of RBs can be allocated in the reuse one and FFR portions) between non-ABS subframes 212.1-212.N and ABS subframes 214.1-214.M.

In one or more embodiments for a Scheme 1 configuration, a parameter $\rho_{FFR,nonABS}$ can represent the fraction of RBs in the FFR portion of the spectrum (system bandwidth) for non-ABS subframes, which can be determined by server 118 based upon given power levels and cell feedback; and a parameter $\rho_{FFR,ABS}$ can represent the fraction of RBs in the FFR portion of the spectrum for ABS subframes, which can also be determined by server 118 based upon given power levels and small cell feedback. In one or more embodiments a parameter $\rho_{FFRlow-interf,nonABS}$ can represent the fraction of RBs where a cell radio transmits at power level $P_4$ but a neighboring cell radio transmits at a power level $P_2$ in non-ABS subframes (e.g., the HIGH SINR segment of the FFR portion for non-ABS subframes); and a parameter $\rho_{FFRlow\text{-}interf,ABS}$ can represent the fraction of RBs where a cell radio transmits at a power level $P_4$ but a neighboring cell radio transmits at a power level $P_2$ in ABS subframes (e.g., the HIGH SINR segment of the FFR portion for ABS subframes).

Figure 2B:
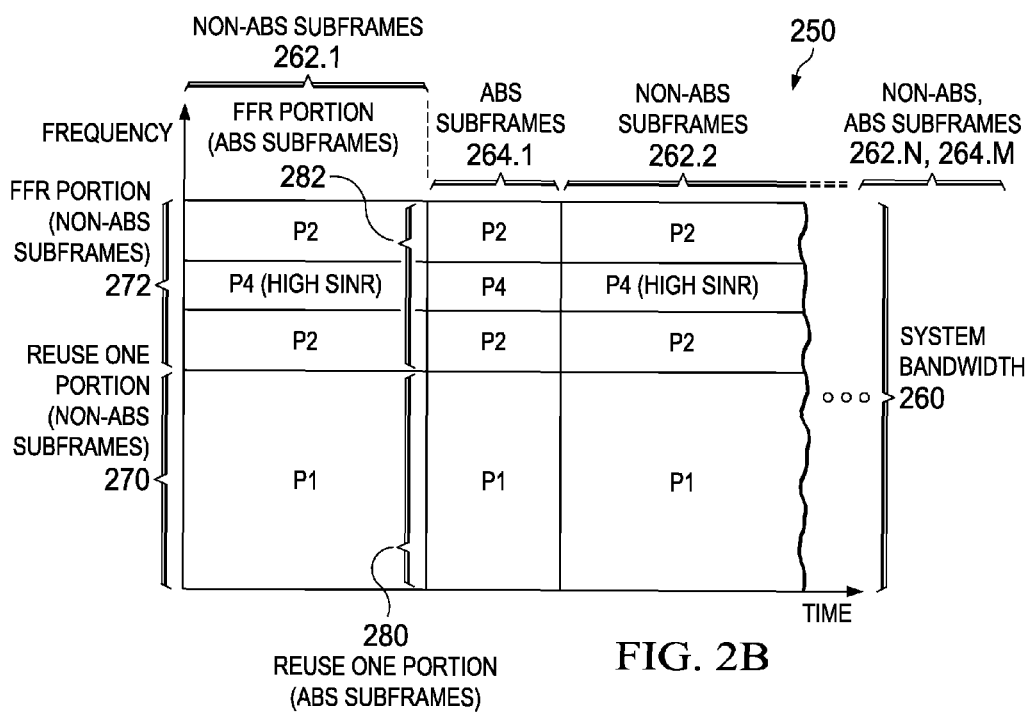
FIG. 2B is a simplified schematic diagram illustrating example details for another example time-frequency grid that can be associated with an example resource block power allocation in accordance with one potential embodiment of the communication system.

Turning to FIG. 2B, FIG. 2B is a simplified schematic diagram illustrating example details for an example time-frequency grid 200 that can be associated with another example resource block power allocation for ABS and non-ABS subframes in accordance with one potential embodiment of communication system 100. In particular, the embodiment of FIG. 2B can be associated with a Scheme 2 configuration corresponding to an allocation of resource block power in which a same FFR pattern can be applied to both non-ABS and ABS subframes. Power levels $P_1$, $P_2$ and $P_4$ can represent the power per RB (e.g., PSD) that can be set among RBs allocated across the reuse one portion (e.g., $P_1$) and FFR portions ($P_2$ and $P_4$, collectively) of an available system bandwidth 260. In the embodiment of FIG. 2B, three power levels ($P_1$, $P_2$ and $P_4$) are illustrated such that $P_4 \geq P_1 > P_2$.

For the Scheme 2 FFR pattern shown in the embodiment of FIG. 2B, a first number of non-ABS subframes 262.1, a first number of ABS subframes 264.1 and a second number of non-ABS subframes 262.2 are illustrated. Note the actual number of subframes present among 262.1, 264.1 and 262.2 is not represented in FIG. 2B for purposes of illustrating other features of communication system 100. It should be understood that resources (e.g., RBs) for non-ABS subframes can be allocated across time from 262.1-262.N for a number of UE served by corresponding cell radios (e.g., small cell and macro cell radios) and ABS subframes can be allocated across time from 264.1-264.M for a number of UE served by corresponding small cell radios 112a-112c (note, N and M can be the same or different integers for a number of non-ABS and ABS subframes, respectively, to be scheduled).

As shown in the embodiment of FIG. 2B for Scheme 2 resource block power allocations, non-ABS subframes 262.1, 262.2 can include a reuse one portion 270 and an FFR portion 272 in which a number of RBs can be assigned to UEs served by small cell radios 112a-112c. The reuse one portion 270 for non-ABS subframes 262.1-262.N is shared by all small cell radios 112a-112c and macro cell radio 120 for scheduling downlink resources (e.g., RBs) for UEs served by corresponding cell radios. UEs served by small cell radios 112a-112c on non-ABS subframes 262.1-262.N may either see little overall interference or high small cell interference; macro cell interference is low. On non-ABS subframes 262.1-262.N, small cell UEs that see high small cell interference are served on FFR RBs within FFR portion 272, while small cell UEs with less overall interference are served on reuse one RBs within reuse one portion 270.

ABS subframes 264.1-264.M can include a reuse one portion 280 and an FFR portion 282. For ABS subframes 264.1-264.M, downlink data transmissions for macro cell radio 120 will be silent on both FFR portion 282 and reuse one portion 280. Reuse one portion 280 for ABS subframes 264.1-264.M is shared by all small cell radios 112a-112c for scheduling resources (e.g., RBs) for UEs served by each small cell radio. Small cell radios 112a-112c can use FFR RBs within FFR portion 282 on ABS subframes 264.1-264.M to serve any associated small cell UEs (e.g., any of UEs 116a-116f) that see high small cell interference in addition to high macro cell interference. Small cell radios 112a-112c can use reuse one RBs within reuse one portion 280 on ABS subframes 264.1-264.M to serve any associated small cell UEs that see only high macro cell interference.

For the Scheme 2 resource block power allocation embodiment shown in FIG. 2B, equal RB power allocations can be provided between non-ABS subframes 262.1-262.N and ABS subframes 264.1-264.M such that the reuse one ($P_1$) portions and FFR portions can be a same size (e.g., a same fraction of RBs can be allocated in the reuse one and FFR portions) between non-ABS subframes 262.1-262.N and ABS subframes 264.1-264.M.

In one or more embodiments for a Scheme 2 configuration, a parameter $\rho_{FFR}$ can represent the fraction of RBs in the FFR portion of the spectrum (system bandwidth) for both non-ABS subframes and ABS subframes, which can be determined by server 118 based upon given power levels and small cell feedback. In one or more embodiments a parameter $\rho_{FFRlow\text{-}interf}$ can represent the fraction of RBs where a cell radio transmits at power level $P_4$ but a neighboring cell radio transmits at a power level $P_2$ for either non-ABS or ABS subframes (e.g., the HIGH SINR segment of the FFR portion for non-ABS or ABS subframes).

During operation in some embodiments for either Scheme 1 or Scheme 2, each of small cell radios 112a-112c can receive UE measurement reports from each UE connected to it, which can be related to downlink power measured by each UE for: (1) its serving small cell radio; (2) any neighboring interfering small cell radio(s); and (3) any neighboring macro cell radios, if measurable. Based on the measurement reports, each of small cell radios can determine performance metrics for a particular cellular network environment and can communicate the performance metrics to server 118.

Based upon the received performance metrics, server 118 can compute resource allocation parameters including one or more of: (1) an optimum fraction of RBs to be allocated by each small cell radio 112a-112c in the FFR portion of the system bandwidth for non-ABS subframes, $\rho_{FFR,nonABS}$, and an optimum fraction of RBs to be allocated by each small cell radio 112a-112c in the FFR portion of the system bandwidth for ABS subframes or one optimum fraction of RBs, $\rho_{FFR}$, to be allocated in both ABS and non-ABS subframes, depending on whether Scheme 1 or Scheme 2 is implemented; (2) a fraction of RBs in which a cell radio can expect higher SINR in the FFR portion of the system bandwidth for non-ABS subframes $\rho_{FFRlow\text{-}interf,nonABS}$ and for ABS subframes $\rho_{FFRlow\text{-}interf,ABS}$ or one fraction of RBs, $\rho_{FFRlow\text{-}interf}$, in which a cell radio can expect higher SINR in the FFR portion for both ABS and non-ABS subframes, depending on whether Scheme 1 or Scheme 2 is implemented; (3) a number of neighbors to coordinate with for non-ABS subframes and to coordinate with for ABS subframes (e.g. if Scheme 1 is implemented); and/or (4) relative power levels for FFR and reuse one portions of the system bandwidth and may send the resource allocation parameters to each of small cell radios 112a-112c. Small cell radios 112a-112c may then exchange messages amongst themselves to determine how specific resources should be allocated to UEs served by each of small cell radios 112a-112c, such as, for example, the specific power allocation for UEs within the reuse one and FFR portions, based upon the indication of the computed fraction of RBs in the FFR portion.

Referring now to FIG. 3, FIG. 3 is a simplified flow diagram illustrating example operations 300 associated with server 118 in one example embodiment of communication system 10. At 302, server 118 receives one or more performance metrics from each of small cell radios 112a-112c. In one or more embodiments, the performance metrics can be associated with transmissions measured by UE from one or more of: a serving small cell radio, neighboring small cell radio(s) and/or a neighboring macro cell radio, if measureable. Thus, in various embodiments, UE served by one or more small cell radios (e.g., UE 116a-116f served by small cell radios 112a-112c) can be enabled to measure transmissions from neighboring cell radios.

In one or more embodiments, each of small cell radios 112a-112c can receive one or more measurement reports from each UE connected to it related to downlink transmission power and can use the measurement reports to compute performance metrics which can be sent to server 118. In general, the performance metrics as determined by a particular small cell radio can relate to the interference caused by a neighboring macro cell radio (e.g., macro cell radio 120) relative to the downlink signal strength for the small cell radio as well as the interference caused by neighboring small cell radios relative to the downlink signal strength for the small cell radio.

In one embodiment, small cell radios 112a-112c can perform substantially all of the computations required to determine the performance metrics. In one embodiment, determining the performance metrics can include solving a utility function in which computations can be performed to characterize UE throughput rates for different possible resource block power allocations that may be realized for resources (e.g., RBs) that are to be allocated and scheduled among small cell radios 112a-112c for UE served thereby for non-ABS subframes and ABS subframes. The characterizations of UE throughput rates can be representative of UE effective rates, which can represent the overall throughput performance associated with all UEs served by each of small cell radios 112a-112c across non-ABS subframes and ABS subframes, which are to be allocated and scheduled by each small cell radio 112a-112c. In various embodiments, a given utility function can be selected (e.g., by a network operator) in order to determine a maximized UE effective rate for each of small cell radios 112a-112c using different possible resource allocations among FFR and reuse one portions of system bandwidth for non-ABS subframes and ABS subframes. In one embodiment, spectral efficiencies can be calculated for UEs served by each of small cell radios 112a-112c for ABS subframes and non-ABS subframes as a function of the number of RBs assigned to each UE and the spectral efficiencies can be applied to a selected utility function in order to determine a maximized utility for UE effective rates for each of small cell radios 112a-112c. A further discussion of computations that can be performed by small cell radios 112a-112c for determining the performance metrics are discussed in further detail below.

In some embodiments, the performance metrics can include UE specific feedback in which each small cell radio 112a-112c can include in the performance metrics fed to server 118 an indication of the total number of UEs connected to it for ABS and non-ABS subframes and an indication of the total number of UEs meeting an interference condition in which at least one neighboring cell radio RSRP is equal to at least the serving cell radio RSRP plus a minimum relative interference (minRelativeInterf) value (e.g., −5 dB) for ABS and non-ABS subframes (e.g., Num. UEs for which neighboring RSRP serving RSRP+minRelativeInterf). For each the UEs satisfying the interference condition, each of a given serving small cell radio 112a-112c can send back whether the UE is scheduled in ABS or non-ABS subframes and the relative RSRP for the subframe. In some embodiments, UE specific feedback can be used by server 118 to determine optimum power levels for $P_1$, $P_2$ and $P_4$ as discussed in further detail herein.

In still some embodiments, the performance metrics can include cell specific feedback in which each small cell radio 112a-112c can include ordered values of relative RSRP (more generally, relative interference) for UEs scheduled in non-ABS subframes and ABS subframes. In some embodiments, the ordered values of relative RSRP for UEs served on non-ABS subframes can be fed back separately from the ordered values of relative RSRP for UEs served on ABS subframes. In some embodiments, separate messages from each small cell radio 112a-112c can be used to communicate the cell specific feedback (e.g., a message for ABS related cell specific feedback and another message for non-ABS related cell specific feedback, depending on FFR pattern scheme), yet, in other embodiments, a single message can be used to communicate the cell specific feedback. In some embodiments, a flag can be set in one or more messages to indicate whether cell specific feedback information is for non-ABS subframes or ABS subframes.

In one embodiment, ordered values of relative RSRP (for non-ABS and ABS subframes) can include a first value corresponding to the maximum relative RSRP among associated UEs for a given small cell radio having a maximum value of relative interference (relativeInterf) such that the strongest interfering neighboring cell radio RSRP (either a neighboring small cell radio or neighboring macro cell radio, depending on subframe type) is equal to at least the serving small cell radio RSRP plus relativeInterf (e.g., serving small cell radio RSRP+relativeInterf). In some embodiments, the first value, which corresponds to the highest relative RSRP among neighboring small cell radios can be denoted as $C_1$ among the ordered values. In some embodiments, the ordered values of relative RSRP can be identified as two-tuple pairs including (1) a cell identifier (ID) and (2) a corresponding relative RSRP for a given neighboring cell radio corresponding to the cell ID. In some embodiments, ordered values of relative RSRP for any neighboring macro cells can be included in cell specific feedback, which may provide a benefit of being able to estimate SINRs more accurately on non-ABS subframes. For example, if a neighboring cell lowers power on a given RB, then it may be useful to determine the SINR due to remaining small cells place macro cell interference.

Upon determining the first value for the ordered values of relative RSRP, a second value can be determined which can correspond to the next lowest maximum relative RSRP among associated UEs for the given small cell radio having the next lowest maximum value of relativeInterf such that the next strongest interfering cell radio RSRP, other than that of $C_1$, is equal to at least the serving small cell radio RSRP+relativeInterf as associated with the next strongest interfering cell radio. The ordered values of relative RSRP can continue to be determined in this manner for all neighboring cell radios meeting the condition of having an RSRP equal to at least the serving small cell radio RSRP+relativeInterf. In various embodiments, providing cell specific feedback assumes a minimum of one UE associated with a given serving small cell radio served on at least one of: non-ABS subframes and/or ABS subframes. In some embodiments, cell specific feedback can be used by server 118 to determine optimum power levels for $P_1$, $P_2$ and $P_4$ as discussed in further detail herein. It should be noted that server 118 can compute optimum power levels for $P_1$, $P_2$ and $P_4$ using either UE specific or cell specific feedback.

Thus, in one embodiment, performance metrics can be provided to server 118 by small cell radios 112a-112c, as shown at 302, and server 118 can perform substantially all the computations required to determine resource allocation parameters for a particular FFR pattern configuration, as shown at 304, which can include one or more of: (1) a fraction of FFR resources $\rho_{FFR,nonABS}$ to be allocated by small cell radios 112a-112c to non-ABS subframes and a fraction of FFR resources $\rho_{FFR,ABS}$ to be allocated by small cell radios 112a-112c to ABS subframes or a common fraction of FFR resources $\rho_{FFR}$ to be allocated by small cell radios to ABS subframes and ABS subframes, depending on configuration (e.g., Scheme 1 or Scheme 2); (2) a fraction of resources in which a small cell radio can expect higher SINR in the FFR portion of the system bandwidth for non-ABS subframes $\rho_{FFRlow-interf,nonABS}$ and for ABS subframes $\rho_{FFRlow-interf,ABS}$ or a common value $\rho_{FFRlow-interf}$, depending on configuration; and (3) the relative power levels for $P_1$, $P_2$ and $P_4$ based upon the received performance metrics.

As noted, in some embodiments, server 118 can be configured to determine a different fraction of resources for the FFR portions of non-ABS subframes and ABS subframes under a Scheme 1 configuration for determining resource block power allocations.

In other embodiments, server 118 can be configured to determine a same fraction of resources for the FFR portions for both non-ABS and ABS subframes under a Scheme 2 configuration for determining resource block power allocations. In at least one embodiment under a Scheme 2 configuration, the determination of number of resources for allocation in the FFR and reuse one portions of system bandwidth should consider the scheduled SINR of FFR RBs for UEs relative to their reuse one SINR in relevant subframes (e.g., ABS subframe for ABS scheduled UEs, non-ABS subframe for non-ABS UEs). Thus, under Scheme 2, considerations for how many FFR resources are needed for optimal performance in both ABS and non-ABS subframes can be provided. Optimizing only on the basis of, for example, non-ABS subframe information may lead to an allocation that is highly suboptimal for ABS subframes. In at least one embodiment for a Scheme 2 configuration, a one value for the fraction of FFR resources that are to be scheduled in ABS and non-ABS subframes, which can be represented as $\rho_{FFR}$, can be included in the resource allocation parameters.

Server 118, receiving performance metrics from small cell radios 112a-112c can perform computations to determine an optimized value for each of $\rho_{FFR,nonABS}$ and $\rho_{FFR,ABS}$. In some embodiments, for example, under a Scheme 1 FFR pattern configuration, $\rho_{FFR,nonABS}$ and $\rho_{FFR,ABS}$ can be different. In other embodiments, for example, under a Scheme 2 FFR pattern configuration, the values for $\rho_{FFR,nonABS}$ and $\rho_{FFR,ABS}$ can be the same.

In at least one embodiment, outer loop adaptation operations may be performed by server 118 to calculate an optimized value(s) for: 1) $\rho_{FFR,nonABS}$ and $\rho_{FFR,ABS}$ or 2) $\rho_{FFR}$, depending on whether Scheme 1 or Scheme 2 is implemented, for all small cell radios 112a-112c. In accordance with this embodiment, an initial value of $\rho_{FFR,nonABS}$ and $\rho_{FFR,ABS}$ or $\rho_{FFR}$, depending on configuration can be selected and then adapted in a closed loop manner based on performance metric feedback received from small cell radios 112a-112c. In various embodiments, a target threshold value for a performance metric, such as MCS or SINR, is selected for downlink transmissions to UE served by small cell radios 112a-112c. In general, the target threshold value can represent a tradeoff (in terms of spectral efficiency) between serving small cell radio interior UEs at lower SINR and serving small cell radio edge UEs at higher SINR.

Under a Scheme 1 configuration (e.g., different FFR patterns across ABS and non-ABS subframes), each subframe type can have an associated target threshold value, each of which can be adapted separately based on relevant UE throughput information for non-ABS and ABS subframes in order to optimize UE throughput for each subframe type. Under a Scheme 2 configuration (e.g., same FFR pattern across ABS and non-ABS subframes), one target threshold value can be set and adapted based on the performance of all small cell UEs present in the small cell deployment across both subframe types in order to optimize UE throughput across both subframe types.

For outer loop adaptation processing under a Scheme 1 configuration, a first target threshold value can be adapted towards a first predetermined performance metric threshold (e.g., SINR and/or MCS threshold) for non-ABS subframes and a second target threshold value can be adapted towards a first predetermined performance metric threshold (e.g., SINR and/or MCS threshold) for ABS subframes. Under Scheme 1, each small cell radio 112a-112c can include in the performance metric feedback sent to server 118 the number of UEs served by the particular small cell radio that have a performance measure metric (e.g., SINR and/or MCS) in the reuse one portion below the first target threshold value on reuse one RBs for non-ABS subframes, the number of UEs that have a performance metric in the reuse one portion below the second target threshold value on reuse one RBs for ABS subframes, the total number of UEs served by the particular small cell radio for ABS subframes and the total number of UEs served for non-ABS subframes. Server 118 can then determine an initial value for $\rho_{FFR,nonABS}$ and $\rho_{FFR,ABS}$ that can be used by all small cell radios 112a-112c.

In some embodiments, an initial value for $\rho_{FFR,nonABS}$ can be chosen to correspond to the fraction of the total RBs for allocation across non-ABS subframes such that the fraction corresponds to the ratio of UEs across the network to be scheduled in non-ABS subframes with a performance metric (e.g., MCS and/or SINR) below the first target threshold value relative to the total UEs in the network to be scheduled for non-ABS subframes. Similarly, in some embodiments, an initial value for $\rho_{FFR,ABS}$ can be chosen to correspond to the fraction of the total RBs for allocation across ABS subframes such that the fraction corresponds to the ratio of UEs across the network to be scheduled in ABS subframes with a performance metric (e.g., MCS and/or SINR) below the second target threshold value relative to the total UEs in the network to be scheduled for ABS subframes.

After the initial values of $\rho_{FFR,nonABS}$ and $\rho_{FFR,ABS}$ are chosen, $\rho_{FFR,nonABS}$ and $\rho_{FFR,ABS}$ can each be separately adapted according to other performance metric feedback information received from small cell radios 112a-112c. For example, for UE served by a particular small cell radio on non-ABS subframes, the particular small cell radio can compute, via link adaptation prediction, a median value for a block error rate (BLER) threshold (e.g., 10%) on $P_1$ RBs in the reuse one portion of non-ABS subframes and can compute a fraction of high SINR RBs allocated to each UE for non-ABS subframes. A similar computation can be performed for a BLER threshold on $P_1$ RBs in the reuse one portion of ABS subframes to determine a fraction of high SINR RBs allocated to each UE for ABS subframes.

Thus, in at least one embodiment, performance metric feedback sent from each of small cell radios 112a-112c to server 118 can include a first fraction of high SINR RBs allocated to UEs that have a value of the performance metric (SINR and/or MCS) in the reuse one portion for non-ABS subframes that are higher than the first target threshold value and a second fraction of high SINR RBs allocated to UEs that have a value of the performance metric (SINR and/or MCS) in the reuse one portion for ABS subframes that are higher than the second target threshold value. For the adaptation loop processing performed by server 118 under a Scheme 1 configuration, $\rho_{FFR,nonABS}$ can be adapted such that a first predefined percentile of downlink transmission to UEs for non-ABS subframes occur at or near the first predefined performance metric threshold and $\rho_{FFR,ABS}$ can be adapted such that a second predefined percentile of downlink transmissions to UEs for ABS subframes occur at near the second predetermined performance metric threshold. In various embodiments, the first and second predefined percentiles can be the same or different and the first and second predefined performance metric thresholds can be the same or different depending on operator configuration.

In a particular embodiment, for example, the value for $\rho_{FFR,nonABS}$ can be increased if a first predefined percentile (e.g. 90%) of the UEs among all cells 112a-112c have a performance metric that is below the first predefined performance metric threshold (e.g., SINR and/or MCS threshold). Conversely, the value for $\rho_{FFR,nonABS}$ can be reduced if the first predefined percentile of the UEs among all cells 112a-112c have a performance metric (e.g., SINR and/or MCS) that is above the first predefined performance metric threshold. In a similar manner, the value for $\rho_{FFR,ABS}$ can be increased or reduced in relation to the second predefined performance metric threshold for ABS subframes.

A discussion of outer loop adaptation under Scheme 2 is now provided. For outer loop adaptation processing under a Scheme 2 configuration, a common target threshold value can be adapted towards a common predetermined performance metric threshold (e.g., SINR and/or MCS threshold) for both non-ABS and ABS subframes. Under Scheme 2, each small cell radio 112a-112c can include in the performance metric feedback sent to server 118 the number of UEs served by the particular small cell radio that have a performance measure metric (e.g., SINR and/or MCS) in the reuse one portion below the first target threshold value on reuse one RBs for non-ABS and ABS subframes collectively and the total number of UEs served by the particular small cell radio for ABS subframes and non-ABS subframes collectively. In at least one embodiment for a Scheme 2 configuration, each small cell radio 112a-112c Server 118 can then determine an initial value for $\rho_{FFR}$ that will be used by all small cell radios 112a-112c.

In some embodiments, an initial value for $\rho_{FFR}$ can be chosen to correspond to the fraction of the total RBs for allocation across non-ABS and ABS subframes, collectively, such that the fraction corresponds to the ratio of UEs across the network to be scheduled in both non-ABS and ABS subframes with a performance metric (e.g., MCS and/or SINR) below the first target threshold value relative to the total UEs in the network to be scheduled for non-ABS subframes and ABS subframes.

After the initial values of $\rho_{FFR}$ is chosen, $\rho_{FFR}$ can be adapted according to other performance metric feedback information received from small cell radios 112a-112c. For example, for UE served by a particular small cell radio on either ABS or non-ABS subframes, the particular small cell radio can compute, via link adaptation prediction, a median value for a block error rate (BLER) threshold (e.g., 10%) on $P_1$ RBs in the reuse one portion of non-ABS subframes and ABS subframes and can compute a fraction of high SINR RBs allocated to each UE for non-ABS subframes and ABS subframes collectively.

Thus, in at least one embodiment, performance metric feedback sent from each of small cell radios 112a-112c to server 118 can include a fraction of high SINR RBs allocated to UEs that have a value of the performance metric (SINR and/or MCS) in the reuse one portion for non-ABS subframes and ABS subframes that are higher than the common target threshold value. For the adaptation loop processing performed by server 118 under a Scheme 2 configuration, $\rho_{FFR}$ can be adapted such that a common predefined percentile of downlink transmission to UEs for non-ABS subframes and ABS subframes occur at or near the common predefined performance metric threshold.

In a particular embodiment, for example, the value for $\rho_{FFR}$ can be increased if a common predefined percentile (e.g. 90%) of the UEs among all cells 112a-112c have a performance metric that is below the first predefined performance metric threshold (e.g., SINR and/or MCS threshold). Conversely, the value for $\rho_{FFR}$ can be reduced if the first predefined percentile of the UEs among all cells 112a-112c have a performance metric (e.g., SINR and/or MCS) that is above the first predefined performance metric threshold.

Generally, under either Scheme 1 or Scheme 2, if many UEs which might otherwise be capable of obtaining performance metrics (e.g. SINR and/or MCS) above a particular target threshold value in the reuse one portion of a particular subframe type but keep having resources (e.g., RBs) allocated in the FFR portion for the particular subframe type, then the fraction of RBs that may be allocated in the FFR portion may be reduced to prevent wasting of resources in the network. Conversely, if many UEs are scheduled in the reuse one portion for a particular subframe type, but the obtainable performance metrics (SINR and/or MCS) for such UE fall below a particular target threshold value, then there may be too few FFR resources available in the system for allocation for the particular subframe type and the fraction of resources available for allocation in the FFR portion for the particular subframe type may be increased in response.

Accordingly, as shown at 304, server 118 computes one or more resource allocation parameters for a particular FFR pattern configuration based upon performance metrics received from small cell radios 112a-112c. In a particular embodiment for a Scheme 1 configuration, upon determining the values of $\rho_{FFR,nonABS}$ and $\rho_{FFR,ABS}$ server 118 can determine the fraction of resources for allocation within the reuse one portion of the system bandwidth for non-ABS subframes, denoted as $\rho_{REUSEONE,nonABS}$ using the equation: $1-\rho_{FFR,nonABS}$. In a particular embodiment for a Scheme 2 configuration, upon determining the value of or $\rho_{FFR}$, server 118 can determine the fraction of resources for allocation in the reuse one portion of system bandwidth for both non-ABS and ABS subframes, denoted as $\rho_{REUSEONE}$ using the equation: $1-\rho_{FFR,nonABS}$.

At 306, server 118 may send the resource allocation parameters to small cell radios 112a-112c. Based upon this received information, small cell radios 112a-112c can communicate with one another in order to determine the specific resources allocation among UEs served by each small cell radio 112a-112c for non-ABS and ABS subframes. For embodiments in which a Scheme 1 configuration (e.g., different FFR patterns) is implemented, small cell radios 112a-112c can exchange X2 messaging that includes proprietary information elements (IEs) indicating resources (e.g., RBs) allocated to non-ABS and ABS subframes, as discussed in more detail herein. For embodiments in which a Scheme 2 configuration (e.g., same FFR patterns) is implemented, small cell radios 112a-112c may communicate with one another via standards-based X2 messaging without any proprietary IEs in order to determine specific resource allocations among the FFR and reuse one portion used by each of small cell radios 112a-112c for non-ABS and ABS subframes.

Operations 300 may then end. It should be understood that in various embodiment operations 300 may be repeated on a continuous basis upon receiving updated performance metrics from small cell radios 112a-112c so that the resource allocation between the FFR portion and the reuse one portion of the spectrum for non-ABS subframes and ABS subframes may be adapted under either a Scheme 1 or Scheme 2 configuration according to changing conditions within communication system 100.

Referring now to FIG. 4, FIG. 4 is a simplified flow diagram illustrating example operations 400 that can be associated with a given small cell radio (e.g., small cell radio 112b) in the presence of non-ABS and ABS subframes being served by a neighboring macro cell radio (e.g., macro cell radio 120) in accordance with one potential embodiment of communication system 100. In the embodiment of FIG. 4, a given small cell radio (e.g., small cell radio 112b) is configured to compute one or more performance metrics based, at least in part, on measurement reports received from UE connected to the small cell radio (e.g., measurement reports from UE 116c-116d) and to feed back the performance metrics to server 118 as previously discussed herein. Although the embodiment shown in FIG. 4 is described in reference to small cell radio 112b, it should be understood that any small cell radio 112a-112c can perform the operations described herein.

At 402, small cell radio 112b receives measurement reports from each of UE 116c and 116d. In various embodiments, the measurement reports can include signal strength information (e.g., RSRP, RSRQ, etc.) related to serving small cell radio 112b, one or more neighboring small cell radios (e.g., small cell radios 112a and/or 112c) and/or a neighboring macro cell radio (if measureable), such as, for example, macro cell radio 120.

In one embodiment, small cell radios 112a-112c can perform substantially all of the computations required to determine the performance metrics. In one embodiment, determining the performance metrics can include solving a utility function in which computations can be performed to characterize UE throughput rates for different possible resource block power allocations that may be realized for resources (e.g., RBs) that are to be allocated and scheduled among small cell radios 112a-112c for UE served thereby for non-ABS subframes and ABS subframes.

Characterizations of UE throughput rates can be representative of UE effective rates, which can represent the overall throughput performance associated with all UEs served by each of small cell radios 112a-112c across non-ABS subframes and ABS subframes, which are to be allocated and scheduled by each small cell radio 112a-112c. In various embodiments, a given utility function can be selected (e.g., by a network operator, service provider, etc.) in order to determine a maximized UE effective rate for each of small cell radios 112a-112c using different possible resource allocations among FFR and reuse one portions of system bandwidth for non-ABS subframes and ABS subframes. Generally, MCS for a given UE can be representative of spectral efficiency, which is represented in terms of bits per seconds (sec) per Hertz (Hz) (e.g., bits/sec/Hz). Throughput for a given UE can be calculated as the average number of RBs assigned to the UE in one second multiplied by the average spectral efficiency of the UE (e.g., (average RBs assigned in one sec)*(average spectral efficiency of UE). Thus, in one embodiment, spectral efficiencies can be calculated for UEs served by each of small cell radios 112a-112c for ABS subframes and non-ABS subframes as a function of the number of RBs assigned to each UE and the spectral efficiencies can be applied to a selected utility function in order to determine a maximized utility for UE effective rates for each of small cell radios 112a-112c.

Thus, in at least one embodiment, small cell radio 112b can determine a maximized utility for a given utility function in terms of effective rates for UE 116c, 116d across different possible resource fractions, $\rho_{FFR,nonABS}$ and $\rho_{FFR,ABS}$ for ABS and non-ABS subframes. Determining the maximized utility can be associated with solving a low complexity optimization problem for a given utility function. The low complexity optimization problem can be related to spectral efficiency of a UE, denoted as 'u', served by a given small cell radio (e.g., small cell radio 112b) for ABS subframes having a spectral efficiency represented as '$s_u^{nonABS}(r)$' and a non-ABS subframes having a spectral efficiency represented as '$s_u^{nonABS}(r)$' as a function of the RBs or set of RBs, denoted as 'r', assigned to UE u.

In at least one embodiment, spectral efficiency of a UE u for an ABS subframe $s_u^{ABS}(r)$ can be computed as a function of SINR in which $s_u^{ABS}(r)=g(SINR)$, such that g is a function maps SINR to MCS based on which Multiple Input Multiple Output (MIMO) scheme is used, a number of antennas, etc. for a given small cell radio. SINR for a UE u for an ABS subframe can be found according Equation 1 (Eq. 1), as shown below:

$$\frac{P_{serv}^{ABS}(r)G_{serv,u}}{\Sigma_c(P_c^{ABS}(r)G_{cu})} \qquad \text{Eq. 1}$$

For Equation 1, a parameter '$P_{serv}^{ABS}(r)$' can represent the energy per resource element (EPRE) for an RB r for an ABS subframe of the serving small cell radio and a parameter '$G_{serv,u}$' can represent the channel gain from the serving small cell radio to UE u on the RB r. In some embodiments, the channel gain can be estimated via the RSRP for the serving small cell radio as reported by UE u. Further for Equation 1, a parameter $P_c^{ABS}(r)$ can represent the EPRE for RB r for the ABS subframe as may be served by a neighboring small cell c and $G_{cu}$ can represent the channel gain from the neighboring small cell c to UE u such that the total interference that can be expected for RB r for UE u allocated to an ABS subframe can be computed according to: $\Sigma_c(P_c^{ABS}(r)G_{cu})$ for all neighboring small cell radios c. In some embodiments, channel gain from a neighboring small cell radio can be estimated via the RSRP for the neighboring small cell radio as reported by UE u. Accordingly, the numerator of Eq. 1 represents the expected downlink signal power that can be achieved for UE u for RB r on ABS subframes in relation to the interference represented in the denominator of Eq. 1 for neighboring small cell radios also serving RB r on ABS subframes. As a neighboring macro cell radio (e.g., macro cell radio 120) will not transmit downlink data on ABS subframes, interference from the macro cell radio can be excluded from Equation 1.

In a similar manner, SINR for a UE u for a non-ABS subframe can be found according Equation 2 (Eq. 2), as shown below:

$$\frac{P_{serv}^{nonABS}(r)G_{serv,u}}{\Sigma_c(P_c^{nonABS}(r)G_{cu}) + \Sigma_m\left(P_m^{non-ABS}(r)G_{mu}\right)} \quad \text{Eq. 2}$$

For Equation 2, the numerator can be represented as described for Eq. 1 and the denominator can additionally include interference caused by one or more neighboring macro cell radios m for RB r. A parameter '$P_m^{non-ABS}(r)$' can represent the EPRE for RB r as served by each of a macro cell radio m for non-ABS subframes and a parameter '$G_{mu}$' can represent the channel gain from the macro cell radio m such that the total interference that can be expected for an RB r for UE u allocated to a non-ABS subframe can be computed according to: $\Sigma_c(P_c^{nonABS}(r)G_{cu}) + \Sigma_m(P_m^{non-ABS}(r)G_{mu})$.

In at least one embodiment, a Channel Quality Indicator (CQI) as reported by each UE can be used to determine SINR for a UE u for ABS and non-ABS subframes. In various embodiments, CQI can be sub-band CQI or wideband CQI. However, in deployments in which power levels at neighboring cell radios are RB specific, then CQI may not be an accurate representation of SINR on a given RB.

Regarding spectral efficiency, an average spectral efficiency, denoted herein as '$\overline{S}(u)$', across all RBs assigned to each UE u across each subframe type and frequency region can be computed according to various relationships. Each subframe type and frequency region can be referred to as a two-tuple or pair such as (subframe type, frequency region). A first relationship can represent the average spectral efficiency for the reuse one region of ABS subframes such that $\overline{s}_{reuse-one}^{ABS}(u) = \Sigma_r s_u^{ABS}(r)$ for reuse one RBs r assigned to UE u, on average. A second relationship can represent the average spectral efficiency for the low interference region (e.g., the high SINR region) of the FFR portion of ABS subframes such that $\overline{s}_{FFRlow-interf}^{ABS}(u) = \Sigma_r s_u^{ABS}(r)$ for low interference RBs r assigned to UE u, on average. A third relationship can represent the average spectral efficiency for the high interference region of the FFR portion of ABS subframes such that $\overline{s}_{FFRhigh-interf}^{ABS}(u) = \Sigma_r s_u^{ABS}(r)$ for high interference RBs r assigned to UE u, on average. A fourth relationship can represent the average spectral efficiency for the reuse one region of non-ABS subframes such that $\overline{s}_{reuse-one}^{nonABS}(u) = \Sigma_r s_{nonABS}(r)$ for reuse one RBs r assigned to UE u, on average. A fifth relationship can represent the average spectral efficiency for the low interference region of the FFR portion of non-ABS subframes such that $\overline{s}_{FFRlow-interf}^{ABS}(u) = \Sigma_r s_u^{ABS}(r)$ for low interference RBs r assigned to UE u, on average. A sixth) relationship can represent the average spectral efficiency for the high interference region of the FFR portion of non-ABS subframes such that $\overline{s}_{FFRhigh-interf}^{ABS}(u) = \Sigma_r s_u^{ABS}(r)$ for high interference RBs assigned to UE u, on average.

Total utility as a function of throughput T can be expressed as '$U(T(u))$' such that determining a maximum utility can be expressed as '$\max \Sigma_u U(T(u))$' for a given utility function $U(T(u))$ for all UE served by a given small cell radio (e.g., small cell radio 112b). In various embodiments, the choice of a particular utility function for the optimization problem can be selected by a network operator or service provider according to a desired outcome as may be realized via a tradeoff between fairness of resource allocation and spectral efficiency across ABS and non-ABS subframes for UE served by the small cell radio.

In at least one embodiment, a total sum of the logarithm (LOG) of spectral efficiency as a function of throughput T across UE(s) u, which can be expressed as '$\Sigma_u \text{LOG}(T(u))$' for all UE served by a given small cell radio, can be selected as the utility function for the optimization problem if the desire is to maximize fairness of average UE throughput rates versus system capacity. This utility function is typically referred to as a proportional fair metric.

In another embodiment, a total sum of the average spectral efficiency as a function of throughput T across UE(s) u, which can be expressed as '$\Sigma_u(T(u))$', can be selected as the utility function for the optimization problem if the desire is to maximize average UE throughput rates across all UEs for a small cell deployment. When this utility function is used, resources for UEs having the highest achievable rate are maximized, while other UEs, which may have lower rates, may be starved for resources. Thus, this utility function may provide for maximizing throughput while sacrificing fairness.

In another embodiment, a total sum of weighted exponentials of spectral efficiency, which can be expressed as '$\Sigma_u(1/T(u))^n$', can be selected as the utility function for the optimization problem if maximizing fairness of average UE throughput rates is most important. For the weighted exponentials utility function, increasing the value of 'n' can provide for more fair (e.g., more equal) UE throughput rates. In one or more embodiments, the utility function selected for the optimization problem should be a concave, monotonically increasing function of $T(u)$ such that $U^{-1}(*)$ is well defined. Thus, it should be understood that choice of utility function can be varied based on the desires of a network operator and/or service provider based on network fairness, capacity, spectral efficiency, throughput rates, combinations thereof or the like.

Accordingly, in certain embodiments, each small cell radio 112a-112c can compute a solution to the optimization problem represented as $\max \Sigma_u U(T(u))$ for all UE u served thereby subject to various constraints including the number of RBs assigned to each UE in each subframe type (e.g., ABS and non-ABS) and each frequency region for each subframe type (e.g., RBs in reuse one, RBs in FFR with low interference and RBs in FFR with high interference) and the average spectral efficiency for each subframe type and frequency region. Operations associated with computing a solution to the optimization problem can be referred to herein generally as link adaptation operations. The following parameters can be used to represent the number of RBs in each subframe type and frequency region:

$RB_{reuse-one}^{ABS}(u)$: number of RBs allocated to each UE u in the reuse one frequency region for each ABS subframe, on average;

$RB_{FFRlow-interf}^{ABS}(u)$: number of RBs allocated to each UE u in the FFR low interference frequency region for each ABS subframe, on average;

$RB_{FFRhigh-interf}^{ABS}(u)$: number of RBs allocated to each UE u in the FFR low interference frequency region for each ABS subframe, on average;

$RB_{reuse-one}^{nonABS}(u)$: number of RBs allocated to each UE u in the reuse one frequency region for each non-ABS subframe, on average;

$RB_{FFRlow-interf}^{nonABS}(u)$: number of RBs allocated to each UE u in the FFR low interference frequency region for each non-ABS subframe, on average; and $RB_{FFRhigh-interf}^{nonABS}(u)$: number of RBs allocated to each UE u in the FFR low interference frequency region for each non-ABS subframe, on average.

Thus, the optimization problem $\max \Sigma_u U(T(u))$ for a given utility function $U(T(u))$ can be solved subject to the spectral efficiency for each (subframe type, frequency region) pair, as shown in Equation 3, below.

$$T(u) = \text{RB}_{reuse\text{-}one}^{ABS}(u)$$
$$\frac{S_{reuse\text{-}one}^{ABS}(u) + \text{RB}_{FFRlow\text{-}interf}^{ABS}(u)}{S_{FFRlow\text{-}interf}^{ABS}(u) + \text{RB}_{FFRhigh\text{-}interf}^{ABA}(u)}$$
$$\frac{S_{FFRhigh\text{-}interf}^{ABS}(u) + \text{RB}_{reuse\text{-}one}^{nonABS}(u)}{S_{reuse\text{-}one}^{nonABS}(u) + \text{RB}_{FFRlow\text{-}interf}^{ABS}(u)}$$
$$\frac{S_{FFRlow\text{-}interf}^{ABS}(u) + \text{RB}_{FFRhigh\text{-}interf}^{ABA}(u)}{S_{FFRhigh\text{-}interf}^{ABS}(u)} \quad \text{Eq. 3}$$

In at least one embodiment, the solution to the optimization problem can be constrained by the total number of RBs to be assigned to all UEs u served by a given small cell radio for each (subframe type, frequency region) pair such that:

$\Sigma_u \text{RB}_{reuse\text{-}one}^{ABS}(u)$=the total number of reuse one RBs on ABS subframes for a given small cell radio for all UEs u served thereby;

$\Sigma_u \text{RB}_{FFRlow\text{-}interf}^{ABS}(u)$=the total number of FFR low interference RBs on ABS subframes for the given small cell radio for all UEs u served thereby;

$\Sigma_u \text{RB}_{FFRhigh\text{-}interf}^{ABS}(u)$=the total number of FFR high interference RBs on ABS subframes for the given small cell radio for all UEs u served thereby;

$\Sigma_u \text{RB}_{reuse\text{-}one}^{nonABS}(u)$=the total number of reuse one RBs on non-ABS subframes for the given small cell radio for all UEs u served thereby;

$\Sigma_u \text{RB}_{FFRlow\text{-}interf}^{nonABS}(u)$=the total number of FFR low interference RBs on non-ABS subframes for the given small cell radio for all UEs u served thereby; and $\Sigma_u \text{RB}_{FFRhigh\text{-}interf}^{nonABS}(u)$=the total number of FFR high interference RBs on non-ABS subframes for the given small cell radio for all UEs u served thereby.

Each small cell radio 112a-112c can solve a corresponding optimization problem to determine an optimum allocation of UEs across ABS and non-ABS subframes. Upon each small cell radio 112a-112c determining its optimum allocation of UEs across ABS and non-ABS subframes, each small cell radio 112a-112c can feedback performance metrics associated with the optimum allocation to feedback to server 118. In various embodiments, the performance metrics can include, at least in part, the number of UEs that a given small cell radio has allocated to ABS and non-ABS subframes served thereby. As discussed for various embodiments described herein, the allocation of UEs for the performance metrics can be provided to server 118 via UE specific feedback or cell specific feedback.

In at least one embodiment, determining an optimum allocation of UEs across ABS and non-ABS subframes can be performed by each small cell radio 112a-112c using a heuristic process in which an interference threshold value can be set and optimized to adjust the allocation of UEs across ABS and non-ABS subframes to maximize UE throughput rates as represented via the optimization problem for a selected utility function. Operations for the heuristic process are discussed in further detail below.

Accordingly, at 404 for the embodiment shown in FIG. 4, small cell radio 112b determines performance metrics associated with UE 116c and 116d served by small cell radio 112b. At 406, small cell radio 112b sends the performance metrics to server 118. Server 118 can determine resource allocation parameters for all small cell radios 112a-112c using performance metrics received from each of small cell radios 112a-112c, as discussed for various embodiments described herein. Server 118 can compute the resource allocation parameters, as described for the various embodiments discussed herein and can send the resource allocation parameters to each of small cell radio 112a-112c. Thus, at 408, small cell radio 112b receives the resource allocation parameters from server 118. Small cell radio 112b can then communicate with small cell radios 112a and 112c to determine the specific allocation of resources for FFR and reuse one frequency regions across ABS and non-ABS subframes for UE served thereby (e.g., UE 116c, 116d). Operations 400 can then end. Other embodiments associated with determining specific allocations of resources among neighboring small cell radios for ABS and non-ABS subframes are discussed in further detail herein.

Referring to FIG. 5, FIG. 5 is a simplified flow diagram illustrating example operations 500 that can be associated with a determining an allocation of UEs across ABS and non-ABS subframes served by a given small cell radio (e.g., any of small cell radios 112a-112c) in accordance with one potential embodiment of communication system 100. In various embodiments, an allocation of UEs as computed by a given small cell radio can be included in performance metrics (e.g., UE specific or cell specific) feedback communicated to server 118. In various embodiments, operations 500 can be associated with a heuristic process in which an interference threshold value can be set and optimized to adjust the allocation of UEs that are to be scheduled by the small cell radio across ABS and non-ABS subframes in order to maximize UE throughput rates, which can be represented via an optimization problem for a selected utility function.

In some embodiments, for example, under a Scheme 1 configuration, a first interference threshold can be set for ABS subframes and a second interference threshold can be set for non-ABS subframes. In such embodiments, operations for determining an allocation of UEs can be performed separately for ABS subframes and for non-ABS subframes in a manner similar to that as described for the embodiment of FIG. 5. In some embodiments, for example, under a Scheme 2 configuration, one interference threshold can be set for both ABS and non-ABS subframes. The embodiment of FIG. 5 illustrates such an embodiment.

In various embodiments, operations 500 may assume one or more of the following: that small cell radios 112a-112c operate in the reuse one portion in all subframes for an available system bandwidth; on ABS subframes, all neighboring (measureable) macro cell radio(s) are assumed to be silent and CRS and other broadcast signals are assumed to be cancellable and/or mitigated; on ABS subframes in which data transmissions from neighboring macro cell radio(s) are assumed to be silent, the interference to a UE reduces proportional to the RSRP measurement at the UE from one or more corresponding neighboring macro cell radio(s) (e.g., macro cell radio 120); UEs for which PDCCH SINR is expected to be less than a given macro interference threshold (e.g., −5 decibels (dB)) are restricted to be scheduled only on ABS subframes; and/or for non-ABS subframes, all neighboring cell radios (e.g., small cell and macro cell, if measurable) are assumed to transmit with a power proportional to the RSRP measured from them.

At 502, a given small cell radio (e.g., small cell radio 112c) receives measurement reports from each of one or more UE(s) served by the small cell radio (e.g., UE 116e and 116f). In various embodiments, the measurement reports can include signal strength information (e.g., RSRP, RSRQ, etc.) related to serving small cell radio 112c, one or more neighboring small cell radios (e.g., small cell radios 112a and/or 112b) and/or a neighboring macro cell radio (if measureable), such as, for example, macro cell radio 120.

At 504, serving small cell radio 112c can order connected UE(s) in an order according to their reported maximum relative interference from the strongest neighboring macro cell radio (e.g., macro cell radio 120) to the serving small cell radio signal power. At 506, serving small cell radio 112c can set an initial value for interference threshold. In some embodiments the initial interference threshold value can be set according to the range of relative interference values determined at 504. For example, in at least one embodiment, the initial value can be set to the midpoint value between the maximum and minimum relative interference values for the order determined at 504.

At 508, serving small cell radio 112c can optimize the interference threshold value. In at least one embodiment, optimizing the interference threshold value can include determining at 508a a candidate set of UE(s) having relative interference above the interference threshold value (e.g., the initial value for a first pass through operations 508), which can be scheduled in ABS subframes, and determining another candidate set of UE(s) having relative interference below the interference threshold value, which can be scheduled in non-ABS subframes. At 508b, serving small cell radio 112c can compute estimated UE throughput rates for the UE(s) included in the candidate sets by solving an optimization problem for a configured utility function. In various embodiments, the utility function can be configured for each small cell radio 112a-112c by server 118 in order to achieve certain desired performance for communication system 100. The utility function can relate spectral efficiencies to RB assignments across ABS and non-ABS subframes for UE(s) served by the serving small cell radio. In at least one embodiment, it can be assumed for each of a given interference threshold value that the UE(s) in ABS and non-ABS subframes can share RBs equally amongst each set. As noted, a set is a set of resources in (time, frequency) with similar SINR, and hence similar MCS assignment for a given UE. Recall, each small cell radio 112a-112c can determine UE scheduling across six (6) sets of resources: (1) a set of reuse one RBs in ABS subframes; (2) a set of FFR RBs with low SINR in ABS subframes; (3) a set of FFR RBs with high SINR in ABS subframes; (4) a set of reuse one RBs in non-ABS subframes; (5) a set of FFR RBs with low SINR in ABS subframes; and (6) a set of FFR RBs with high SINR in non-ABS subframes.

At 508c, small cell radio 112c can determine whether UE throughput rates are maximized according to the configured utility function. If UE throughput rates are not maximized, then the interference threshold value can be adjusted at 508d and operations 508a and 508b can be repeated. However, if UE throughput rates are maximized, then the operations can continue to 510 in which the number of UE(s) that are to be scheduled across each of the ABS and non-ABS subframes can be determined according to the candidate sets determined at 508a corresponding to the optimized interference threshold which resulted in the maximized UE throughput rates.

In various embodiments, determining whether UE throughput rates are maximized can include performing bisection operations using different interference threshold values. For example, if the initial value is set to be a current midpoint between the minimum and maximum relative interferences for the order determined at 504, then achievable UE throughput rates can be computed for candidate sets of UEs corresponding to an allocation across ABS and non-ABS subframes for the minimum, the maximum and the current midpoint interference threshold values. By 'achievable' it is meant that a corresponding UE throughput rate computed according to an allocation of UEs among ABS and non-ABS subframes for a given interference threshold value would be the rate that would be achieved for the given interference threshold value. As operations 508 can involve searching across different interference threshold values in order to determine an optimized value that results in maximized UE throughput rates, achievable UE throughput rates are discussed for the embodiment shown in FIG. 5.

A new midpoint value can be set which may be fall between the current midpoint and the maximum and achievable UE throughput rates can be computed for the new midpoint value. A comparison can be performed between the achievable UE throughput rates for the minimum, the maximum, the initial midpoint value and the new midpoint value. If the achievable UE throughput rate corresponding to the new midpoint value is greater than the value for the initial midpoint then another new midpoint value can be selected between the current new midpoint value and the maximum value. However, if the achievable UE throughput rate for the new midpoint value is less than the rate for the initial midpoint value, then another new midpoint value can be selected that is between the initial midpoint value and the minimum value. Operations for the bisection method can continue in this manner until convergence upon a maximum UE throughput rate is achieved.

In various embodiments, the number of UE(s) determined to be scheduled across ABS and non-ABS subframes at 510 for a corresponding optimized interference threshold value can be included in the performance metrics corresponding to UE specific or cell specific feedback which can be sent to server 118 as described for various embodiments herein. In at least one embodiment for a Scheme 1 configuration, the number of UEs can be reported for ABS and non-ABS subframes individually. In at least one embodiment for a Scheme 2 configuration the number of UEs can be reported for ABS and non-ABS subframes collectively. In some embodiments, frequency domain ICIC information for one or more neighboring macro cell radio(s) (e.g., macro cell radio 120) may be obtained by small cell radios 112a-112c, then the analysis of optimization problem for maximizing UE throughput rates can be generalized to account for frequency domain ICIC (e.g., FFR) being performed by neighboring macro cell radio(s).

Referring now to FIG. 6, FIG. 6 is a simplified flow diagram illustrating example operations 600 that can be associated with computing resource allocation parameters in accordance with one potential embodiment of communication system 100. In one example embodiment, server 118 receives performance metrics associated with UEs 116a-116b from small cell radio 112a, receives performance metrics associated with UEs 116c-116d from small cell radio 112b and receives performance metrics associated with UEs 116e-116f from small cell radio 112c. In various embodiments, the performance metrics received from each of small cell radios 112a-112c can include UE specific feedback or cell specific feedback—both of which can include relative interference (e.g., relative RSRP) values.

Thus, at 602, server 118 receives performance metrics including, at least in part, relative interference values associated with UEs served by each of small cell radios 112a-112c. At 604, server 118 computes values for $\rho_{FFR,nonABS}$ and $\rho_{FFR,ABS}$ or for a common value $\rho_{FFR}$, depending on whether Scheme 1 or Scheme 2 FFR patterns, respectively, are configured for the system using, at least in part, relative interference values included in the performance metrics. In at least one embodiment, server 118 can compute the values for $\rho_{FFR,nonABS}$ and $\rho_{FFR,ABS}$ or for $\rho_{FFR}$ using outer loop adaptation operations as described herein. At 606, server 118 computes power levels $P_1$, $P_2$ and $P_4$ for the reuse one and FFR frequency portions for non-ABS and ABS subframes based on the received relative interference values, as described herein. At 608, server 118 computes value(s) for the fraction of resources to be allocated to the high SINR regions of the FFR portions of non-ABS and ABS subframes corresponding to $\rho_{FFRlow\text{-}interf,nonABS}$ and $\rho_{FFRlow\text{-}interf,ABS}$, respectively, or for $\rho_{FFRlow\text{-}interf}$ for both non-ABS and ABS subframes, depending on configuration.

In one embodiment, for example under a Scheme 1 configuration, server 118 can compute $\rho_{FFRlow\text{-}interf,nonABS}$ as being equal to $\rho_{FFR,nonABS}/N^{max,nonABS}$ in which $N^{max,nonABS}$ denotes the maximum number of neighbors of among small cell radios 112a-112c, including both neighboring small cell radio(s) and neighboring macro cell radio(s). Under a Scheme 1 configuration, server 118 can also compute $\rho_{FFRlow\text{-}interf,ABS}$ as being equal to $\rho_{FFR,ABS}/N^{max,ABS}$ in which $N^{max,ABS}$ denotes the maximum number of neighboring small cell radios among 112a-112c (e.g., downlink transmissions from neighboring macro cell radio(s) are cancellable or mitigated during ABS subframes). Under a Scheme 2 configuration, server 118 can compute $\rho_{FFRlow\text{-}interf}$ as being equal to $\rho_{FFR}/N^{max}$ in which $N^{max}$ denotes the maximum number of neighboring small cell radios among 112a-112c for either ABS or non-ABS subframes. Further details are provided below with regard to FIGS. 7 and 8 regarding operations that can be used to determine $N^{max,nonABS}$, $N^{max,nonABS}$, $N^{max,ABS}$ and $N^{max}$ in accordance with various embodiments of the present disclosure.

At 610, server 118 can send resource allocation parameters to small cell radios 112a-112c including: $\rho_{FFR,nonABS}$ and $\rho_{FFR,ABS}$ or $\rho_{FFR}$; $\rho_{FFRlow\text{-}interf,nonABS}$ and $\rho_{FFRlow\text{-}interf,ABS}$ or $\rho_{FFRlow\text{-}interf}$ and power levels $P_1$, $P_2$ and $P_4$. Operations 600 can then end. In some embodiments, fractions for reuse one portions of non-ABS and ABS subframes or both, depending on configuration, could also be computed and included in the resource allocation parameters sent from server 118. In still some embodiments for a Scheme 1 configuration, a number of neighbors for which each small cell radio 112a-112c are to coordinate with for ABS subframes and a number of neighbors for which each small cell radio 112a-112c are to coordinate with for non-ABS subframes can be included in the resource allocation parameters.

Turning to FIG. 7, FIG. 7 is a simplified flow diagram illustrating example operations 700 that can be associated with determining resource allocation parameters using performance metrics that include UE specific feedback in accordance with one potential embodiment of the communication system. At 702, server 118 receives, from each of small cell radios 112a-112c, an indication of the total number of UEs served by each particular small cell radio for ABS subframes and the total number of UEs served for non-ABS subframes. At 704, server 118 receives from each of small cell radios 112a-112c, an indication of the total number of UEs for non-ABS subframes in which a neighboring small cell radio RSRP is at least equal to the serving small cell radio RSRP plus a minimum relative interference value, minRelativeInterf, and the total number of UEs for ABS subframes in which a neighboring small cell radio RSRP is at least equal to the serving small cell radio RSRP plus minRelativeInterf. At 706, server 118 receives, from each of small cell radios 112a-112c, a relative RSRP value for each of the corresponding UEs satisfying the condition from 704 in which a neighboring small cell radio RSRP is at least equal to the serving small cell radio RSRP+min-RelativeInterf and an indication as to whether each of the corresponding UEs is to be scheduled in non-ABS or ABS subframes.

At 708, server 118 orders the UEs for all small cell radios for non-ABS and ABS subframes in decreasing order of relative RSRP values. In certain embodiments, operations at 708 can be performed under an assumption that a serving small cell radio and interfering cell radios all transmit at the same power. At 710, server 118 computes SINRs for each of the UEs based on the received relative RSRP values for the corresponding UEs. At 712, server 118 discards any UEs having an SINR value below a predetermined percentile (e.g., the 5th percentile). At 714, server 118 sets the power level for the highest power level FFR resource blocks (e.g., $P_4$) to a value, which corresponds to a maximum transmit power that can be achieved when spreading the maximum allowable transmit power of small cell radios 112a-112b across all the frequency spectrum (e.g., system bandwidth). For example, if a small cell radio has a maximum allowable transmit power of 100 decibel-milliwatts (dBm), then at a 10 Mhz system bandwidth operation $P_4$ can be set to $100-10*LOG_{10}(100)=10$ dBm/Hz.

At 716, server 118 determines a value of the lowest power level FFR resource blocks (e.g., $P_2$) based upon a predetermined selection criterion utilizing the non-discarded UEs within the predetermined percentile (e.g., the 5th percentile). A first criterion according to a particular embodiment can consider the value of $P_2$ of a strongest interfering neighboring small cell radio such that when it transmits at power $P_2$ per RB and a serving small cell radio transmits at power $P_4$ per RB, then the interference PSD (e.g., transmit EPRE multiplied by channel gain) from the neighboring small cell radio is less than or equal to the serving cell PSD minus a predetermined threshold value 'Δ' (e.g., approximately 6 dB).

A second criterion according to a particular embodiment can consider neighboring small cell radios for which interference PSD is greater than or equal to the PSD of the serving small cell radio plus a predetermined threshold value A (e.g., approximately 6 dB). Thus, a power level for $P_2$ can be computed such that when all neighboring small cell radios according to the second criterion transmit at power level $P_2$ per RB but the serving small cell radio transmits at a power level $P_4$ per RB, then the expected SINR at the UE is above a minimum SINR threshold. In various embodiments, the minimum SINR threshold can be set to a value ranging from 5 dB to 10 dB.

At 718, depending on configuration, server 118 determines the maximum number of neighbors of a small cell radio in the network for either: 1) non-ABS subframes ($N^{max,nonABS}$) and for ABS subframes ($N^{max,ABS}$) or 2) both non-ABS and ABS subframes ($N^{max}$) that satisfy one of the predetermined selection criterion focusing on the UEs which were not discarded. In various embodiments, the maximum number of neighbors can be used to determine a number of neighboring small cell radios for which time and frequency domain ICIC that should be coordinated with for scheduling RBs at each small cell radio 112a-112c. In a particular embodiment, such as when operating in a Scheme 1 configuration, the number of neighbors of a small cell radio for non-ABS subframes $N^{max,nonABS}$ can be set equal to the number of neighbors that satisfy the first criterion or the second criterion for at least one UE served by the small cell radio for non-ABS subframes. In a particular embodiment, such as when operating in a Scheme 1 configuration, the number of neighbors of a small cell radio for ABS subframes $N^{max,ABS}$ can be set equal to the number of neighbors that satisfy the first criterion or the second criterion for at least one UE served by the small cell radio for ABS subframes. In another embodiment, such as when operating in a Scheme 2 configuration, the maximum number of neighbors of a small cell radio for both non-ABS and ABS subframes ($N^{max}$) can be set equal to the number of neighbors that satisfy the first criterion or the second criterion for at least one UE served by the small cell radio among both non-ABS and ABS subframes.

At 720, if a different FFR pattern is to be used for non-ABS and ABS subframes, then server 118 computes $\rho_{FFRlow-interf,nonABS}$ such that $\rho_{FFRlow-interf,nonABS} = \rho_{FFR,nonABS}/N^{max,nonABS}$ and computes $\rho_{FFRlow-interf,ABS}$ such that $\rho_{FFRlow-interf,ABS} = \rho_{FFR,ABS}/N^{max,ABS}$. However, if a same FFR pattern is to be used for non-ABS and ABS subframes, then server 118 computes $\rho_{FFRlow-interf}$ such that $\rho_{FFRlow-interf} = \rho_{FFR}/N^{max}$.

At 722, server 118 determines the reuse one power level value (e.g., $P_1$) based upon one or more of the determined FFR power level values (e.g., $P_4$ or $P_2$). In one embodiment, the reuse one power level value ($P_1$) is set to the highest power level for FFR resource blocks (e.g., $P_4$) such that $P_1=P_4$ and the relative value of $P_2$ as can be set using operations at 716 can be used. Under this embodiment, $P_1$ and $P_2$ can be selected such that the total power for the small cell radios add up to the maximum allowable transmit power for small cell radios 112a-112c [e.g., $P_1$*(number of resource elements scheduled at $P_1$)+$P_2$*(number of resource elements scheduled at $P_2$)+$P_4$*(number of resource elements scheduled at $P_4$)=total power for the PDSCH data channel (which is the total power at the small cell radio minus the power for CRS, synchronization signals and other control signaling at the physical (PHY) layer], which is typically set by a network operator, service provider or equipment manufacturer. In another embodiment, the reuse one power level value ($P_1$) is set to the lowest power level for FFR resource blocks (e.g., $P_2$) such that $P_1=P_2$. Under this other embodiment, $P_1$ and $P_2$ can again be selected such that the total power for the small cell radios add up to the maximum allowable transmit power for a small cell radio. Operations 700 can then end.

Figure 8:
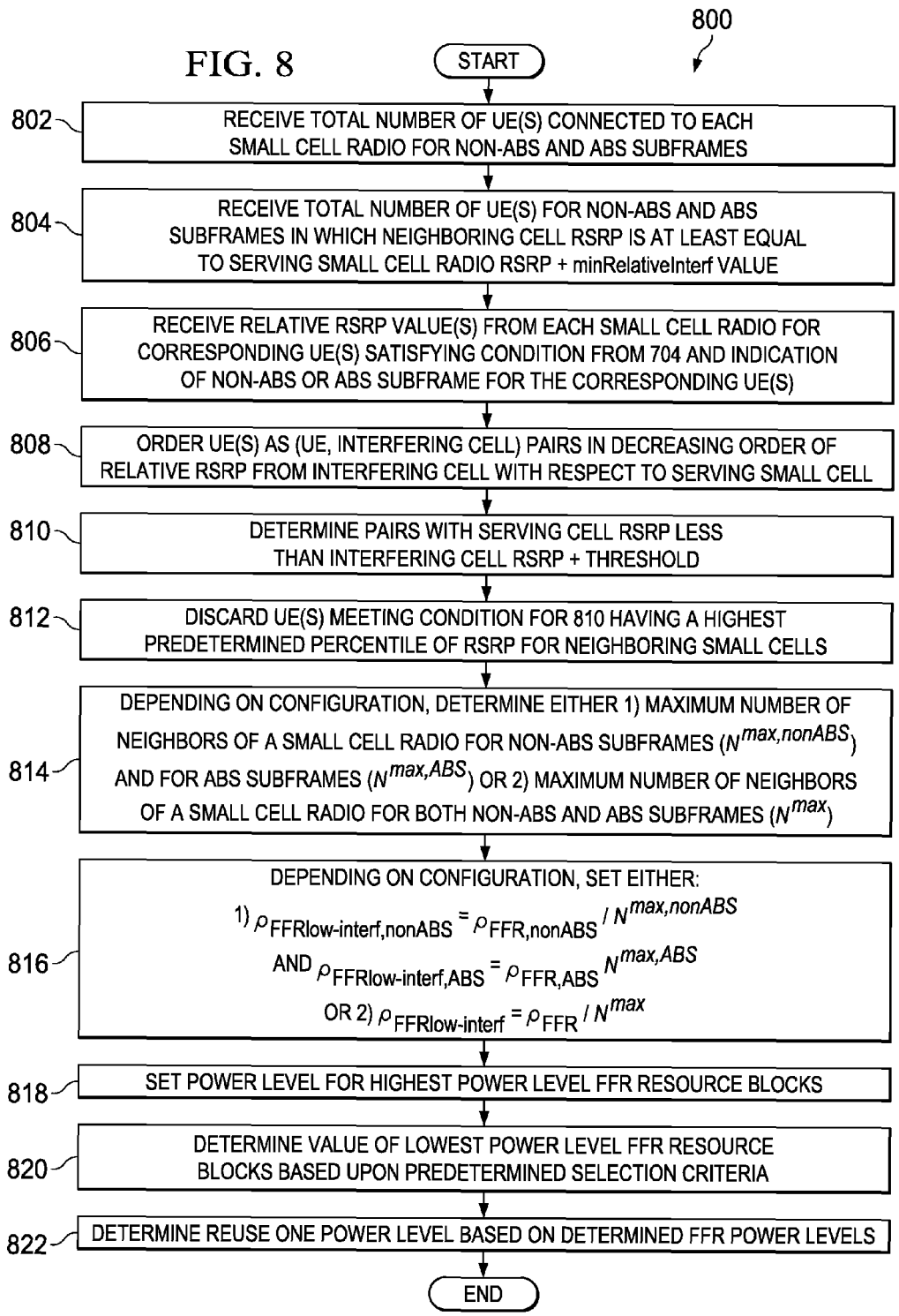
FIG. 8 is a simplified flow diagram illustrating other example operations that can be associated with determining resource allocation parameters using performance metrics that include UE specific feedback in accordance with one potential embodiment of the communication system.

Referring now to FIG. 8, FIG. 8 is a simplified flow diagram illustrating other example operations 800 that can be associated with determining resource allocation parameters using performance metrics that include UE specific feedback in accordance with one potential embodiment of communication system 100. At 802, server 118 receives, from each of small cell radios 112a-112c, an indication of the total number of UEs served by each particular small cell radio for ABS subframes and the total number of UEs served for non-ABS subframes. At 804, server 118 receives from each of small cell radios 112a-112c, an indication of the total number of UEs for non-ABS in which a neighboring small cell radio RSRP is at least equal to the serving small cell radio RSRP plus a minimum relative interference value, minRelativeInterf, and the total number of UEs for ABS subframes in which a neighboring small cell radio RSRP is at least equal to the serving small cell radio RSRP plus minRelativeInterf. At 806, server 118 receives, from each of small cell radios 112a-112c, a relative RSRP value for each of the corresponding UEs satisfying the condition from 804 in which a neighboring small cell radio RSRP is at least equal to the serving small cell radio RSRP+minRelativeInterf and an indication as to whether each of the corresponding UEs is to be scheduled in non-ABS or ABS subframes.

At 808, server 118 orders UE, as (UE, interfering small cell radio) pairs, in a decreasing order according to the relative RSRP for an interfering small cell radio with respect to a UEs serving small cell radio. At 810, server 118 determines pairs from the ordered set of pairs having a serving small cell radio RSRP less than a corresponding interfering small cell radio RSRP plus a predetermined threshold value $\Delta$. In various embodiments, the predetermined threshold value can be set to approximately 5 dB. At 812, server 118 discards UEs meeting the condition for 810 having a highest predetermined percentile (e.g., 5th percentile) of RSRP for neighboring small cell radios.

At 814, depending on configuration, server 118 determines the maximum number of neighbors of a small cell radio in the network for either: 1) non-ABS subframes ($N^{max,nonABS}$) and for ABS subframes ($N^{max,ABS}$) or 2) both non-ABS and ABS subframes ($N^{max}$) focusing on UEs that were not discarded at 812. In a particular embodiment, such as when operating in a Scheme 1 configuration, the number of neighbors of a small cell radio for non-ABS subframes $N^{max,nonABS}$ can be set equal to the maximum number of neighbors over those UEs associated with a given serving small cell radio not discarded at 812 that satisfy a criterion such that the serving small cell radio transmit PSD is less than an interfering small cell radio PSD plus a predetermined threshold value A (e.g., approximately 6 dB). In a particular embodiment, such as when operating in a Scheme 1 configuration, the number of neighbors of a small cell radio for ABS subframes $N^{max,ABS}$ can be set equal to the maximum number of neighbors over those UEs associated with a given serving small cell radio not discarded at 812 that satisfy a criterion such that the serving small cell radio transmit PSD is less than an interfering small cell radio PSD plus a predetermined threshold value A (e.g., approximately 6 dB). In another embodiment, such as when operating in a Scheme 2 configuration, the maximum number of neighbors of a small cell radio for both non-ABS and ABS subframes ($N^{max}$) can be set equal to the number of neighbors that satisfy the first criterion or the second criterion for at least one UE served by the small cell radio among both non-ABS and ABS subframes.

At 816, if a different FFR pattern is to be used for non-ABS and ABS subframes, then server 118 computes $\rho_{FFRlow-interf,nonABS}$ such that $\rho_{FFRlow-interf,nonABS} = \rho_{FFR,nonABS}/N^{max,nonABS}$ and computes $\rho_{FFRlow-interf,ABS}$ such that $\rho_{FFRlow-interf,ABS} = \rho_{FFR,ABS}/N^{max,ABS}$. However, if a same FFR pattern is to be used for non-ABS and ABS subframes, then server 118 computes $\rho_{FFRlow-interf}$ such that $\rho_{FFRlow-interf} = \rho_{FFR}/N^{max}$.

At 818, server 118 sets the power level for the highest power level FFR resource blocks (e.g., $P_4$) to a value, which corresponds to the maximum transmit power that can be achieved when spreading the maximum allowable transmit power of small cell radios 112a-112c across all the frequency spectrum (e.g., system bandwidth), similar to that as described at 714 for the embodiment shown in FIG. 7. At 820, server 118 determines a value of the lowest power level FFR resource blocks (e.g., $P_2$) based upon a predetermined selection criterion utilizing the non-discarded UEs within the predetermined percentile (e.g., the 5th percentile). A first criterion according to a particular embodiment can consider the value of $P_2$ of a strongest interfering neighboring small cell radio such that when it transmits at power $P_2$ per RB and a serving small cell radio transmits at power $P_4$ per RB, then the interference PSD from the neighboring small cell radio is less than or equal to the serving cell PSD minus a predetermined threshold value '$\Delta$' (e.g., 6 dB). A second criterion according to a particular embodiment can consider neighboring small cell radios for which interference PSD is greater than or equal to the PSD of a serving small cell radio plus a predetermined threshold value $\Delta$ (e.g., 6 dB). Thus, a power level for $P_2$ can be computed such that when all neighboring small cell radios according to the second criterion transmit at power level $P_2$ per RB but the serving small cell radio transmits at a power level $P_4$ per RB, then the expected SINR at the UE is above a minimum SINR threshold.

At 822, server 118 determines the reuse one power level value (e.g., $P_1$) based upon one or more of the determined FFR power level values (e.g., $P_4$ or $P_2$). In one embodiment, the reuse one power level value ($P_1$) is set to the highest power level for FFR resource blocks (e.g., $P_4$) such that $P_1=P_4$ and the relative value of $P_2$ as can be set using operations at 820 can be used. Under this embodiment, $P_1$ and $P_2$ can selected such that the total power for the small cell radios add up to the maximum allowable transmit power for a small cell radio. In another embodiment, the reuse one power level value ($P_1$) is set to the lowest power level for FFR resource blocks (e.g., $P_2$) such that $P_1=P_2$. Under this other embodiment, $P_1$ and $P_2$ can again be selected such that the total power for the small cell radios add up to the maximum allowable transmit power for small cell radios 112a-112c, similar to that as described at 722 for the embodiment shown in FIG. 7. Operations 800 can then end.

Figure 9:
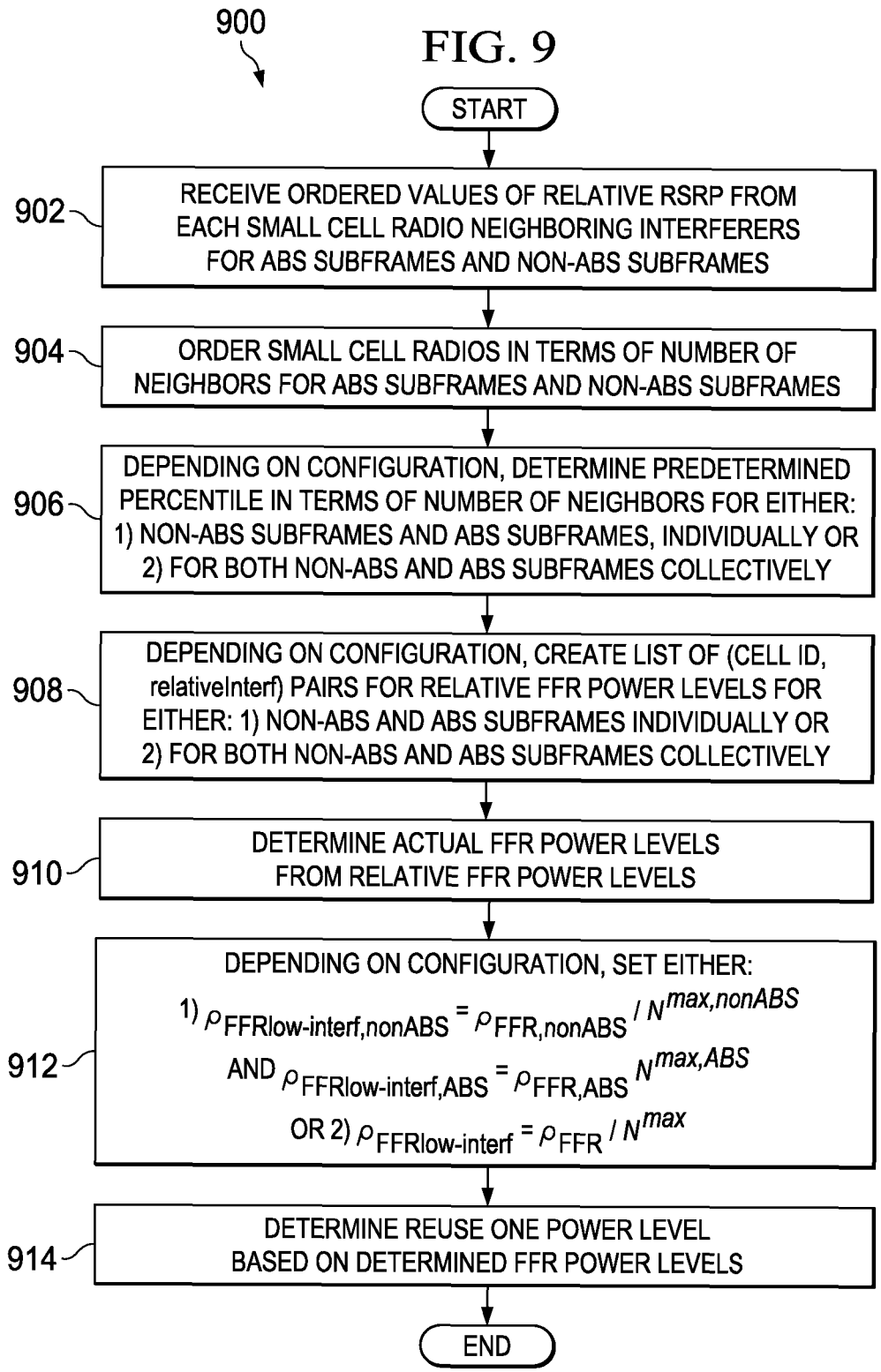
FIG. 9 is a simplified flow diagram illustrating example operations that can be associated with determining resource allocation parameters using performance metrics that include cell specific feedback in accordance with one potential embodiment of the communication system.

Referring now to FIG. 9, FIG. 9 is a simplified flow diagram illustrating example operations 900 that can be associated with determining resource allocation parameters using performance metrics that include cell specific feedback in accordance with one potential embodiment of communication system 100. At 902, server 118 receives ordered values of relative RSRP from each of small cell radios 112a-112c for neighboring interferers for non-ABS and ABS subframes. In one embodiment, the ordered values of relative RSRP can be sent in separate messages for non-ABS subframes and for ABS subframes and a flag can be set in each message indicating the subframe type for which the cell specific feedback corresponds. In another embodiment, a single message can be sent including ordered values of relative RSRP for both non-ABS and ABS subframes. In some embodiment, a flag can be included in the single message indicating to which subframe type a set of ordered values corresponds.

In various embodiments, the ordered values can be ordered in a descending order from a neighboring small cell radio having a maximum relative interference (relativeInterf) such that the strongest interfering neighboring small cell radio RSRP is equal to at least the serving small cell radio RSRP plus relativeInterf. The ordered values can include as many values as the number of neighboring small cell radios meeting the condition of serving small cell radio RSRP+relativeInterf for different values of relativeInterf that may exist for each neighboring small cell radio. In one embodiment, the ordered values can include pairs of information identifying a neighboring small cell ID and its corresponding relative RSRP. At a minimum, it is assumed that at least one UE is associated with a given small cell radio in order to provide the cell specific feedback for the small cell radio.

At 904, server 118 determines an order for the small cell radios in terms of the number of neighbors for non-ABS and ABS subframes for each small cell radio. At 906, depending on configuration, server 118 determines a predetermined percentile (e.g., 80th percentile) of the ordered small cell radios in terms of the number of neighbors for either: 1) non-ABS subframes such that $N^{max,nonABS}$ can be set to the corresponding number for the predetermined percentile and ABS subframes such that $N^{max,ABS}$ can be set to the corresponding number for the predetermined percentile or 2) a maximum among both non-ABS and ABS subframes $N^{max}$ for the predetermined percentile. At 908, depending on configuration, server 118 creates a list of (cell, relativeInterf) pairs for relative FFR power levels ($P_4$, $P_2$) for either: 1) non-ABS subframes and ABS subframes, individually, or 2) both non-ABS and ABS subframes, collectively, chosen such that when a given cell transmits at $P_4$ per RB and neighboring cells transmit at $P_2$ per RB, then for a predetermined percentage of pairs (e.g., 80%), the resulting interference is lowered to a predetermined threshold below serving cell power. This determines the relative values for the FFR power levels ($P_2$, $P_4$).

At 910, server 118 determines actual FFR power levels for $P_2$ and $P_4$ from the relative power levels using operations similar to those as described when using UE specific feedback as discussed at 714 and 716 for the embodiment shown in FIGS. 7 or 818 and 820 as discussed for the embodiment shown in FIG. 8 as adjusted to account for the cell specific feedback discussed for the embodiment described in FIG. 9.

At 912, if a different FFR pattern is to be used for non-ABS and ABS subframes, then server 118 computes $\rho_{FFRlow-interf,nonABS}$ such that $\rho_{FFRlow-interf,nonABS}=\rho_{FFR,nonABS}/N^{max,nonABS}$ and computes $\rho_{FFRlow-interf,ABS}$ such that $\rho_{FFRlow-interf,ABS}=\rho_{FFR,ABS}/N^{max,ABS}$. However, if a same FFR pattern is to be used for non-ABS and ABS subframes, then server 118 computes $\rho_{FFRlow-interf}$ such that $\rho_{FFRlow-interf}=\rho_{FFR}/N^{max}$.

At 914, server 118 determines the reuse one power level value (e.g., $P_1$) based upon one or more of the determined FFR power level values (e.g., $P_4$ or $P_2$). In one embodiment, the reuse one power level value ($P_1$) is set to the highest power level for FFR resource blocks (e.g., $P_4$) such that $P_1=P_4$ and the relative value of $P_2$ as can be set using operations at 822 can be used. Under this embodiment, $P_1$ and $P_2$ can selected such that the total power for the small cell radios add up to the maximum allowable transmit power for a small cell radio. In another embodiment, the reuse one power level value ($P_1$) is set to the lowest power level for FFR resource blocks (e.g., $P_2$) such that $P_1=P_2$. Under this other embodiment, $P_1$ and $P_2$ can again be selected such that the total power for the small cell radios add up to the maximum allowable transmit power for a small cell radio similar to that as shown at 722 for the embodiment shown in FIG. 7. Operations 900 can then end.

Figure 10:
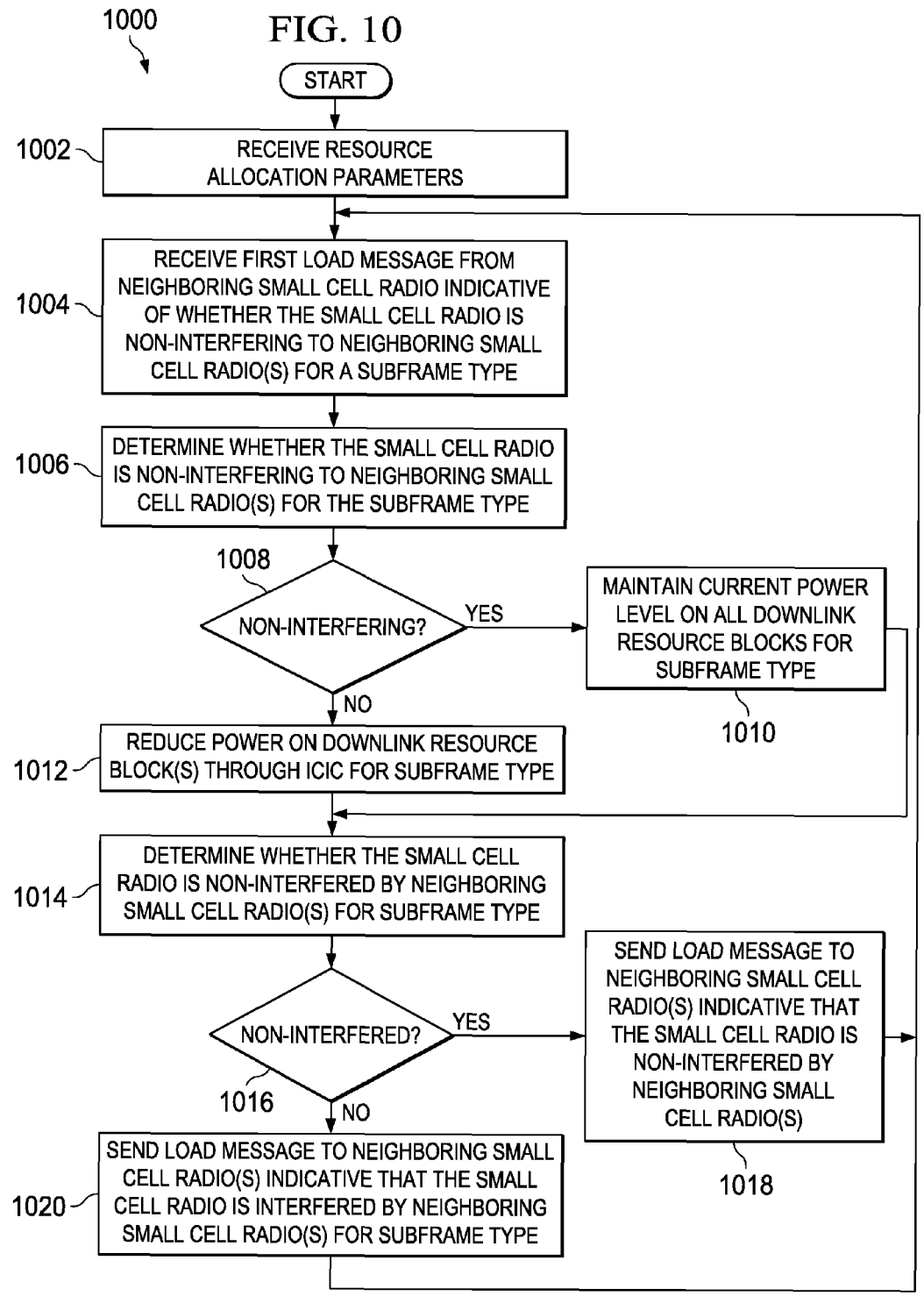
FIG. 10 is a simplified flow diagram illustrating example operations that can be associated with selecting small cell radios for time and frequency domain ICIC in accordance with one potential embodiment of the communication system.
Figure 11:
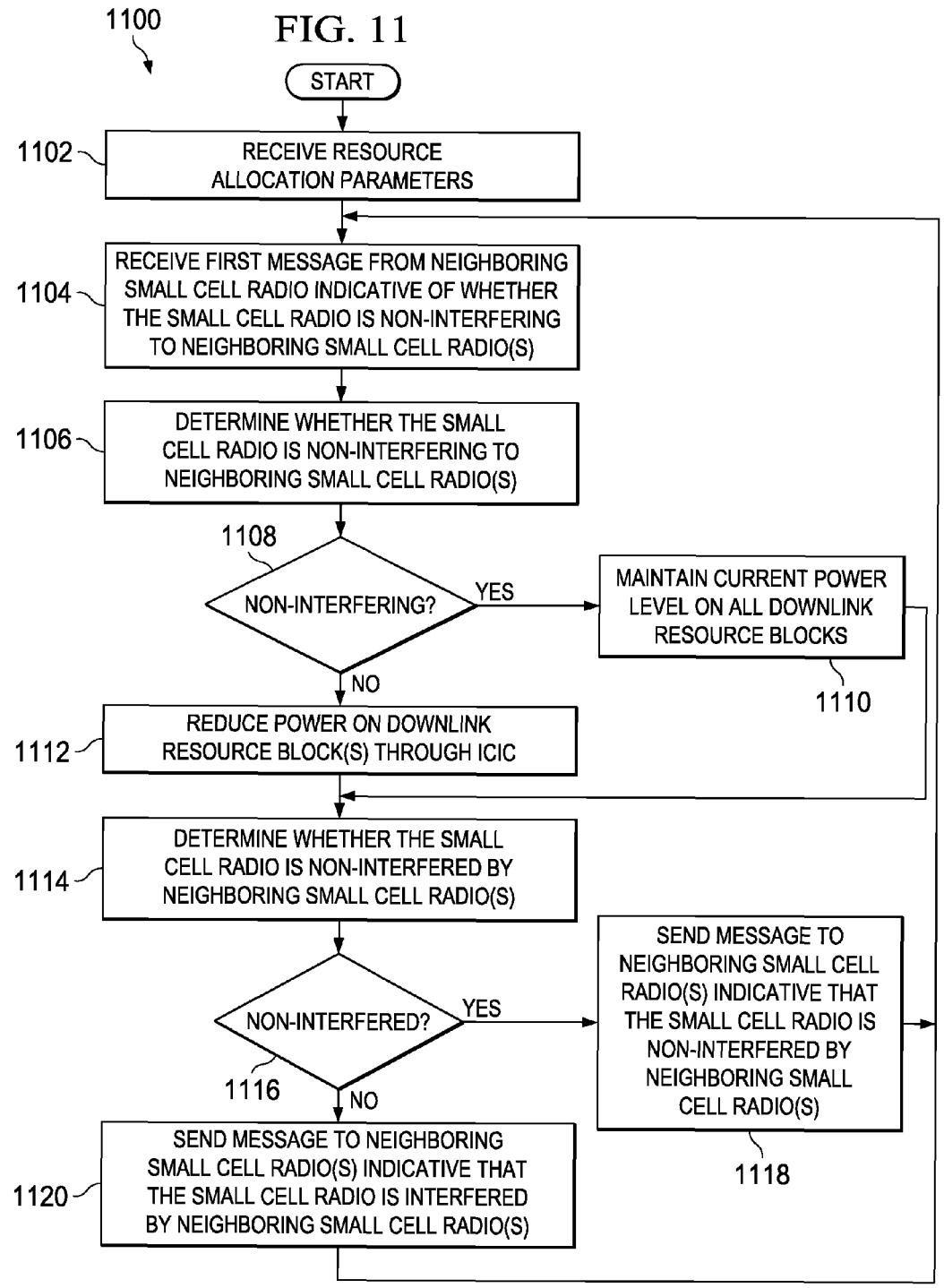
FIG. 11 is a simplified flow diagram illustrating other example operations that can be associated with selecting small cell radios for time and frequency domain ICIC in accordance with one potential embodiment of the communication system.
Figure 12:
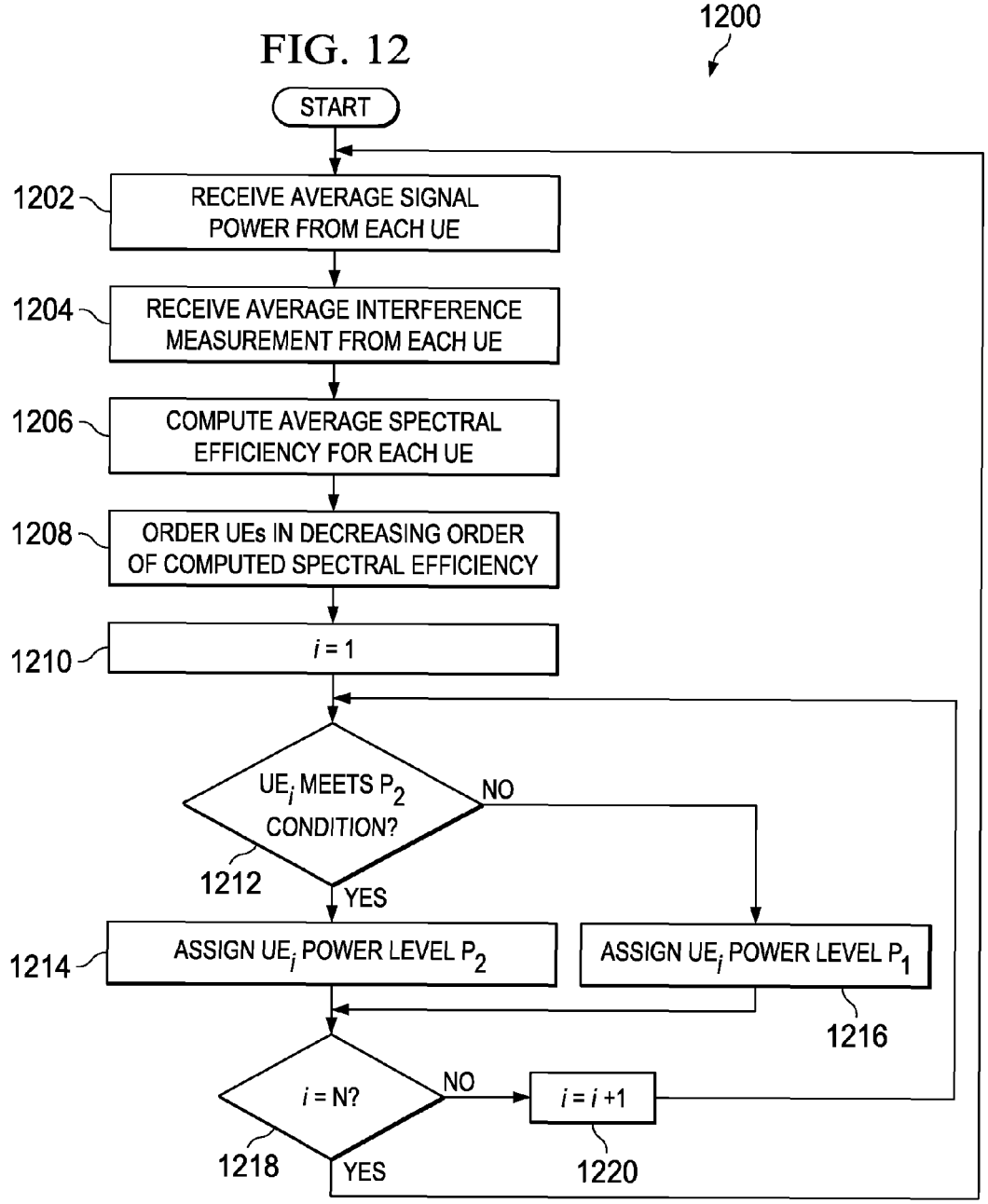
FIG. 12 is a simplified flow diagram illustrating example operations that can be associated with determining downlink transmission power levels in accordance with one potential embodiment of the communication system.

FIGS. 10-12 illustrate various example operations that can be associated with selecting small cell radios that may be coordinated with for time and frequency domain ICIC in accordance with various embodiments of communication system 100 when operating in a Scheme 1 or a Scheme 2 configuration. In general, if a first small cell radio does not serve a UE on an edge of its coverage area that overlaps with a given neighboring small cell radio, then the neighboring small cell radio does not need to reduce power on any RB for the first small cell radio to serve its cell edge UEs. It should be noted, however, that the converse may not be true.

Referring to FIG. 1A, consider small cell radio 112a serving UE 116a and 116b, small cell radio 112b serving UE 116c and 116d and small cell radio 112c serving UE 116e and 116f. As illustrated in FIG. 1A, UE 116a and 116b could be cell edge UE served by small cell radio 112a at edges of small cell coverage area 114a that do not overlap with coverage area 114b for small cell radio 112b or with coverage area 114c for small cell radio 112c. Thus, small cell radios 112b and 112c do not need to reduce power on any RB for UEs served by these small cell radios in order for small cell radio 112a to serve cell edge UEs 116a and 116b.

As discussed herein, various embodiments of the present disclosure are directed to selecting a subset of small cell radios 112a-112c in the communication system 100 that should participate in time and frequency domain ICIC while all other cells may transmit at the same power (e.g., PSD) on all RBs for an available system bandwidth. When operating in time and frequency domain ICIC environment, if a particular small cell radio does have not any interfering neighboring small cell radios there is no reason for the particular small cell radio to reduce power on any of its downlink RBs. Instead, it is desirable to perform interference management only on the subset of small cell radios experiencing interference from other neighboring small cell radios in order to maximize network capacity (e.g., the number of UEs that are served).

Accordingly, a small cell radio that does not cause significant interference to UEs in neighboring small cell radios does not have to lower power on any of its downlink RBs. In addition, small cell radios which do participate in ICIC and have UEs which suffer from interference neighboring cell radios (e.g., neighboring small cell and/or macro cell radios) can obtain more resources at a higher SINR without a loss of performance in small cell radios which are not interfering neighbors. In various embodiments, it is assumed that all small cell radios that participate in time and frequency domain ICIC have a same fraction of resources in the reuse one portion and the FFR portion of the spectrum for a given FFR scheme (e.g., Scheme 1 or Scheme 2). In accordance with one or more embodiments, a particular small cell radio should participate in time and frequency interference coordination with neighboring small cell radios (when operating in either Scheme 1 or a Scheme 2 configuration) if either of the following is true: 1) at least one of the UEs of the small cell radios suffers from high interference from a neighboring small cell radio; or 2) a given small cell radio causes high interference to a UE of a neighboring small cell radio. Time domain interference coordination by small cell radios 112a-112c with neighboring macro cell radio 120 will be carried out according to the ABS patterns obtained from macro cell radio 120 (e.g., through sniffing, as provided by server 118 to the small cell radios, etc. as described herein) In various embodiments, various processes for facilitating distributed interference management are provided in which for a particular small cell radio that is non-interfering, it does not reduce its power on any RBs and a particular small cell radio that is non-interfered, it does not request its neighboring small cell radios to reduce power levels on any RBs.

In determining whether a particular cell is a non-interfering cell, it is assumed that a given small cell radio transmits with power per RB of $P_1$. A particular small cell radio is considered to be non-interfering if there is no neighboring small cell radio such that when the neighboring small cell radio also transmits with power per RB of $P_1$, any UE connected to the neighboring small cell radio receives downlink signals at a power less than or equal to the downlink signal strength of the neighbor minus a fixed threshold value. In one or more embodiments, the criterion may be evaluated on the basis of RSRP measurements. Thus, in particular embodiments, a given small cell radio is considered non-interfering if the following is true of all neighboring cells: RSRP from the given small cell radio is less than or equal to the RSRP for a neighboring small cell radio minus the fixed threshold value as measured by any UE served by the neighboring small cell radio. In particular embodiments, determining whether a given small cell radio is non-interfering can involve receiving inputs from multiple neighboring small cell radios in LTE networks.

In determining whether a particular small cell radio is a non-interfered cell, it is assumed that a given small cell radio transmits with power per RB of $P_1$. A small cell radio is considered to be non-interfered if there is no neighboring small cell radio such that when the neighboring small cell radio also transmits with power per RB of $P_1$, any UE connected to the given small cell radio receives downlink signals at a power greater than or equal to the signal strength of the neighboring small cell radio (as received at any UE served by the given small cell radio) plus a fixed threshold value. In one or more embodiments, the criterion may be evaluated on the basis or RSRP measurements. In a particular embodiment, a given small cell radio is considered to be non-interfered if the following is true of all neighboring cells: RSRP from the given small cell radio is greater than the RSRP for the neighboring cell plus the fixed threshold value as measured by any UE served by the given small cell radio. In particular embodiments, whether a small cell radio is non-interfered can be evaluated locally at the small cell radio in LTE networks.

In a distributed interference management scheme according to one or more embodiments, in a first component, when a particular small cell A is non-interfering to a given small cell B, then the given small cell B indicates to small cell A that it has no cell edge UEs. In a second component, when no neighboring cell indicates to small cell B that it has cell edge UEs, then small cell B does need not to reduce its transmit power to $P_2$ on any RB. In such a case, small cell B can distribute power across the RBs in any manner, as long as the power constraints corresponding to power per RB for $P_1$ and $P_4$ are obeyed on appropriate RBs. In a third component, if a small cell is non-interfered, then it does not need to indicate to any neighboring small cell that it has cell edge UEs.

Referring to FIG. 10, FIGS. 10 is a simplified flow diagram illustrating example operations 1000 that can be associated with selecting small cell radios that may be coordinated with for time and frequency domain ICIC in accordance with one potential embodiment of communication system 100. In particular, the embodiment shown in FIG. 10 can be associated with operations for determining interfering neighboring small cell radios when operating in a Scheme 1 configuration in which the number of neighboring cells that are coordinated with for time and frequency domain ICIC are specific to non-ABS subframes and ABS subframes. Hence, the ratio of resources with high SINR with respect to total FFR resources will likely be different between non-ABS and ABS subframes.

As noted herein, for embodiments in which a Scheme 1 configuration is implemented, small cell radios 112a-112c can exchange X2 messaging that includes proprietary information elements (IEs) indicating resources (e.g., RBs) allocated to non-ABS and ABS subframes. The small cells can exchange load information messaging using the proprietary IEs in order to provide a distributed X2 scheme for coordinating resources for transmission. In one embodiment, the proprietary IEs can include a Relative Narrow-band Transmit Power (RNTP) IE that indicates on which RBs a small cell is to transmit with higher or lower power levels (e.g., actual power levels are indicated by server 118) and an ABS IE that indicates to which subframe(s) the RNTP IE applies. Thus, the distributed scheme is essentially a coloring algorithm applied separately to ABS and non-ABS subframes through operations involving the proprietary load information RNTP and ABS IEs.

For load information messaging, the proprietary RNTP IE can include a bit-mapping subframes to which a particular FFR pattern is applicable and the ABS IE can include a bit corresponding to whether the FFR pattern is to be applied to ABS subframes or non-ABS subframes (e.g., a one can correspond to ABS subframes and a zero can correspond to non-ABS subframes, or vice-versa). The load messaging can also include RNTP coloring information for the particular FFR pattern in which a bit corresponding to a particular RB is either given a value of one or zero. The FFR pattern is assumed to be periodic in nature and, in some embodiments, the start subframe and the end subframe can also be indicated in the proprietary RNTP IE.

For the embodiment shown in FIG. 10, an ICIC scheme is assumed through which resources with power levels $P_4$ and $P_2$ are determined in a distributed manner through the exchange of load information messages. In a particular embodiment, if a bit for a given RB is set for a given FFR pattern included in the RNTP IE of a load message sent from a particular small cell radio, then it represents an indication that the particular small cell radio will use a transmission power per RB of $P_4$ for the given RB for the subframe type indicated by the ABS IE included in the load message. However, if the bit is not set, then this represents an indication that the particular small cell radio will use a transmission power per RB of $P_2$ for the given RB. If a particular small cell radio is non-interfering to a given small cell radio, the FFR pattern for the RNTP IE within the load message from the given cell to the particular cell can contain all zeros for the FFR RBs. A small cell radio that receives no load message or only load messages from neighboring cells with all zeros for FFR RBs does not need to lower its power on any RBs. If a small cell radio is a non-interfered small cell radio, then it only sends load messages with all zeros to its neighboring small cell radios. However, this small cell radio may be required to reduce power on certain RBs on the basis of load messages received from other small cell radios.

At 1002, each small cell radio 112a-112c receives resource allocation parameters from server 118. The resource allocation parameters can include, at least in part, relative power levels for $P_1$, $P_2$ and $P_4$, an identification of sets of RBs that are to be scheduled in ABS and non-ABS subframes, the fraction of resources in which a cell radio can expect higher SINR in the FFR portion of the system bandwidth for non-ABS subframes $\rho_{FFRlow-interf,nonABS}$ and for ABS subframes $\rho_{FFRlow-interf,ABS}$ and a fraction of resources for each small cell radio can obtain a high SINR in the FFR portion of the system bandwidth for ABS and non-ABS subframes. In some embodiments, server 118 can include a Scheme trigger in the resource allocation parameters, which can trigger a configuration of each small cell radio 112a-112c to provide for different coloring for a specific set (type) of subframes (e.g., for a Scheme 1 configuration) or to provide for a same coloring for all subframe types (e.g., a Scheme 2 configuration).

At 1004, a particular small cell radio, such as, for example, small cell radio 112b, receives a first load message from one or more neighboring small cell radios, such as, for example, small cell radio 112c indicative of whether the small cell radio is non-interfering to the neighboring cell(s) for a particular subframe type as indicated by the ABS IE included in the load message. In one or more embodiments, a small cell radio is considered to be non-interfering if there is no neighboring cell such that when the neighboring cell also transmits with a power per RB of $P_1$, any of one or more UEs (e.g., UE 116e and/or UE 116f) connected to small cell radio 112c receives downlink signals at a power less than or equal to the signal strength of small cell radio 112c minus a fixed threshold.

In one or more embodiments, the criterion that a neighboring small cell radio uses to determine whether a given small cell radio is an interfering small cell radio for a subframe type can include an evaluation on the basis of RSRP measurements such that the given small cell radio is considered non-interfering if the RSRP from the given cell is less than the RSRP for the neighboring small cell radio minus a fixed predetermined threshold value (e.g., approximately 6 dB) as measured by any UE served by the neighboring small cell radio. In one or more embodiments, when a given small cell radio is considered to be non-interfering to a neighboring cell for the particular subframe type, then neighboring small cell radio indicates to the given small cell radio that it has no cell edge UEs connected to it.

In a particular embodiment, if a given small cell radio is non-interfering to a neighboring small cell radio for a particular subframe type, the load message from the neighbor small cell radio can contains all zero bits values for the FFR RBs for the FFR pattern included in the RNTP IE for the load message. A small cell radio that receives no load message or only load messages from neighboring small cell radios with all zero bit values for FFR RBs for a particular subframe type, does not need to lower its power on any RBs for that subframe type.

At 1006, small cell radio 112b cell determines whether it is a non-interfering cell to neighboring small cell radios (e.g., small cell radio 112c and small cell radio 112a) for the subframe type based upon the received first load message. At 1008, if the first load message is indicative of the small cell radio being a non-interfering small cell radio for the subframe type the operations can continue to 1010. At 1010, the small cell radio maintains its current power level on all downlink RBs for the subframe type across the start and end subframes indicated in the RNTP IE and the operations can continue to 1014. Accordingly, the small cell radio (e.g., small cell radio 112b) is selected to not participate in frequency domain ICIC for the particular subframe type. For example, in a particular embodiment when no neighboring cell indicates that it has cell edge UEs, the cell does not reduce power to $P_2$ on any RB and can distribute power across the RBs in any manner across the start/end subframes for the subframe type, as long as the power constraints corresponding to power per RB for $P_1$ and $P_4$ are obeyed on appropriate RBs. However, at 1008, if the first message is indicative of the cell being an interfering cell for the subframe type the operations continue to 1012. At 1012, the small cell radio reduces power on one or more downlink resource blocks through participation in ICIC for the subframe type and the operations continue to 1014.

At 1014, the small cell radio (e.g., small cell radio 112b) determines if it is non-interfered by one or more neighboring small cell radios for the subframe type. In one or more embodiments, the small cell radio determines that it is non-interfered for a subframe type by one or more neighboring cells if, when a neighboring small cell radio transmits with a power per RB of $P_1$ on the subframe type, any UE connected to the small cell radio receives downlink signals at a power greater than or equal to the signal strength from the neighboring small cell radio plus a fixed threshold (e.g., approximately 6 dB).

In particular embodiments, the criterion can be evaluated on the basis of RSRP measurements such that a serving small cell radio is considered to be non-interfered if, for all neighboring small cell radios for the subframe type, RSRP from the serving small cell radio is greater than the RSRP for the neighboring small cell radio plus a fixed threshold as measured at any UE associated with the serving small cell radio. At 1016, if the small cell radio determines that it is non-interfered by neighboring small cell radio(s) for the subframe type the operations can continue to 1018. At 1018, the small cell radio sends a load message to the neighboring small cell radio(s) indicative that the small cell radio is non-interfered by neighboring small cell radio(s) for the subframe type. In a particular embodiment, if a small cell is a non-interfered small cell radio for a particular subframe type, the small cell radio sends load messages with all zero bit values for a particular FFR pattern included in the RNTP IE for the subframe type (e.g., as indicated by the ABS IE) to its neighboring small cell radio(s). In response to receiving the load message indicative that the small cell radio is non-interfered, one or more of the neighboring small cell radio(s) may maintain its current power levels on all downlink RBs and not participate in an ICIC scheme with the small cell radio (e.g., small cell radio 112b) for the subframe type. The operations can then return to 1004 to process additional messages that may be received.

However, at 1016, if the small cell radio determines that it is interfered by one or more neighboring small cell radio(s) for the subframe type, the operations can continue continues to 1020. At 1020, the small cell radio sends a load message to the neighboring cell(s) indicative that the cell is interfered by the neighboring cell(s) for the subframe type. In response to receiving the message indicative that the small cell radio is interfered by the neighboring cell, the neighboring small cell radio(s) may reduce the power levels on one or more downlink RBs, such as FFR RBs for the subframe type, and thus be selected for participation in the ICIC scheme. The operations then return to 1004 to process additional messages that may be received.

Accordingly, in a particular embodiment for a small cell radio that is not causing interference to any of the neighboring small cell radios even when transmitting at $P_1$, for a particular subframe type all RBs can have power level $P_1$. If a small cell radio is not receiving interference from any of the neighboring small cell radios for a particular subframe type, then all power levels in the RBs can be $P_2$ because it doesn't need to boost its power to UEs at a cell edge.

Other embodiments are directed to user equipment (UE) power level selection for downlink transmissions. It should be understood that in an LTE system the power level at which a particular UE is served on the downlink by a small cell radio cannot vary arbitrarily from one subframe to another because the UE needs to know the ratio of the reference signal power which is constant across all of the bandwidth to the data signal power in order to perform decoding optimally. Considering downlink transmission modes in which a UE demodulates using Cell Specific Reference Signals (CRS) received from the cell, the UE is signaled the ratio of CRS energy per resource element (EPRE) to the data (e.g., Physical Downlink Shared Channel (PDSCH) EPRE via radio resource control (RRC) protocol signaling. In order to change the PDSCH EPRE, the UE needs to be informed via RRC signaling a few subframes in advance of the change. The CRS EPRE is typically kept constant over long periods of time. Hence, a serving cell needs to compute the PDSCH EPRE per UE in a semi-static matter in which cell edge UEs have the highest PDSCH EPRE and the cell interior UEs have lower PDSCH EPRE.

Referring to FIG. 11, FIG. 11 is a simplified flow diagram illustrating other example operations 1100 that can be associated with selecting small cell radios that may be coordinated with for time and frequency domain ICIC in accordance with one potential embodiment of communication system 100. In particular, the embodiment shown in FIG. 11 may be associated with operations for determining interfering neighboring small cell radios under a Scheme 2 configuration in which the number of neighboring small cells that are coordinated with for time and frequency domain ICIC are the same for non-ABS subframes and ABS subframes.

In some embodiments, frequency domain ICIC can be performed among small cell radios for ABS and non-ABS subframes using X2 messaging by exchanging RNTP messages between the small cell radios. Time domain ICIC with a neighboring macro cell radio (e.g., macro cell radio 120) can be performed according to the ABS pattern provided to the small cell radios.

The RNTP messages can include a bit-mapping of resource blocks (RB) in which a bit corresponding to a particular RB is either given a value of one or zero. For the embodiment shown in FIG. 11, an ICIC scheme is assumed through which resources with power levels $P_4$ and $P_2$ are determined in a distributed manner through the exchange of RNTP messages. In a particular embodiment, if a bit for a given RB is set within a RNTP message sent from a particular small cell radio, then it represents an indication that the particular small cell radio will use a transmission power per RB of $P_4$ for the given RB. However, if the bit is not set within the RNTP message, then this represents an indication that the particular small cell radio will use a transmission power per RB of $P_2$ for the given RB. If a particular small cell radio is non-interfering to a given small cell radio, the RNTP message from the given cell to the particular cell can contain all zeros for the FFR RBs. A small cell radio that receives no RNTP message or only RNTP messages from neighboring cells with all zeros for FFR RBs does not need to lower its power on any RBs. If a small cell radio is a non-interfered small cell radio, then it only sends RNTP messages with all zeros to its neighboring small cell radios. However, this small cell radio may be required to reduce power on certain RBs on the basis of RNTP messages received from other small cell radios.

At 1102, each small cell radio 112a-112c receives resource allocation parameters from server 118. The resource allocation parameters can include, at least in part, power levels for $P_1$, $P_2$ and $P_4$, $\rho_{FFR}$ and $\rho_{FFRlow-interf}$. At 1104, a particular small cell radio, such as, for example, small cell radio 112b, receives a first message from one or more neighboring small cell radios, such as, for example, small cell radio 112c indicative of whether the small cell radio is non-interfering to the neighboring cell(s). In one or more embodiments, a small cell radio is considered to be non-interfering if there is no neighboring cell such that when the neighboring cell also transmits with a power per RB of $P_1$, any of one or more UEs (e.g., UE 116e and/or UE 116f) connected to small cell radio 112c receives downlink signals at a power less than or equal to the signal strength of small cell radio 112c minus a fixed threshold.

In one or more embodiments, the criterion that a neighboring small cell radio uses to determine whether a given small cell radio is an interfering small cell radio can include an evaluation on the basis of RSRP measurements such that the given small cell radio is considered non-interfering if the RSRP from the given cell is less than the RSRP for the neighboring small cell radio minus a fixed predetermined threshold value (e.g., approximately 6 dB) as measured by any UE served by the neighboring small cell radio. In one or more embodiments, when a given small cell radio is considered to be non-interfering to a neighboring cell, then neighboring small cell radio indicates to the given small cell radio that it has no cell edge UEs connected to it.

In a particular embodiment, if a given small cell radio is non-interfering to a neighboring small cell radio, then the RNTP message from the neighbor small cell radio contains all zero bits values for the FFR RBs. A small cell radio that receives no RNTP message or only RNTP messages from neighboring small cell radios with all zero bit values for FFR RBs, does not need to lower its power on any RBs.

At 1106, small cell radio 112b cell determines whether it is a non-interfering cell to neighboring small cell radios (e.g., small cell radio 112c and small cell radio 112a) based upon the received first message. At 1108, if the first message is indicative of the small cell radio being a non-interfering small cell radio the operations can continue to 1110. At 1110, the small cell radio maintains its current power level on all downlink RBs and the operations can continue to 1114. Accordingly, the small cell radio is selected to not participate in frequency domain ICIC. For example, in a particular embodiment when no neighboring cell indicates that it has cell edge UEs, the cell does not reduce power to $P_2$ on any RB and can distribute power across the RBs in any manner, as long as the power constraints corresponding to power per RB for $P_1$ and $P_4$ are obeyed on appropriate RBs. However, at 1108, if the first message is indicated of the cell being an interfering cell the operations continue to 1112. At 1112, the cell reduces power on one or more downlink resource blocks through participation in ICIC and the operations continue to 1114.

At 1114, the small cell radio (e.g., small cell radio 112b) determines if it is non-interfered by one or more neighboring small cell radios. In one or more embodiments, the small cell radio determines that it is non-interfered by one or more neighboring cells if, when a neighboring small cell radio transmits with a power per RB of $P_1$, any UE connected to the small cell radio receives downlink signals at a power greater than or equal to the signal strength from the neighboring small cell radio plus a fixed threshold (e.g., approximately 6 dB).

In particular embodiments, the criterion can be evaluated on the basis of RSRP measurements such that a serving small cell radio is considered to be non-interfered if, for all neighboring small cell radios, RSRP from the serving small cell radio is greater than the RSRP for the neighboring small cell radio plus a fixed threshold as measured at any UE associated with the serving small cell radio. At 1116, if the small cell radio determines that it is non-interfered by neighboring small cell radio(s) the operations can continue to 1118. At 1118, the small cell radio sends a message to the neighboring small cell radio(s) indicative that the small cell radio is non-interfered by neighboring small cell radio(s). In a particular embodiment, if a small cell is a non-interfered small cell radio, the small cell radio sends RNTP messages with all zero bit values to its neighboring small cell radio(s). In response to receiving the message indicative that the small cell radio is non-interfered, one or more of the neighboring small cell radio(s) may maintain its current power levels on all downlink RBs and not participate in an ICIC scheme. The operations can then return to 1104 to process additional messages that may be received.

At 1116, if the small cell radio determines that it is interfered by one or more neighboring small cell radio(s), the operations can continue continues to 1120. At 1120, the cell sends a message to the neighboring cell(s) indicative that the cell is interfered by the neighboring cell(s). In response to receiving the message indicative that the small cell radio is interfered by the neighboring cell, the neighboring small cell radio(s) may reduce the power levels on one or more downlink RBs, such as FFR RBs, and thus be selected for participation in the ICIC scheme. The operations then returns to 1104 to process additional messages that may be received.

Accordingly, in a particular embodiment for a small cell radio that is not causing interference to any of the neighboring small cell radios even when transmitting at $P_1$, all RBs can have power level $P_1$. If a small cell radio is not receiving interference from any of the neighboring small cell radios, then all power levels in the RBs can be $P_2$ because it doesn't need to boost its power to UEs at a cell edge.

Similarly, as discussed above, other embodiments are directed to UE power level selection for downlink transmissions. It should be understood that in an LTE system the power level at which a particular UE is served on the downlink by a small cell radio cannot vary arbitrarily from one subframe to another because the UE needs to know the ratio of the reference signal power which is constant across all of the bandwidth to the data signal power in order to perform decoding optimally. Considering downlink transmission modes in which a UE demodulates using CRS received from the cell, the UE is signaled the ratio of CRS EPRE to the data PDSCH EPRE via RRC protocol signaling. In order to change the PDSCH EPRE, the UE needs to be informed via RRC signaling a few subframes in advance of the change. The CRS EPRE is typically kept constant over long periods of time. Hence, a serving cell needs to compute the PDSCH EPRE per UE in a semi-static matter in which cell edge UEs have the highest PDSCH EPRE and the cell interior UEs have lower PDSCH EPRE.

Referring to FIG. 12, FIG. 12 is a simplified flow diagram illustrating example operations 1200 that can be associated with determining downlink transmission power levels for cell interior UEs in accordance with on potential embodiment of communication system 100. In accordance with one or more embodiments of operations 1200 illustrated in FIG. 12, cell interior UEs can be served at a lower power and higher interference than all other UEs served by the small cell radio for either ABS or non-ABS subframes, depending on the determination of the type of subframes for which a given UE is to be scheduled. In various embodiments, operations 1200 can be performed under either a Scheme 1 or Scheme 2 configuration depending on the determination of type of subframes for which a given UE is to be scheduled. In one embodiment, for example, UE 116b may be a cell interior UE served by small cell radio 112a.

At 1202, a given small cell radio (e.g., small cell radio 112a) receives an indication of an average signal power on the downlink connection between the small cell radio and a particular UE for each of N UEs connected to the small cell radio. At 1204, the small cell radio receives an indication of an average interference measurement on the downlink connection between the small cell radio and a particular UE for each UE connected to the small cell radio. At 1206, the small cell radio computes an average spectral efficiency for each UE based upon the average signal power and average interference. In a particular embodiment, the average spectral efficiency is computed as a function of the average signal power divided by the average interference for each small cell radio. In one or more embodiments, the average spectral efficiency is representative of an overall throughput performance of the UE.

At 1208, $UE_1 \ldots UE_N$ are ordered in decreasing order of the computed spectral efficiency for each UE. At 1210, an iterative procedure for determining downlink power levels for the UEs is initiated by setting an index value i equal to a value of 1. At 1212, the small cell radio determines whether a particular $UE_i$ meets a condition for being assigned a power level of $P_2$. In one embodiment, the condition for $UE_i$ being assigned a power level $P_2$ could be based on determining whether the particular $UE_i$ receives a higher throughput rate when it shares resources with $UE_1, \ldots, UE_{i-1}$ with power level $P_2$ as opposed to when the $UE_i$ is scheduled on resources with power level $P_1$. In particular embodiments, equal resource/proportional fair scheduling of resources can be used to maximize total throughput for all UEs while at the same time allowing all UEs at least a minimal level of service. Further conditions for $UE_i$ being assigned a power level $P_2$ may include a determination of whether the reduction in utility of rates for $UE_1, \ldots, UE_{i-1}$ is less than the increase in utility of rate for $UE_i$ under an assumption that $UE_1 \ldots UE_N$ have enough traffic to consume all RBs with power $P_1$.

If $UE_i$ meets the condition for being assigned power level $P_2$, the operations continue to 1214. At 1214, $UE_i$ is assigned power level $P_2$ and the operations continue to 1218. If $UE_i$ does not meet the condition for being assigned power level $P_2$, the operations continue to 1216. At 1216, $UE_i$ is assigned power level $P_1$ and the operations continue to 1218. At 1218, the cell determines whether the index value i=N. If the index value i is not equal to N, the operations continue to 1220 in which the index i is incremented by 1 (i=i+1). After 1220, the operations return to 1212 in which another UE is evaluated for determining whether it meets the condition to be assigned power level $P_2$. If the index value i is equal to N, the flow returns to 1202 such that the assignment of power levels for the interior UEs may be performed on a periodic basis in order to adapt to changing conditions within the network.

Referring to FIG. 13, FIG. 13 is a simplified flow diagram illustrating example operations 1300 that can be associated with determining downlink transmission power levels for cell edge UEs in accordance with one potential embodiment of communication system 100. In the embodiment of FIG. 13, the operations can facilitate identifying cell edge UEs that have low tolerance to interference and can provide a tradeoff between assigning a UE to an RB with higher SINR and giving a UE a larger number of RBs, as RBs with higher SINR are limited. In accordance with one or more embodiments of operations 1300 of FIG. 13, cell edge UEs can be served at a higher power and lower interference than all other UEs served by a given small cell radio for either ABS or non-ABS subframes, depending on the type of subframes for which a given UE is to be scheduled. In various embodiments, operations 1300 can be performed under either a Scheme 1 or Scheme 2 configuration depending on the determination of type of subframes for which a given UE is to be scheduled.

At 1302, a given small cell radio receives an indication of the average of signal power on the downlink connection between the small cell radio and a particular UE for each of N UEs connected to the small cell radio. In 1304, the small cell radio receives an indication of an average interference measurement on the downlink connection between the small cell radio and a particular UE for each UE connected to the small cell radio. In a particular embodiment, the average interference measurement is a signal-to-interference-plus-noise ratio (SINR) measurement. At 1306, the small cell radio computes an average spectral efficiency for each UE based upon the average signal power and average interference. In a particular embodiment, the average spectral efficiency is computed by dividing the average signal power by the average interference for each small cell radio.

At 1308, $UE_1 \ldots UE_N$ are ordered in increasing order of the reuse one SINR. In particular embodiments, the reuse one SINR is the estimated SINR when all cells transmit at the same power per RB. At 1310, an iterative procedure for determining downlink power levels is initiated by setting an index value i equal to a value of 1. At 1312, $UE_1$ with the lowest SINR in reuse one is assigned power level $P_4$, with $P_4 \geq P_1$. At 1314, the index i is incremented by 1 (i=i+1). At 1316, the small cell radio determines whether another particular $UE_i$ meets a condition for being assigned a power level of $P_4$. In one embodiment, the condition for $UE_i$ being assigned a power level $P_4$ is based on a determination of whether the estimated rate when assigned all RBs with power level $P_4$ divided by i is greater than the average spectral efficiency on RBs with power $P_1$ multiplied by the total RBs with power $P_1$ divided by (N−i+1).

If $UE_i$ meets the condition for being assigned power level $P_4$, the operations continue to 1318. At 1318, $UE_i$ is assigned power level $P_4$ and the operations continue to 1322. If $UE_i$ does not meet the condition for being assigned power level $P_4$, the operations continue to 1320. At 1320, $UE_i$ is assigned power level $P_1$ and the operations continue to 1322. At 1322, the small cell radio determines whether the index value i=N. If the index value i is not equal to N, the operations return to 1314 in which the index i is incremented by 1 (i=i+1). After 1314, the operations return to 1316 in which a next UE is evaluated for determining whether it meets the condition to be assigned power level $P_4$. If the index value i is equal to N, the operations return to 1302 such that the assignment of power levels for the cell edge UEs may be performed on a periodic basis in order to adapt to changing conditions within the network.

Although the embodiments described in FIGS. 12-13 are described with respect to two possible power levels for a particular UE, in other embodiments the principles described herein may be applied to more than two power levels. In accordance with one embodiment in which multiple power levels are available for a UE, a procedure for assigning power levels may include beginning with an RB/power level corresponding to highest SINR. Assuming that frequency bands/RBs are ordered as a function of SINR (e.g., based on RSRP computations and not accounting for frequency selective fading) is the same for all UEs, the procedure described in FIG. 13 may be applied for this frequency band assuming that RBs with lower SINR are equally distributed among all UEs. The procedure may then be repeated for the next highest power level to fix the allocation of UEs to a power level. The process may then be repeated until all available power levels have been assigned.

In accordance with one or more embodiments, the principles described herein may be used for UE transmission power level adaptation in order adapt the power allocation to UEs due to UE mobility. In particular embodiments, a hysteresis effect can be used in order to avoid frequency changes in power levels such that one or more UEs' power levels are changed only if in addition to the criterion described above, the average throughput in the cell improves by a predetermined percentage (e.g., five percent (5%)) if such a power level is performed.

Referring to FIGS. 14-19, FIGS. 14-19 are a simplified flow diagram illustrating example operations that can be associated with determining a subframe type for UE scheduling in accordance with one potential embodiment of communication system 100. FIG. 5, as discussed above, illustrated operations for determining a number of UEs to be scheduled in certain subframe types based on an optimized interference threshold value. FIGS. 14-19 illustrate other example operations that can be associated with determining a number of UEs to be scheduled in ABS subframes and non-ABS subframes through a determination of restricted UE sets, which can identify UEs that are not to be scheduled on a particular subframe type due to, for example, reduced SINR, reduced spectral efficiency, reduced throughput rates, etc. In some embodiments, the determination of restricted UE sets is cell specific and can be repeated more often than the operations as discussed in FIG. 5. Further, in some embodiments, centralized computations can be performed every few seconds that can aid in determining the number of UEs to be scheduled in ABS and non-ABS subframes whereas computing the split between ABS and non-ABS subframes can be optimized less often as changing the ABS/non-ABS split at the macro level can result in a significant change to the whole network.

Each small cell radio 112a-112c can include a scheduler module, which can be configured to determine which UE(s) served by the particular small cell radio should be scheduled in a particular subframe type. As different subframes/subframe types can see different amounts of interference from neighboring cells (e.g., small cells and/or macro cells), communication system 100 can provide different mechanisms through which the scheduler for each small cell radio 112a-112c can determine whether a UE should be served on ABS subframes or non-ABS subframes.

Under an assumption that all macro cell radios (e.g., use a same ABS pattern and that the ABS pattern is known at each small cell radio 112a-112c, resources can be divided on a time-domain basis into two sets, a first set of RBs, which can be allocated for ABS subframes and a second set of RBs, which can be allocated for non-ABS subframes. However, resource sets can be extended beyond the time domain to include frequency domain resource sets. For example, as discussed herein, UEs can be allocated across 6 time and frequency domain resource sets for ABS and non-ABS subframes including: (1) a set of reuse one RBs in ABS subframes; (2) a set of FFR RBs with low SINR in ABS subframes; (3) a set of FFR RBs with high SINR in ABS subframes; (4) a set of reuse one RBs in non-ABS subframes; (5) a set of FFR RBs with low SINR in non-ABS subframes; and (6) a set of FFR RBs with high SINR in non-ABS subframes. It should be understood that the numbering of time/frequency domain resource sets is provided for illustrative purposes only and is not meant to denote a particular order of resource sets. In various embodiments, an assumption can be made that the ABS pattern for ABS subframes occurs at a given periodicity (e.g., 40 or 80 msec depending on whether Frequency Division Duplex (FDD) or Time Division Duplex (TDD) is used, respectively). For purposes of discussing FIGS. 14-19, a resource set can be denoted as 'r' for a number of disparate sets R such that r=1, 2, 3 . . . R and α(r) can represent the fraction of subframes that are associated with each resource set r.

Referring to FIG. 14, FIG. 14 is a simplified flow diagram illustrating example operations 1400 associated with determining a subframe type for UE scheduling in accordance with one potential embodiment of communication system 100. In some embodiments, operations 1400 can be carried out by server 118, small cell radios 112a-112c or a combination thereof.

At 1402, the operations can include setting a scheduling performance metric threshold, which can be used to determine whether a given UE should be scheduled on ABS or non-ABS subframes. In some embodiments, the scheduling performance metric threshold can be related to SINR such that a $\Delta^{SINR}$ threshold can be set to determine an optimal resource set for scheduling a UE. In other embodiments, the performance metric threshold can be related to predicted average spectral efficiency (SE) of each UE for each such that a $\Delta^{SE}$ threshold can be set to determine an optimal resource set for scheduling a UE. In still some embodiments, the scheduling performance metric threshold can be a function of Quality of Service (QoS) level or requirements (e.g., minimum rate, delay, etc.), packet delays, average past throughput rate, predicted throughput rate, utility (e.g., based on a selected utility function) combinations thereof or the like as related to SINR or spectral efficiency.

Equations related to computing SINR and average spectral efficiency for UEs in relation to resource sets r are discussed above in FIG. 4. In various embodiments, the average UE spectral efficiency could be based on a certain nominal number of RBs assigned to the UE. In some embodiments, the average UE spectral efficiency computations can assume that a BLER for a first transmission can be chosen to be high enough such that Hybrid Automatic Repeat Request (HARQ) gain is considered. In general, a UE HARQ response is an acknowledgment by a given UE for a corresponding data transmission received by the UE which indicates whether or not the data transmission was successfully decoded or not by the UE. The HARQ response can either be a positive acknowledgment (ACK) or a negative acknowledgment (NACK). However, if the BLER for a first transmission is chosen to be not very low, the subsequent transmissions for a given UE must be assumed to occur on the same resource set (e.g., same subframe type if a same set of dominant interfering cell radios is present).

In some embodiments, the scheduling performance metric threshold can be set based on a computation associated with whether a small cell radio is in an open access mode (e.g., any UE can connect to the cell) or in a closed access mode (e.g., only UEs belonging to a closed subscriber group (CSG) can connect to the cell) and/or long term statistics of one or more of: UE distributions (e.g., absolute and relative values of SINR or spectral efficiency across resource sets); and loading (e.g., how the load is distributed on average across UEs close to the serving cell and UEs close to interfering cells that support ABS. The loading can also depend on the admission control and policy of what QoS is delivered to UEs that suffer high interference on non-ABS subframes. In some embodiments, the scheduling performance metric threshold can be set in an open loop manner. For example, $\Delta^{SINR}$ or $\Delta^{SE}$ can be set to a predetermined value (e.g., $\Delta^{SINR}=10$, etc.). In still some embodiments, as discussed in further detail herein, the scheduling performance metric threshold can be computed using a bisection search method in which a range of thresholds can be searched in order to determine an optimum performance metric threshold.

At 1404, the operations can include determining a restriction set of UEs for each resource set r based on the scheduling performance metric threshold such that the set of UEs, denoted as $U^{rest}(r)$, belonging to the restriction set corresponds to UEs that are not to be scheduled on resource set r unless the RBs in that subframe cannot be utilized by other UEs (e.g., due to lack of enough bytes pending/available for downlink transmissions). The operations for determining the restriction set of UEs for each resource set r can vary according to the performance metric selected for the operations. In some embodiments, a UE will be restricted from being scheduled on a certain subframe (resources) if it can be served at a higher SINR or spectral efficiency in another subframe; thus, freeing up resources for UEs that can be served well in the certain subframe. In some embodiments, a restriction set of UE can be determined based on an analysis of QoS levels, throughput, utility, combinations thereof or the like.

At 1406, the operations can include determining a number of UE(s) to be scheduled across ABS and non-ABS subframes according to the restriction sets determined for each resource set r. In some embodiments, for example, if the number of resource sets is limited to the time domain (e.g., two resource sets, each associated with a particular subframe type), then the number of UEs to be scheduled in ABS and non-ABS subframes can be determined based on the size of each restriction set for each time domain resource set. In other embodiments, for example, if the number of resource sets is expanded to include the frequency domain, then the number of UEs to be scheduled in ABS and non-ABS subframes can be determined based on a summation of the size of each time-frequency domain restriction set for each subframe type. Operations 1400 can then end.

In some embodiments, the scheduling performance metric threshold can be updated using one or more recursive operations in which UE performance can be assessed across different scheduling performance thresholds. Various recursive operations are discussed in further detail below. In various embodiments, scheduling performance metric threshold can be set according to: 1) a cell-common policy, in which the same threshold value is set for all small cell radios 112a-112c to determine their corresponding restriction sets for ABS and non-ABS subframes, in some cases; 2) a cell-specific policy, in which each small cell radio 112a-112c sets their own individual threshold value for both ABS and non-ABS subframes; a 3) a subframe-specific policy, in which each small cell radio sets a different threshold value for each subframe type; or any combination of cell-common, cell-specific or subframe-specific policy. For example, a cell-common policy could be adapted such that a first threshold value could set for all small cell radios 112a-112c in order to determine restricted sets for ABS subframes and a second threshold value could be set for all small cell radios 112a-112c in order to determine restricted sets for non-ABS subframes.

Figure 15:
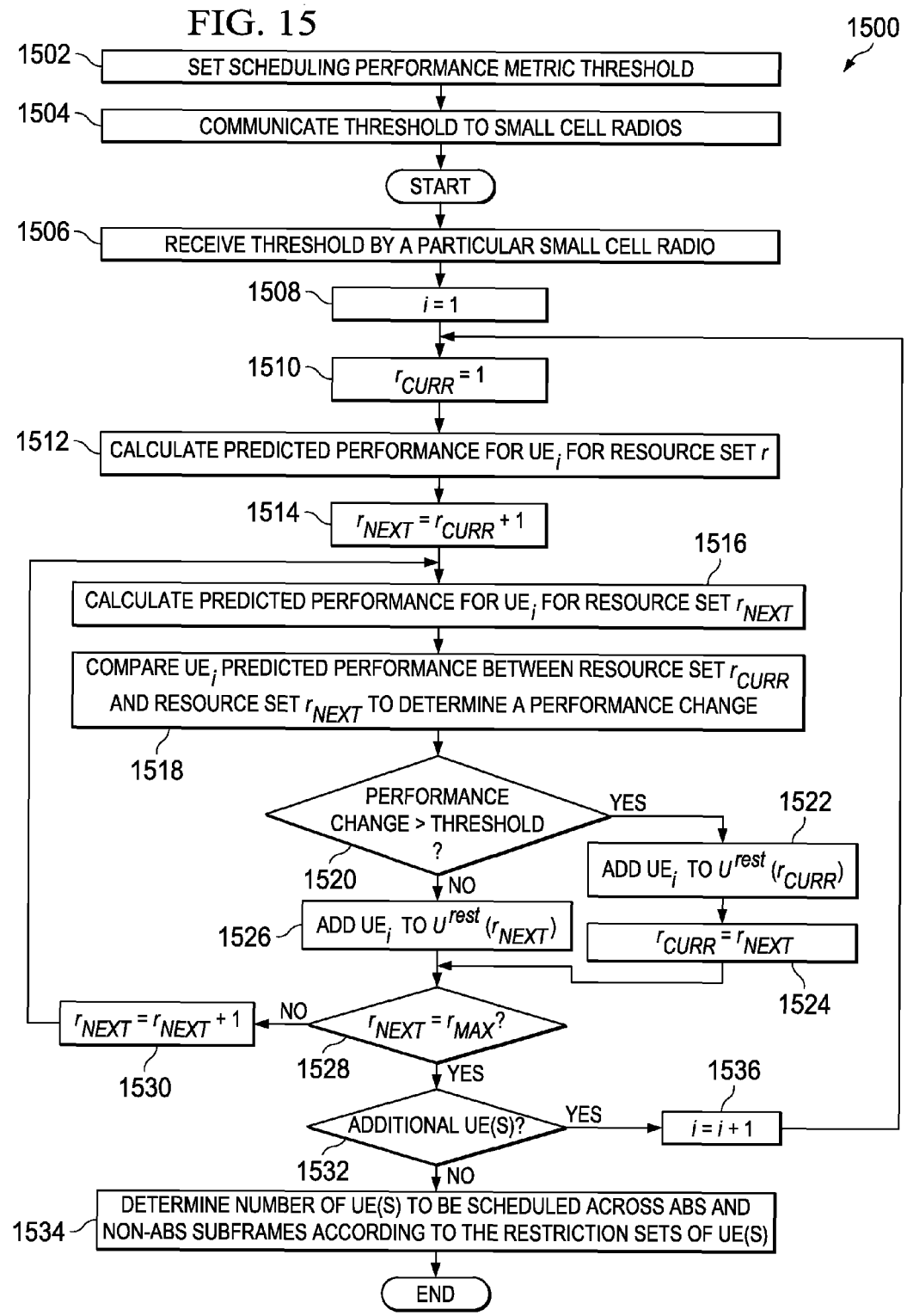
FIG. 15 is a simplified flow diagram illustrating other example operations that can be associated with determining a subframe type for UE scheduling in accordance with one potential embodiment of the communication system.

Referring to FIG. 15, FIG. 15 is a simplified flow diagram illustrating other example operations 1500 that can be associated with determining a subframe type for UE scheduling in accordance with one potential embodiment of communication system 100. In particular, operations 1500 can be associated with determining a subframe type for UE scheduling under a cell-common policy. The operations illustrated in the embodiment of FIG. 15 can be performed by server 118 and each small cell radio 112a-112c for UEs served by each small cell radio.

At 1502, the operations can include server 118 setting a scheduling performance metric threshold for a given performance metric (e.g., $\Delta^{SINR}$ or $\Delta^{SE}$). In some embodiments, the scheduling performance metric threshold can be computed based with whether a small cell radio is in an open access mode (e.g., any UE can connect to the cell) or in a closed access mode (e.g., only UEs belonging to a closed subscriber group (CSG) can connect to the cell) and/or long term statistics of one or more of: UE distributions (e.g., absolute and relative values of SINR or spectral efficiency across resource sets); and loading (e.g., how the load is distributed on average across UEs close to a serving cell and UEs close to interfering cells that support ABS). The loading can also depend on the admission control and policy of what QoS is delivered to UEs that suffer high interference on non-ABS subframes. In some embodiments, the scheduling performance metric threshold can be set in an open loop manner. For example, $\Delta^{SINR}$ or $\Delta^{SE}$ can be set to a predetermined value (e.g., $\Delta^{SINR}=10$, etc.). In still some embodiments, as discussed in further detail herein, the scheduling performance metric threshold can be computed using a bisection search method in which a range of thresholds can be searched in order to determine an optimum performance metric threshold.

At 1504, server 118 communicates the scheduling performance metric threshold to small cell radios 112a-112c. In some embodiments, the scheduling performance metric threshold can be included in the resource allocation parameters sent to small cell radios 112a-112c. In other embodiments, the scheduling performance metric threshold can be sent to small cell radios 112a-112c separate from the resource allocation parameters. For purposes of describing the remaining operations illustrated in the embodiment of FIG. 15, operations for a particular small cell radio, say, for example, small cell radio 112b serving UE 116c and UE 116d are described. However, it should be understood that the remaining operations can be performed by each of small cell radios 112a-112c for UE served by each small cell radio.

Operations for small cell radio 112b can begin at 1506 in which the scheduling performance metric threshold is received by small cell radio 112b. At 1508, the operations can include setting a UE index value i ($UE_i$) is set to a value one (1) for a first UE served by small cell radio 112b (e.g., UE 116c, for example, although selection of the first UE is arbitrary and could easily be chosen as UE 116d). At 1510, a current resource set index $r_{CURR}$ is set to 1 to indicate a first potential set of resources in which $UE_i$ can be scheduled for small cell radio 112b. At 1512, the small cell radio 112b can calculate the predicted performance (e.g., SINR or average SE) for $UE_i$ for resource set $r_{CURR}$. At 1514, a subsequent resource set index value $r_{NEXT}$ is set to a value $r_{CURR}+1$. In general, the index values $r_{CURR}$ and $r_{NEXT}$ can be used to cycle through different resource sets (e.g., a maximum number of resource sets $r_{MAX}$ equal to 2 resource sets if only considering time domain sets or $r^{MAX}$ equal to 6 resource sets if considering time and frequency domain sets) in order to compare potential performance gains for $UE_i$ among different available resource sets. At 1516, small cell radio 112b calculates the predicted performance for $UE_i$ for resource set $r_{NEXT}$.

At 1518, small cell radio 112b compares the predicted performance for $UE_i$ for resource set $r_{CURR}$ to the predicted performance for $UE_i$ for resource set $r_{NEXT}$ relative to the scheduling performance metric threshold (e.g., $\Delta^{SINR}$ or $\Delta^{SE}$) to determine a performance change between the resource sets for $UE_i$. At 1520, small cell radio 112b determines whether the performance change is greater than the scheduling performance metric threshold to determine whether $UE_i$ should be restricted from being scheduled on resource set $r_{CURR}$ or $r_{NEXT}$. If the performance change is greater than the threshold (e.g., the performance for the UE is expected to be better in resource set $r_{NEXT}$) the operations continue to 1522 in which $UE_i$ is added to the restriction set $U^{rest}(r_{CURR})$ for the current resource set $r_{CURR}$ and the index $r_{CURR}$ is set equal to the index $r_{NEXT}$ at 1524 (e.g., resource set $r_{NEXT}$ becomes the current 'benchmark' resource set to be used for subsequent comparisons). However, if the performance change is less than the threshold then the operations continue to 1526 in which $UE_i$ is added to the restriction set $U^{rest}(r_{NEXT})$ for the subsequent resource set.

In one example, if the scheduling performance metric threshold $\Delta^{SINR}$ is used, then the comparison can be performed to determine whether the predicted SINR for $UE_i$ for resource set $r_{NEXT}$ is a $\Delta^{SINR}$ better than the predicted SINR for $UE_i$ for resource set $r_{CURR}$. If so, then $UE_i$ is added to the restriction set $U^{rest}(r_{CURR})$ for resource set $r_{CURR}$ (e.g., not to be scheduled in resource set $r_{CURR}$). If not, then $UE_i$ is added to the restriction set for resource set $r_{NEXT}$, $U^{rest}(r_{NEXT})$ (e.g., not to be scheduled in resource set $r_{NEXT}$). In another example, if the scheduling performance metric threshold $\Delta^{SE}$ is used, then the comparison can be performed to determine whether the average spectral efficiency for $UE_i$ for resource $r_{NEXT}$ has $\Delta^{SE}$ better spectral efficiency than the spectral efficiency for $UE_i$ for resource set $r_{CURR}$. If so, then $UE_i$ is added to the restriction set $U^{rest}(r_{CURR})$ for resource set $r_{CURR}$ (e.g., not to be scheduled in resource set $r_{CURR}$). If not, then $UE_i$ is added to the restriction set for resource set $r_{NEXT}$, $U^{rest}(r_{NEXT})$ (e.g., not to be scheduled in resource set $r_{NEXT}$).

Following either the operations at 1524 or 1526, the small cell radio determines whether the index $r_{NEXT}$ is equal to $r_{MAX}$ (e.g., checking whether all resource sets have been assessed). If so, the operations continue to 1532 in which the small cell radio determines whether there is another UE that needs to be scheduled (e.g., UE 116d for small cell radio 112b). If there is another UE that needs to be scheduled, the operations continue to 1536 in which the $UE_i$ index is incremented and the operations return to 1510 in order to determine on which resource set $UE_{i+1}$ is to be scheduled. However, if there are no other UEs to be scheduled, the operations continue 1534 in which the small cell radio determines the number of UE(s) to be scheduled across ABS and non-ABS subframes according to the restriction sets of UEs determined in the previous operation. The number of UEs to be scheduled in ABS and non-ABS subframes can be included in performance metrics sent to server 118, as discussed for various embodiments described herein.

Recalling the operations at 1528, if the small cell radio determines that the index $r_{NEXT}$ is not equal to $r_{MAX}$, then the operations continue to 1530, in which the index $r_{NEXT}$ is incremented and the operations return to 1516 in order to repeat the previously described operations. The looping on resource sets continues until $r_{NEXT}$ is equal to $r_{MAX}$, in which case the operations at 1532, 1536 (if applicable) and/or 1534 can be performed.

Referring to FIG. 16, FIG. 16 is a simplified flow diagram illustrating yet other example operations 1600 that can be associated with determining an optimum scheduling performance metric threshold for UE scheduling in accordance with one potential embodiment of communication system 100. In particular, operations 1600 can be associated with determining an optimum scheduling performance metric threshold for UE scheduling under another cell-common policy. The operations illustrated in the embodiment of FIG. 16 can be performed primarily by server 118 based on performance metric feedback received from small cell radios 112a-112c. In at least one embodiment, the performance metric feedback can include UE specific feedback as discussed herein. In at least one embodiment, the performance metric feedback can include an indication of the restriction sets to which each UE served by each small cell radio belongs.

As discussed in further detail below, the operations illustrated in the embodiment of FIG. 16 can be performed in conjunction with search operations in which a range of scheduling performance metric thresholds can searched in order to determine an optimal scheduling performance metric threshold that can be applied across all small cell radios in order to maximize utility for the communication system. As discussed herein, utility can be varied according to a selected utility function, which can be selected based on the desires of a network operator or service provider (e.g., maximize throughput, maximize fairness of average throughput versus system capacity, maximizing fairness of average throughput, etc.).

At 1602, the operations can include server 118 computing, for a given performance metric (e.g., $\Delta^{SINR}$ or $\Delta^{SE}$) utility for each of: a maximum scheduling performance metric threshold value, a minimum scheduling performance metric threshold value and a first midpoint scheduling performance metric threshold value (e.g., midpoint between the maximum and minimum values) for a given range of possible scheduling performance metric threshold values.

At 1604 and 1606, the operations can include searching across the range of scheduling performance metric thresholds until utility for a given utility function is maximized. In at least one embodiment, the searching can include a bisection search in which one or more subsequent midpoint values are chosen, their corresponding utility calculated, and then compared to previous values in order to determine an optimum value. In various embodiments, the operations for the embodiment shown in FIG. 16 can include that, for each threshold value, the distribution of capacity across the small cell network can be computed assuming that a given UE is not scheduled on restricted resources and a given resource can be shared equally between all UEs which are not restricted from being scheduled on the given resource.

Once a maximized utility is determined, the operations continue to 1608 in which the scheduling performance metric threshold value is set to the value that corresponds to the maximum utility. At 1610, server 118 communicates the scheduling performance metric threshold value to small cell radios 112a-112c and the operations can end. In various embodiments, operations 1600 can be performed on a periodic basis, when a new small cell radio is added to or removed from the system, when UE performance, as measured at each small cell radio 112a-112c, varies beyond a given UE performance threshold, combinations thereof or the like.

Figure 17:
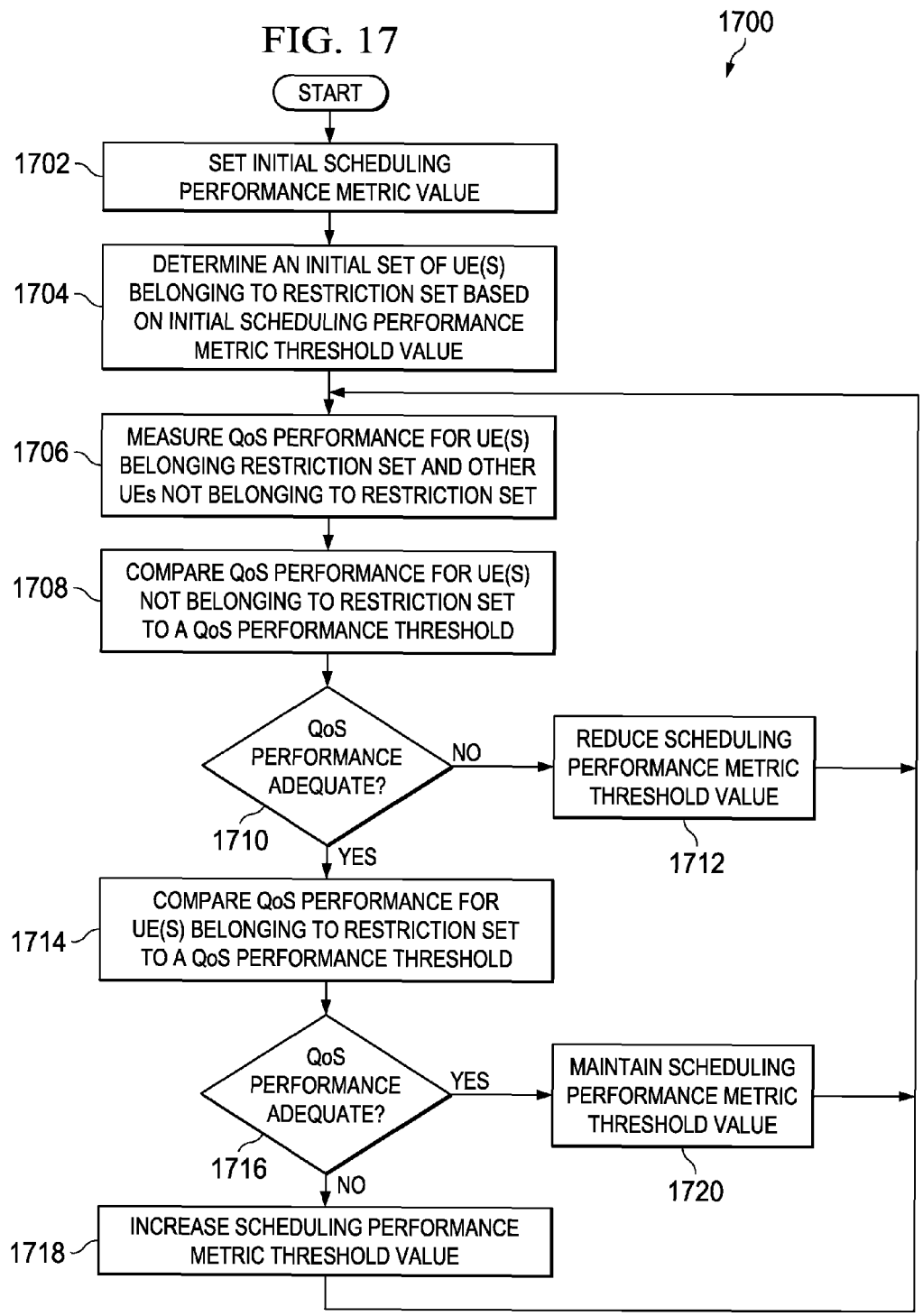
FIG. 17 is a simplified flow diagram illustrating yet other example operations that can be associated with determining a subframe type for UE scheduling in accordance with one potential embodiment of the communication system.

Referring to FIG. 17, FIG. 17 is a simplified flow diagram illustrating yet other example operations 1700 that can be associated with determining a subframe type for UE scheduling in accordance with one potential embodiment of communication system 100. In particular, operations 1700 can be associated with determining a subframe type for UE scheduling under a cell-specific policy. The operations illustrated in the embodiment of FIG. 17 can be performed by each small cell radio 112a-112c for UEs served by each small cell radio. For the embodiment illustrated in FIG. 17, only time domain resource sets are considered (e.g., a first resource set corresponding to resources for ABS subframes and a second resource set corresponding to resources for non-ABS subframes). However, it should be understood that the operations can be adapted to cover both time and frequency domain resource sets using techniques as described herein. In general, the operations illustrated in the embodiment of FIG. 17 can provide a mechanism in which a given scheduling performance threshold (e.g., SINR or spectral efficiency) can be adapted dynamically depending on the relative QoS of bearers, cell loading, UE movement, etc.

For the embodiment shown in FIG. 17, an assumption can be made that macro small cell radios (e.g., macro radio 120) are the dominant interferers to neighboring small cell radios (e.g., small cell radios 112a-112c) and have a same ABS pattern. It can be assumed that ABS subframes have no restrictions on which UEs can be scheduled on the subframes. Hence, only the set of UEs restricted from being scheduled on non-ABS subframes (e.g., $U^{rest}(\text{non-ABS})$)

need to be determined for subframes where macros do not have ABS and so the dependence of resources can be dropped.

Accordingly, operations can begin at 1702 in which an initial scheduling performance metric threshold value is set. The initial value can be set as discussed for various embodiments described herein. At 1704, the small cell radio determines an initial set of UEs belonging to restriction set $U^{rest}$(non-ABS) based on the initial scheduling performance metric threshold value.

At 1706, the small cell radio measures QoS performance (e.g., delay, throughput, etc.) for each UE it is serving that belong to the restriction set and that do not belong to the restriction set. At 1708, the small cell radio compares the QoS for the UEs not belonging to the restriction set to a QoS performance threshold. At 1710, the small cell radio determines if the QoS performance of bearers for UEs not belonging to the restriction set are adequate in comparison to the QoS performance threshold.

If the QoS performance for UEs not belonging to the restriction set $U^{rest}$(non-ABS) (e.g., those UEs that are to be scheduled on non-ABS subframes) is not adequate, the operations can continue to 1712 in which the scheduling performance metric threshold can be lowered (e.g., in order to schedule more UEs in ABS subframes) and the operations return to 1706 in which QoS performance is again measured. In one embodiment, the QoS performance threshold could be set to a minimum expected throughput rate, such that if the QoS performance of the bearers for UEs not belonging to the restriction set falls below the minimum rate, then the scheduling performance metric threshold could be lowered in order to schedule more UEs in ABS subframes. In another embodiment, the QoS performance threshold could be set to a predetermined percentile delay, say, for example, a 98th percentile delay, such that if QoS performance of the bearers for UEs not belonging to the restriction set increases beyond the delay budget, then the scheduling performance metric threshold could be lowered in order to schedule more UEs in ABS subframes.

If the QoS performance of UEs not belonging to the restriction set is adequate, then the operations can continue to 1714 in which the QoS performance of UEs belonging to the restriction set $U^{rest}$(non-ABS) (e.g., those UEs that are to be scheduled on ABS subframes) is compared to the QoS performance threshold. At 1716, the small cell radio determines if the QoS performance of bearers for UEs belonging to the restriction set are adequate in comparison to the QoS performance threshold. If the QoS performance for UEs belonging to the restriction set $U^{rest}$(non-ABS) (e.g., those UEs that are to be scheduled on ABS subframes) is not adequate, the operations can continue to 1718 in which the scheduling performance metric threshold can be increased (e.g., in order to schedule less UEs in ABS subframes) and the operations return to 1706 in which QoS performance for the UEs is again measured. However, if the QoS performance is adequate in comparison to the QoS performance threshold for UEs belonging to the restriction set, the operations can continue to 1720 in which the current scheduling performance metric is maintained and the operations return to 1706 in which QoS performance for the UEs is again measured. In some embodiments, hysteresis can be used to prevent frequent changes of the scheduling performance metric threshold.

Figure 18:
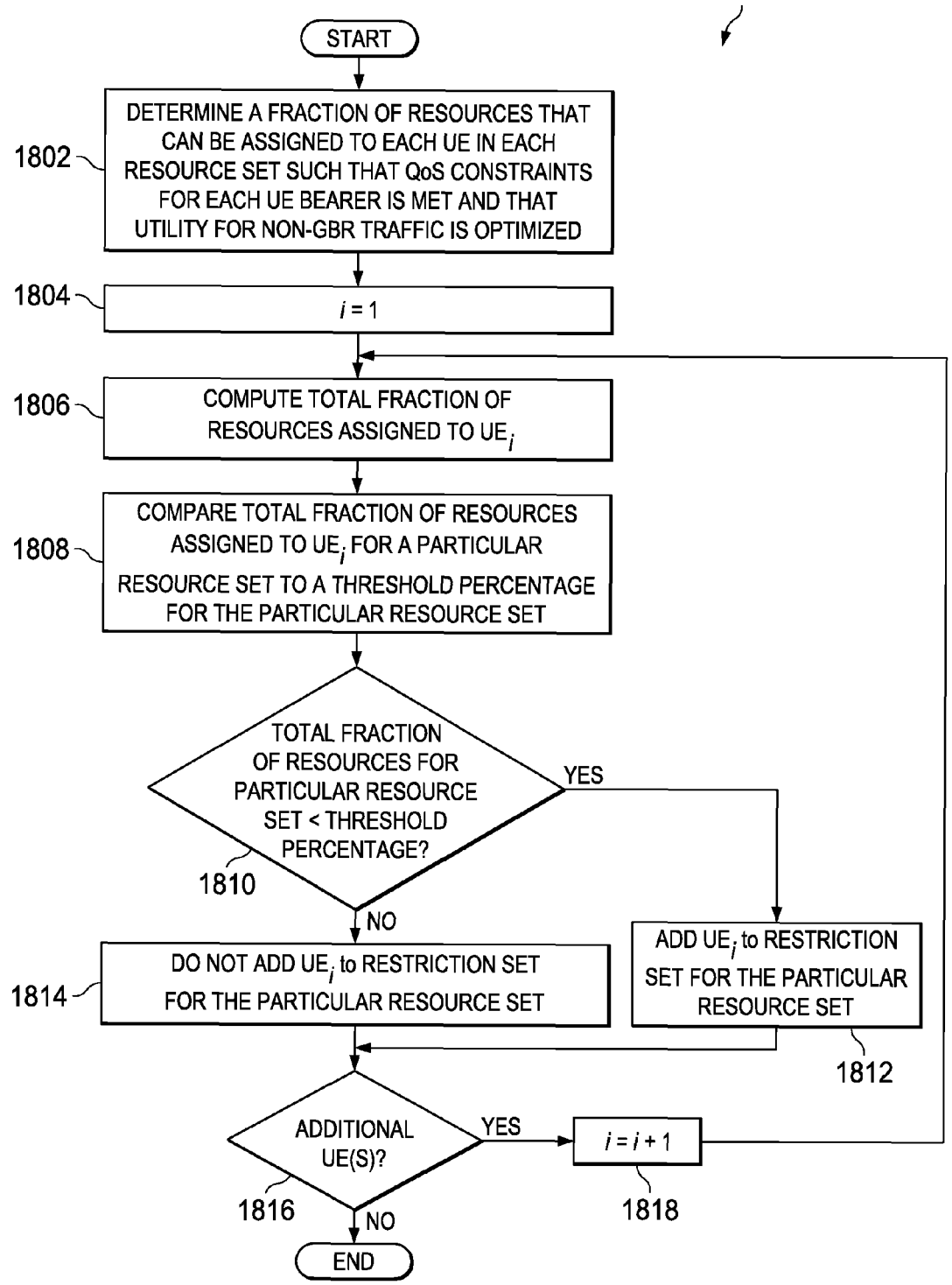
FIG. 18 is a simplified flow diagram illustrating yet other example operations that can be associated with determining a subframe type for UE scheduling in accordance with one potential embodiment of the communication system.

Referring to FIG. 18, FIG. 18 is a simplified flow diagram illustrating yet other example operations 1800 that can be associated with determining a subframe type for UE scheduling in accordance with one potential embodiment of communication system 100. In particular, operations 1800 can be associated with determining a subframe type for UE scheduling under a cell-specific policy. The operations illustrated in the embodiment of FIG. 18 can be performed by each small cell radio 112a-112c for UEs served by each small cell radio. For the embodiment illustrated in FIG. 18, only time domain resource sets are considered (e.g., a first resource set corresponding to resources for ABS subframes and a second resource set corresponding to resources for non-ABS subframes). However, it should be understood that the operations can be adapted to cover both time and frequency domain resource sets using techniques as described herein.

In general, the operations illustrated in the embodiment of FIG. 18 can provide a technique in which the number of UEs included in a restriction set (e.g., $U^{rest}$(non-ABS)) can be adjusted based on QoS constraints for each UE and computations that seek to optimize utility for non-Guaranteed Bit Rate (non-GBR) traffic. Thus, the operations associated with the embodiment shown in FIG. 18 can be performed by each small cell radio 112a-112c without using a scheduling performance metric threshold such as SINR or average spectral efficiency. Rather the operations of FIG. 18 seek to optimize utility for non-GBR traffic in order to determine the restriction set of UEs.

For the embodiment shown in FIG. 18, an assumption can be made that macro small cell radios (e.g., macro radio 120) are the dominant interferers to neighboring small cell radios (e.g., small cell radios 112a-112c) and have a same ABS pattern. It can be assumed that ABS subframes have no restrictions on which UEs can be scheduled on the subframes. Hence, only the set of UEs restricted from being scheduled on non-ABS subframes (e.g., $U^{rest}$(non-ABS)) need to be determined for subframes where macros do not have ABS.

The operations can begin at 1802 in which a given small cell radio, say, for example, small cell radio 112b, determines a fraction of resource that can be assigned to each UE (e.g., UE 116c and 116d) in each resource set such that any QoS constraints for each UE bearer are met and that utility for non-GBR traffic is optimized. As discussed herein, utility can be varied according to a selected utility function, which can be selected based on the desires of a network operator or service provider (e.g., maximize throughput, maximize fairness of average throughput versus system capacity, maximizing fairness of average throughput, etc.). Thus, operations at 1802 assume small cell radio 112b has been configured with a particular utility function in order to optimize utility for non-GBR traffic.

Following the operations at 1802, subsequent operations for the small cell radio, as discussed herein, provide for the ability to determine whether each UE should be added to the restriction set $U^{rest}$(non-ABS). Although only one restriction set is discussed for FIG. 18, it should be understood that the operations could be modified to incorporate checks for additional resource sets. For example, the subsequent operations described herein could be modified to loop through each of multiple resource sets in order to determine whether a given UE should be added to the restriction set for each resource set, similar to the looping operations discussed for FIG. 15.

At 1804, the operations can include setting a $UE_i$ index value i is set equal to one (1), to assess restrictions for a first UE served by the small cell radio. At 1806, the small cell radio computes a total fraction of resources assigned to $UE_i$ for the resources available to the small cell radio. At 1808, the small cell radio compares the total fraction of resource assigned to $UE_i$ for a particular resource set (e.g., assigned to the UE for non-ABS subframes) to a threshold percentage (e.g., 10%) for the particular resource set.

At 1810, the small cell radio determines whether the total fraction of resources assigned to $UE_i$ for the particular resource set is below the threshold percentage. If so, the operations continue to 1812 in which $UE_i$ is added to the restriction set for the particular resource set ($U^{rest}$(non-ABS)). However, if the total fraction of resources assigned to $UE_i$ for the particular set is not below the threshold percentage for the particular resource set, the operations can continue to 1814 in which $UE_i$ is not added to the restriction set for the particular resource set. In some embodiments, the threshold percentage for a particular resource set can be adjusted during operation to be set to a value associated with the minimum fraction of resources that are assigned to any UE belonging to the restriction set for the particular resource set.

Following the operations at either 1812 or 1814, the operations can continue to 1815 in which the small cell radio determines whether there are additional UEs that need to be assessed. If so, the operations can continue to 1818 in which the index i is incremented and the operations can return to 1806 to repeat the aforementioned operations for another UE. However, if there are no additional UEs that need to be assessed, the operations can end. In various embodiments, operations 1800 can be performed on a periodic basis by each of small cell radio 112a-112c, based on a trigger (e.g., a trigger associated with degraded UE performance), as tasked by server 118, combinations thereof or the like.

Figure 19B:
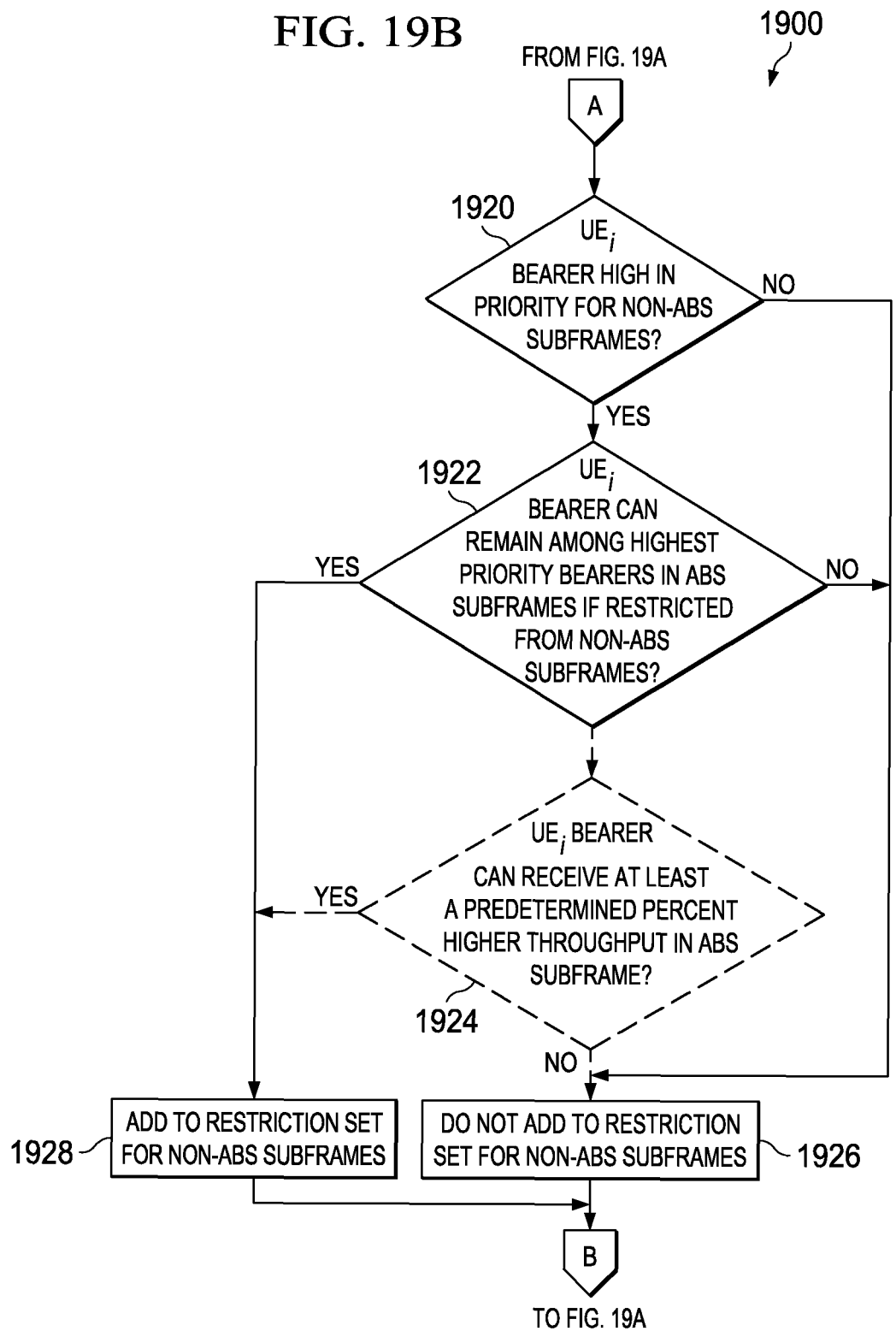

Referring to FIGS. 19A-19B, FIGS. 19A-19B are simplified flow diagrams illustrating example operations 1900 that can be associated with determining a subframe type for UE scheduling in accordance with one potential embodiment of communication system 100. In particular, operations 1900 can be associated with determining a subframe type for UE scheduling under a subframe-specific policy. The operations illustrated in the embodiment of FIGS. 19A-19B can be performed by each small cell radio 112a-112c for UEs served by each small cell radio. For the embodiment illustrated in FIGS. 19A-19B, only time domain resource sets are considered (e.g., a first resource set corresponding to resources for ABS subframes and a second resource set corresponding to resources for non-ABS subframes). However, it should be understood that the operations can be adapted to cover both time and frequency domain resource sets.

Generally, the operations as discussed in the embodiment of FIGS. 19A-19B provide for ordering UE bearers according to a given ordering metric for each resource set and then determining whether to schedule a UE in a given subframe based on the ordering. For the present embodiment, only two resource sets are considered; thus, each resource set can generally be referred to as a subframe type, ABS or non-ABS. Accordingly, operations can begin at 1902 in which each UE served by a given small cell radio that can be scheduled in each resource set (e.g., subframe type) are ordered according a particular ordering metric. In various embodiments, the ordering metric can be computed as a function of one or more of: expected spectral efficiency, packet delays, average past throughput, QoS requirements (e.g., minimum throughput rate, delay, etc.). Typically, the highest ordered UEs are scheduled. However, a UE bearer, which is high in the priority list, may be restricted from being scheduled in a given subframe type (e.g., a restriction set associate with the set of resources for the subframe type) in order to prevent RB exhaustion for either ABS or non-ABS subframes.

At 1904, a $UE_i$ index value i is set equal to one (1) and scheduling for a first UE served by the small cell radio is assessed. Operations 1910-1918 illustrated in FIG. 19A and operations 1920-1928 illustrated in FIG. 19B can be performed in parallel or serially in any order. For any UE that is not added to a restriction set for either ABS subframes or non-ABS subframes, the UE can be scheduled on either subframe type if resources are available for the UE.

Operations 1910-1918 are now discussed. At 1910, the small cell radio determines whether a $UE_i$ bearer is high in priority (e.g., high in the ordering) for scheduling on ABS subframes. If not, the operations can continue to 1918 in which $UE_i$ is not added to the restriction set for ABS subframes. However, if at 1910 the small cell radio determines that the $UE_i$ bearer is high in priority for scheduling on ABS subframes, the operations continue to 1912 in which the small cell radio determines whether the $UE_i$ bearer can remain among the highest priority bearers (e.g., the top 2-3) in non-ABS subframes if restricted from ABS subframes. If not, the operations can continue to 1918 in which $UE_i$ is not added to the restriction set for ABS subframes. However, if at 1912 the small cell radio determines that the $UE_i$ bearer can remain among the highest priority bearers in non-ABS subframes if restricted from ABS subframes, then the operations continue to 1916 in which $UE_i$ is added to the restriction set for ABS subframes. Such a restriction can, in some embodiments, help to prevent exhausting ABS subframe RBs for UEs that don't suffer from high interference.

In some embodiments, an additional check can be performed at 1914 following the operations at 1912 if the small cell radio determines that the $UE_i$ bearer can remain among the highest priority bearers in non-ABS subframes if restricted from ABS subframes. At 1914, the small cell radio can perform an additional check to determine whether the $UE_i$ bearer can receive at least a predetermined percentage of spectral efficiency in non-ABS subframes. If not, the operations can continue to 1918 in which $UE_i$ is not added to the restriction set for ABS subframes. However, if at 1914 the small cell radio determines that the $UE_i$ bearer can receive at least the predetermined percentage of spectral efficiency in non-ABS subframes, the can operations continue to 1916 in which $UE_i$ is added to the restriction set for ABS subframes. In various embodiments, the predetermined percentage of spectral efficiency can vary in a range from approximately 40% to approximately 70%.

Similar operations can be performed with respect to non-ABS subframes as shown in FIG. 19B. At 1920, the small cell radio determines whether the $UE_i$ bearer is high in priority (e.g., high in the ordering) for scheduling on non-ABS subframes. If not, the operations can continue to 1926 in which $UE_i$ is not added to the restriction set for non-ABS subframes. However, if at 1920 the small cell radio determines that the $UE_i$ bearer is high in priority for scheduling on non-ABS subframes, the operations continue to 1922 in which the small cell radio determines whether the $UE_i$ bearer can remain among the highest priority bearers (e.g., the top 2-3) in ABS subframes if restricted from non-ABS subframes. If not, the operations can continue to 1926 in which $UE_i$ is not added to the restriction set for non-ABS subframes. However, if at 1922 the small cell radio determines that the $UE_i$ bearer can remain among the highest priority bearers in ABS subframes if restricted from non-ABS subframes, then the operations continue to 1928 in which $UE_i$ is added to the restriction set for non-ABS subframes. Such a restriction can, in some embodiments, help to prevent wasting too many RBs in non-ABS subframes for a UE that may see a boost in performance in ABS subframes.

In some embodiments, an additional check can be performed at 1924 following the operations at 1922 if the small cell radio determines that the UE$_i$ bearer can remain among the highest priority bearers in ABS subframes if restricted from non-ABS subframes. At 1924, the small cell radio can perform an additional check to determine whether the UE$_i$ bearer can receive at least a predetermined percent higher throughput in ABS subframes than in non-ABS subframes. If not, the operations can continue to 1926 in which UE$_i$ is not added to the restriction set for non-ABS subframes. However, if at 1924 the small cell radio determines that the UE$_i$ bearer can receive at least the predetermined percent higher throughput in ABS subframes than in non-ABS subframes, the can operations continue to 1928 in which UE$_i$ is added to the restriction set for non-ABS subframes.

Following any of the operations at 1916, 1918, 1926 or 1928, the operations can continue to 1930 as shown in FIG. 19A in which the small cell radio determines whether there are additional UEs that need to be assessed. If so, the operations can continue to 1932 in which the index i is incremented and the operations can return to 1920 and 1910 to repeat the aforementioned operations for another UE. However, if there are no additional UEs that need to be assessed, the operations can end. In various embodiments, operations 1900 can be performed on a periodic basis by each of small cell radio 112a-112c, based on a trigger (e.g., a trigger associated with degraded UE performance), as tasked by server 118, combinations thereof or the like.

Figure 20A:
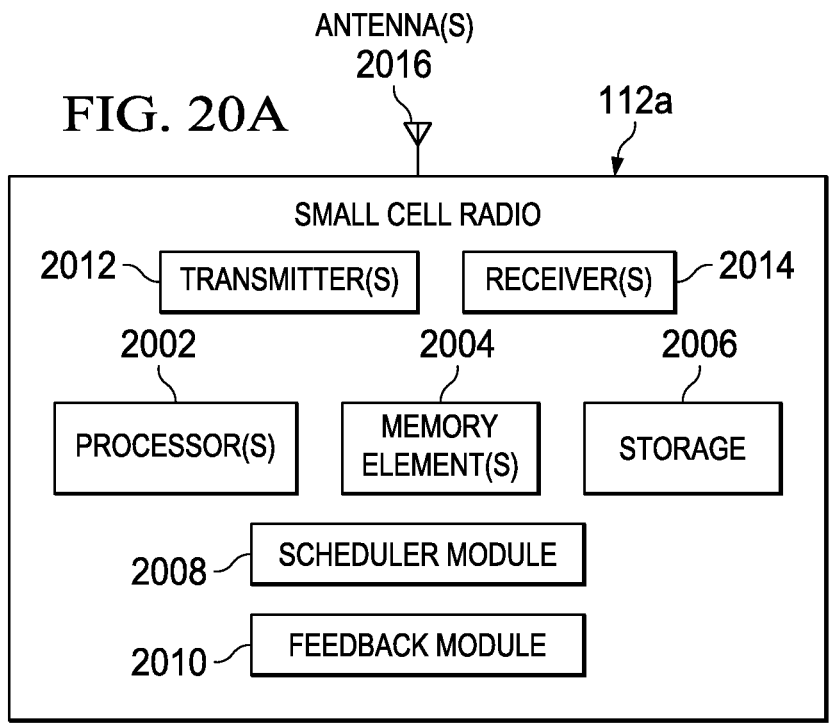
FIGS. 20A-20B are simplified block diagrams illustrating example details that can be associated with various embodiments of the communication system.
Figure 20B:
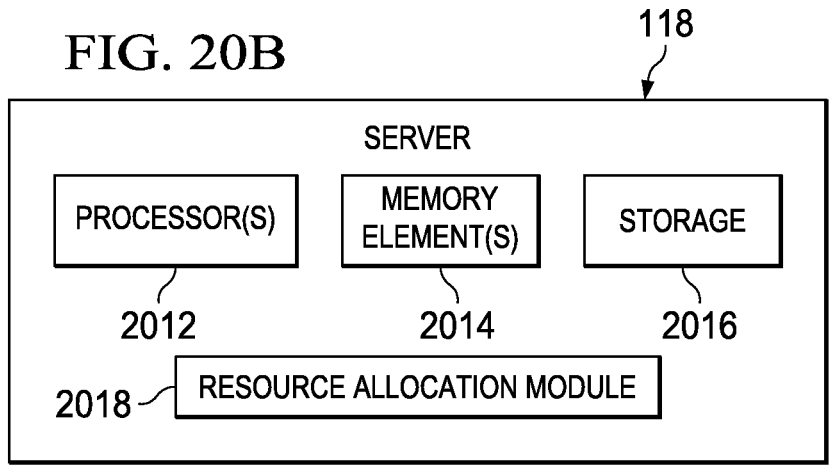

Referring to FIGS. 20A-20B, FIGS. 20A-20B are simplified block diagrams illustrating example details that can be associated with various embodiments of communication system 100.

Referring to FIG. 20A, FIG. 20A is a simplified block diagram illustrating example details that can be associated with small cell radio 112a in accordance with one embodiment of communication system 100. It should be understood that features of small cell radio 112a can be configured for any small cell radio in communication system 100, including small cell radios 112b-112c. As shown in FIG. 20A, small cell radio 112a can, in one or more embodiments, include one or more processor(s) 2002, one or more memory element(s) 2004, storage 2006, a scheduler module 2008, a feedback module 2010, one or more transmitter(s) 2012, one or more receiver(s) 2014 and one or more antenna(s) 2016. Scheduler module 2008 is configured to perform operations associated with UE time and/or frequency domain scheduling as described herein. Feedback module 2010 is configured to perform operations associated with determining performance metric feedback (e.g., UE specific, cell specific, etc.) for server 118 for time and frequency domain ICIC.

In at least one embodiment, processor(s) 2002 is/are a hardware processor(s) configured to execute various tasks, operations and/or functions of small cell radio 112a as described herein and memory element(s) 2004 is/are configured to store data associated with small cell radio 112a. In various embodiments, storage 2006 can be configured as a database or the like to store information associated with various operations as described herein (e.g., threshold(s), configuration information, UE/subscriber information, bearer or session policy and/or charging information (e.g., QoS requirements, etc.), combinations thereof or the like). In various embodiments, transmitter(s) 2012 can be associated with downlink data that may be transmitted to one or more UE (e.g., any of UE 116a-116b) via antenna(s) 2016 and receiver(s) 2014 can be associated with uplink data that may be received from one or more UE via antenna(s) 2016.

Referring to FIG. 20B, FIG. 20B is a simplified block diagram illustrating example details that can be associated with server 118 in accordance with one embodiment of communication system 100. As shown in FIG. 20B, server 118 can, in one or more embodiments, include one or more processor(s) 2012, one or more memory element(s) 2014, storage 2016 and a resource allocation module 2018. Resource allocation module 2018 is configured to perform operations associated with the allocation of resources for UEs 116a-116f for time and frequency domain ICIC as described herein.

In at least one embodiment, processor(s) 2012 is/are a hardware processor(s) configured to execute various tasks, operations and/or functions of server 118 as described herein and memory element(s) 2014 is/are configured to store data associated with server 118. In various embodiments, storage 2016 can be configured as a database or the like to store information associated with various operations as described herein (e.g., threshold(s), configuration information, UE/subscriber information, bearer or session policy and/or charging information (e.g., QoS requirements, etc.), combinations thereof or the like).

In regards to the internal structure associated with communication system 100, each of UE 116a-116h, other small cell radios 112b-112c and macro cell radio 120 can each also include a respective at least one processor, a respective at least one memory element and/or a respective storage. Hence, appropriate software, hardware and/or algorithms are being provisioned in UE 116a-116h, small cell radios 112a-112c, server 118 and macro cell radio 118 in order to facilitate operations as outlined herein. Note that in certain examples, certain storage (e.g., for storing information associated with operations described herein in one or more databases, etc.) can be consolidated with memory elements (or vice versa), or the storage can overlap/exist in any other suitable manner.

In one example implementation, small cell radios 112a-112c, server 118 and macro cell radio 120 are network elements, which are meant to encompass network appliances, servers, routers, switches, gateways, bridges, load-balancers, firewalls, processors, modules, or any other suitable device, component, element, or object, which may be operable to exchange information that facilitates or otherwise helps to facilitate time and frequency domain ICIC operations (e.g., for networks such as those illustrated in FIG. 1A). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 116a-116h, small cell radios 112a-112c, server 118 and macro cell radio 120 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 116*a*-116*h*, small cell radios 112*a*-112*c*, server 118 and/or macro cell radio 120 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the functions as outlined herein associated with providing time and frequency domain ICIC operations may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 20A-20B] can store data used for the operations described herein. This includes the memory elements being able to store software, logic, code, or processor instructions that are executed to carry out the activities described herein. A processor can execute any type of instructions associated with the data to achieve the operations detailed herein. In one example, a processor can include multiple processing cores, each capable of performing operations in a parallel or serial manner to carry out activities described herein. In another example, the processors [as shown in FIGS. 20A-20B] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an electrically erasable PROM (EEPROM) or an ASIC that includes digital logic, software, code, electronic instructions, or any suitable combination thereof. Note also that a module, function and/or engine as referred to herein in this Specification, can be inclusive of an executable file comprising instructions that can be understood and processed on a computer, and may further include library modules loaded during execution, object files, system files, hardware logic, software logic, or any other executable modules.

Note that in this Specification, references to various features (e.g., elements, structures, modules, components, steps, operations, characteristics, etc.) included in 'one embodiment', 'example embodiment', 'certain embodiment', 'an embodiment', 'another embodiment', 'some embodiments', 'various embodiments', 'other embodiments', 'certain embodiments', 'alternative embodiment', and the like are intended to mean that any such features and improvements are included in one or more embodiments of the present disclosure, but may or may not necessarily be combined in the same embodiments.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges and protocols, communication system 100 may be applicable to other exchanges or routing protocols. Moreover, although communication system 100 has been illustrated with reference to particular elements and operations that facilitate various processes, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
setting a performance metric threshold associated with performance of user equipments (UEs) served by a plurality of small cell radios;
determining, by each of the plurality of small cell radios, one or more restriction sets, wherein each restriction set identifies one or more UE that are not to be scheduled on a particular set of resources associated with a particular restriction set;
calculating a number of UEs that are to be scheduled across a first type of subframes and a second type of subframes based on a number of UEs belonging to each of the one or more restriction sets, wherein the first type of subframes and the second type of subframes are one of: an almost blank subframe (ABS) type of subframes; and a non-almost blank subframe (non-ABS) type of subframes;
receiving resource allocation parameters that are based on the restriction sets, wherein the resource allocation parameters include at least one of:
a value for a fraction of resources that can be scheduled in the first type of subframes for a fractional frequency reuse (FFR) portion of one or more subframes associated with the first type of subframes;
a value for a fraction of resources that can be scheduled in the second type of subframes for a fractional frequency reuse (FFR) portion of one or more subframes associated with the second type of subframes; and
a value for a fraction of resources that can be scheduled in both the first type of subframes and the second type of subframes for a fractional frequency reuse (FFR) portion of one or more subframes associated with both the first type of subframes and the second type of subframes;
exchanging interference information between two or more small cell radios of the plurality of small cell radios, wherein the interference information includes, at least in part, an indication of whether a particular small cell radio is interfering with another small cell radio of the two or more small cell radios and an indication of the particular small cell radio that it is interfered by another small cell radio of the two or more small cell radios; and
scheduling downlink resource transmissions on the first type of subframes and the second type of subframes for user equipment served by the two or more small cell radios based, at least in part on, the resource allocation parameters and the interference information exchanged between the two or more small cell radios.

2. The method of claim 1, wherein the performance metric threshold is associated with one of:
a signal-to-interference-plus-noise (SINR) threshold; and
an average spectral efficiency threshold.

3. The method of claim 1, wherein the performance metric threshold is associated with one of:
a quality of service (QoS) threshold;
a throughput rate threshold; and
a packet delay threshold.

4. The method of claim 1, wherein, for a particular small cell radio, the determining further comprises:
comparing a predicted performance for a particular UE served by the particular small cell radio for each of one or more resource sets; and
adding the particular UE to a restriction set for a particular resource set if the predicted performance for the particular UE is less than the performance metric threshold.

5. The method of claim 1, further comprising:
calculating an expected utility of UE performance for each of a plurality of candidate performance metric thresholds;
searching the calculated expected utilities to determine a maximum expected utility and particular candidate performance metric threshold associated with the maximum expected utility; and
setting the performance metric threshold equal to the particular candidate performance metric threshold.

6. The method of claim 1, further comprising, for a particular small cell radio:
measuring quality of service (QoS) for each UE of a plurality of first UEs served by the particular small cell radio that belong to a particular restriction set;
measuring quality of service (QoS) for each UE of a plurality of second UEs served by the particular small cell radio that do not belong to the particular restriction set;
comparing quality of service (QoS) performance for each UE of the plurality of first UEs to the performance metric threshold to determine whether the QoS performance for each UE of the plurality of first UEs is greater than the performance metric threshold, wherein the performance metric threshold is associated with a QoS performance metric threshold; and
based on a determination that the QoS performance for any UE of the plurality of first UEs is not greater than the performance metric threshold, reducing the performance metric threshold.

7. The method of claim 6, further comprising, for the particular small cell radio:
based on a determination that the QoS performance for any UE of the plurality of first UEs is greater than the performance metric threshold, comparing the QoS performance for each UE of the plurality of second UEs to the performance metric threshold to determine whether the QoS performance for each UE of the plurality of second UEs is greater than the performance metric threshold; and
based on a determination that the QoS performance for any UE of the plurality of second UEs is not greater than the performance metric threshold, increasing the performance metric threshold.

8. One or more non-transitory tangible media encoding logic that includes instructions for execution by a processor, wherein the execution causes the processor to perform operations, comprising:
setting a performance metric threshold associated with performance of user equipments (UEs) served by a plurality of small cell radios;
determining, by each of the plurality of small cell radios, one or more restriction sets, wherein each restriction set identifies one or more UE that are not to be scheduled on a particular set of resources associated for a particular restriction set;

calculating a number of UEs that are to be scheduled across a first type of subframes and a second type of subframes based on a number of UEs belonging to each of the one or more restriction sets, wherein the first type of subframes and the second type of subframes are one of: an almost blank subframe (ABS) type of subframes; and a non-almost blank subframe (non-ABS) type of subframes;

receiving resource allocation parameters that are based on the restriction sets, wherein the resource allocation parameters include at least one of:
 a value for a fraction of resources that can be scheduled in the first type of subframes for a fractional frequency reuse (FFR) portion of one or more subframes associated with the first type of subframes;
 a value for a fraction of resources that can be scheduled in the second type of subframes for a fractional frequency reuse (FFR) portion of one or more subframes associated with the second type of subframes; and
 a value for a fraction of resources that can be scheduled in both the first type of subframes and the second type of subframes for a fractional frequency reuse (FFR) portion of one or more subframes associated with both the first type of subframes and the second type of subframes; exchanging interference information between two or more small cell radios of the plurality of small cell radios, wherein the interference information includes, at least in part, an indication of whether a particular small cell radio is interfering with another small cell radio of the two or more small cell radios and an indication of the particular small cell radio that it is interfered by another small cell radio of the two or more small cell radios; and scheduling downlink resource transmissions on the first type of subframes and the second type of subframes for user equipment served by the two or more small cell radios based, at least in part on, the resource allocation parameters and the interference information exchanged between the two or more small cell radios.

9. The media of claim 8, wherein the performance metric threshold is associated with one of:
 a signal-to-interference-plus-noise (SINR) threshold; and
 an average spectral efficiency threshold.

10. The media of claim 8, wherein the performance metric threshold is associated with one of:
 a quality of service (QoS) threshold;
 a throughput rate threshold; and
 a packet delay threshold.

11. The media of claim 8, wherein, for a particular small cell radio, the determining further comprises:
 comparing a predicted performance for a particular UE served by the particular small cell radio for each of one or more resource sets; and
 adding the particular UE to a restriction set for a particular resource set if the predicted performance for the particular UE is less than the performance metric threshold.

12. The media of claim 8, the operations further comprising:
 calculating an expected utility of UE performance for each of a plurality of candidate performance metric thresholds;

searching the calculated expected utilities to determine a maximum expected utility and particular candidate performance metric threshold associated with the maximum expected utility; and
setting the performance metric threshold equal to the particular candidate performance metric threshold.

13. The media of claim 8, the operations further comprising, for a particular small cell radio:
 measuring quality of service (QoS) for each UE of a plurality of first UEs served by the particular small cell radio that belong to a particular restriction set;
 measuring quality of service (QoS) for each UE of a plurality of second UEs served by the particular small cell radio that do not belong to the particular restriction set;
 comparing quality of service (QoS) performance for each UE of the plurality of first UEs to the performance metric threshold to determine whether the QoS performance for each of the plurality of first UEs is greater than the performance metric threshold, wherein the performance metric threshold is associated with a QoS performance metric threshold; and
 based on a determination that the QoS performance for any UE of the plurality of first UEs is not greater than the performance metric threshold, reducing the performance metric threshold.

14. The media of claim 13, the operations further comprising, for the particular small cell radio:
 based on a determination that the QoS performance for any UE of the plurality of first UEs is greater than the performance metric threshold, comparing the QoS performance for each UE of the plurality of second UEs to the performance metric threshold to determine whether the QoS performance for each UE of the plurality of second UEs is greater than the performance metric threshold; and
 based on a determination that the QoS performance for any UE of the plurality of second UEs is not greater than the performance metric threshold, increasing the performance metric threshold.

15. A communication system, comprising:
 a server comprising at least one first memory element for storing first data and at least one first processor that executes instructions associated with the first data;
 a plurality of small cell radios, each small cell radio comprising at least one corresponding second memory element for storing corresponding second data and at least one corresponding second processor that executes instructions associated with the corresponding second data for each small cell radio;
 the server being adapted when executed by the at least one first processor to:
  set a performance metric threshold associated with performance of user equipments (UEs) served by a plurality of small cell radios;
 each of the plurality of small cell radios being adapted when executed by the at least one corresponding second processor for each small cell radio to:
  determine one or more restriction sets, wherein each restriction set identifies one or more UE that are not to be scheduled on a particular set of resources associated for a particular restriction set; and
  calculate a number of UEs that are to be scheduled across a first type of subframes and a second type of subframes based on a number of UEs belonging to each of the one or more restriction sets, wherein the first type of subframes and the second type of subframes are one of: an almost blank subframe (ABS) type of subframes; and a non-almost blank subframe (non-ABS) type of subframes;

receiving resource allocation parameters that are based on the restriction sets, wherein the resource allocation parameters include at least one of:

a value for a fraction of resources that can be scheduled in the first type of subframes for a fractional frequency reuse (FFR) portion of one or more subframes associated with the first type of subframes;

a value for a fraction of resources that can be scheduled in the second type of subframes for a fractional frequency reuse (FFR) portion of one or more subframes associated with the second type of subframes; and a value for a fraction of resources that can be scheduled in both the first type of subframes and the second type of subframes for a fractional frequency reuse (FFR) portion of one or more subframes associated with both the first type of subframes and the second type of subframes;

exchange interference information between two or more small cell radios of the plurality of small cell radios, wherein the interference information includes, at least in part, an indication of whether a particular small cell radio is interfering with another small cell radio of the two or more small cell radios and an indication of the particular small cell radio that it is interfered by another small cell radio of the two or more small cell radios; and schedule downlink resource transmissions on the first type of subframes and the second type of subframes for user equipment served by the two or more small cell radios based, at least in part on, the resource allocation parameters and the interference information exchanged between the two or more small cell radios.

16. The communication system of claim 15, wherein the performance metric threshold is associated with one of:

a signal-to-interference-plus-noise (SINR) threshold; and an average spectral efficiency threshold.

17. The communication system of claim 15, wherein, for a particular small cell radio, the particular small cell radio is further adapted when executed by its at least one corresponding second processor to:

compare a predicted performance for a particular UE served by the particular small cell radio for each of one or more resource sets; and add the particular UE to a restriction set for a particular resource set if the predicted performance for the particular UE is less than the performance metric threshold.

18. The communication system of claim 15, wherein the performance metric threshold is associated with one of:

a quality of service (QoS) threshold;

a throughput rate threshold; and a packet delay threshold.

19. The communication system of claim 15, wherein, for a particular small cell radio, the particular small cell radio is further adapted when executed by its at least one corresponding second processor to:

measure quality of service (QoS) for each UE of a plurality of first UEs served by the particular small cell radio that belong to a particular restriction set;

measure quality of service (QoS) for each UE of a plurality of second UEs served by the particular small cell radio that do not belong to the particular restriction set;

compare quality of service (QoS) performance for each UE of the plurality of first UEs to the performance metric threshold to determine whether the QoS performance for each UE of the plurality of first UEs is greater than the performance metric threshold, wherein the performance metric threshold is associated with a QoS performance metric threshold; and based on a determination that the QoS performance for any UE of the plurality of first UEs is not greater than the performance metric threshold, reduce the performance metric threshold.

20. The communication system of claim 19, wherein, for the particular small cell radio, the particular small cell radio is further adapted when executed by its at least one corresponding second processor to:

based on a determination that the QoS performance for any UE of the plurality of first UEs is greater than the performance metric threshold, compare the QoS performance for each UE of the plurality of second UEs to the performance metric threshold to determine whether the QoS performance for each UE of the plurality of second UEs is greater than the performance metric threshold; and based on a determination that the QoS performance for any UE of the plurality of second UEs is not greater than the performance metric threshold, increase the performance metric threshold.

* * * * *

UNITED STATES PATENT AND TRADEMARK OFFICE
CERTIFICATE OF CORRECTION

PATENT NO. : 9,826,545 B2
APPLICATION NO. : 14/951987
DATED : November 21, 2017
INVENTOR(S) : Ritesh K. Madan et al.

Page 1 of 1

It is certified that error appears in the above-identified patent and that said Letters Patent is hereby corrected as shown below:

In the Specification

Column 15, Line 20, delete "(RCM)," and insert -- (RCPI), --, therefor.

Column 21, Line 62, after "RSRP" insert -- $\geq$ --.

Column 28, Line 22, delete "'$s_u^{nonABS}(r)$'" and insert -- '$s_u^{ABS}(r)$' --, therefor.

Column 29, Line 45, delete "$\Sigma_r s_{nonABS}(r)$" add insert -- $\Sigma_r s_u^{nonABS}(r)$ --, therefor.

Column 29, Line 50, delete "sixth)" and insert -- sixth --, therefor.

Column 30, Line 28, delete "$U^{-1}(*)$" and insert -- $U^{-1}(\bullet)$ --, therefor.

Column 36, Line 38, delete "A" and insert -- $\Delta$ --, therefor.

Column 37, Line 30, delete "layer]," and insert -- layer)], --, therefor.

Column 38, Line 22, delete "A" and insert -- $\Delta$ --, therefor.

Column 38, Line 30, delete "A" and insert -- $\Delta$ --, therefor.

Column 40, Line 17, delete "FIGS." and insert -- FIG. --, therefor.

Column 54, Line 37, delete "$r^{MAX}$" and insert -- $r_{MAX}$ --, therefor.

Signed and Sealed this
Fifth Day of June, 2018

Andrei Iancu
*Director of the United States Patent and Trademark Office*